(12) United States Patent
Lohita et al.

(10) Patent No.: US 12,231,475 B2
(45) Date of Patent: Feb. 18, 2025

(54) SYSTEM AND METHOD FOR ESTABLISHING AND MANAGING MULTIPLE CALL SESSIONS FROM A CENTRALIZED CONTROL INTERFACE

(71) Applicant: Damaka, Inc., Richardson, TX (US)

(72) Inventors: Rashmi Lohita, Allen, TX (US); Sivakumar Chaturvedi, Allen, TX (US)

(73) Assignee: Damaka, Inc., Richardson, TX (US)

(\*) Notice: Subject to any disclaimer, the term of this patent is extended or adjusted under 35 U.S.C. 154(b) by 0 days.

(21) Appl. No.: 18/352,412

(22) Filed: Jul. 14, 2023

(65) Prior Publication Data

US 2023/0379370 A1 Nov. 23, 2023

Related U.S. Application Data

(63) Continuation of application No. 17/474,467, filed on Sep. 14, 2021, now abandoned.

(60) Provisional application No. 63/176,419, filed on Apr. 19, 2021, provisional application No. 63/077,892, filed on Sep. 14, 2020.

(51) Int. Cl.
| | |
|---|---|
| *H04L 65/1083* | (2022.01) |
| *H04L 12/18* | (2006.01) |
| *H04L 65/1023* | (2022.01) |
| *H04L 65/1069* | (2022.01) |
| *H04L 65/1096* | (2022.01) |
| *H04L 65/403* | (2022.01) |
| *H04L 65/60* | (2022.01) |

(52) U.S. Cl.
CPC ...... *H04L 65/1083* (2013.01); *H04L 12/1822* (2013.01); *H04L 65/103* (2013.01); *H04L 65/1069* (2013.01); *H04L 65/1096* (2013.01); *H04L 65/403* (2013.01); *H04L 65/60* (2013.01)

(58) Field of Classification Search
None
See application file for complete search history.

(56) References Cited

U.S. PATENT DOCUMENTS

| | | |
|---|---|---|
| 5,442,637 A | 8/1995 | Nguyen |
| 5,761,309 A | 6/1998 | Ohashi et al. |

(Continued)

FOREIGN PATENT DOCUMENTS

| | | |
|---|---|---|
| EP | 1603339 A1 | 12/2005 |
| EP | 1638275 A2 | 3/2006 |

(Continued)

OTHER PUBLICATIONS

Balamurugan Karpagavinayagam et al. (Monitoring Architecture for Lawful Interception in VoIP Networks, ICIMP 2007, Aug. 24, 2008).

(Continued)

*Primary Examiner* — Backhean Tiv

(57) ABSTRACT

Disclosed are a system and method for establishing and managing one-to-one and conference call sessions through a virtual waiting room. Conference calls may be established initially or created as additional people are invited to an existing call. Functions such as screensharing, chat messaging, and file sharing may be provided. Media, including video, text, and images, may be selected and sent to participants while they are on hold or during an active call session.

14 Claims, 54 Drawing Sheets

(56) References Cited

U.S. PATENT DOCUMENTS

| | | |
|---|---|---|
| 5,790,637 A | 8/1998 | Johnson et al. |
| 5,818,447 A | 10/1998 | Wolf et al. |
| 5,889,762 A | 3/1999 | Pajuvirta et al. |
| 6,031,818 A | 2/2000 | Lo et al. |
| 6,128,283 A | 10/2000 | Sabaa et al. |
| 6,141,687 A | 10/2000 | Blair |
| 6,161,082 A | 12/2000 | Goldberg et al. |
| 6,195,694 B1 | 2/2001 | Chen et al. |
| 6,202,084 B1 | 3/2001 | Kumar et al. |
| 6,219,638 B1 | 4/2001 | Padmanabhan et al. |
| 6,298,129 B1 | 10/2001 | Culver et al. |
| 6,311,150 B1 | 10/2001 | Ramaswamy et al. |
| 6,343,067 B1 | 1/2002 | Drottar et al. |
| 6,360,196 B1 | 3/2002 | Poznanski et al. |
| 6,389,016 B1 | 5/2002 | Sabaa et al. |
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,606,112 B1 | 8/2003 | Falco |
| 6,741,691 B1 | 5/2004 | Ritter et al. |
| 6,754,181 B1 | 6/2004 | Elliott et al. |
| 6,766,373 B1 | 7/2004 | Beadle et al. |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner et al. |
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,006,508 B2 | 2/2006 | Bondy et al. |
| 7,010,109 B2 | 3/2006 | Gritzer et al. |
| 7,013,155 B1 | 3/2006 | Ruf et al. |
| 7,079,529 B1 | 7/2006 | Khuc |
| 7,080,158 B1 | 7/2006 | Squire |
| 7,092,385 B2 | 8/2006 | Gallant et al. |
| 7,117,526 B1 | 10/2006 | Short |
| 7,123,710 B2 | 10/2006 | Ravishankar |
| 7,184,415 B2 | 2/2007 | Chaney et al. |
| 7,185,114 B1 | 2/2007 | Hariharasubrahmanian |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,346,044 B1 | 3/2008 | Chou et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,487,248 B2 | 2/2009 | Moran et al. |
| 7,512,652 B1 | 3/2009 | Appelman et al. |
| 7,542,472 B1 | 6/2009 | Gerendai et al. |
| 7,564,843 B2 | 7/2009 | Manjunatha et al. |
| 7,570,743 B2 | 8/2009 | Barclay et al. |
| 7,574,523 B2 | 8/2009 | Traversat et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,656,870 B2 | 2/2010 | Ravikumar et al. |
| 7,664,495 B1 | 2/2010 | Bonner et al. |
| 7,769,881 B2 | 8/2010 | Matsubara et al. |
| 7,774,495 B2 | 8/2010 | Pabla et al. |
| 7,778,187 B2 | 8/2010 | Chaturvedi et al. |
| 7,782,866 B1 | 8/2010 | Walsh et al. |
| 7,917,584 B2 | 3/2011 | Arthursson |
| 7,995,712 B2 * | 8/2011 | VanEpps, Jr. ..... H04M 1/72403 348/14.09 |
| 8,009,586 B2 | 8/2011 | Chaturvedi et al. |
| 8,065,418 B1 | 11/2011 | Abuan et al. |
| 8,200,796 B1 | 6/2012 | Margulis |
| 8,370,432 B2 * | 2/2013 | Digate .................. H04L 51/043 709/227 |
| 8,407,314 B2 | 3/2013 | Chaturvedi et al. |
| 8,407,576 B1 | 3/2013 | Yin et al. |
| 8,560,642 B2 * | 10/2013 | Pantos ................ H04L 65/1083 709/219 |
| 8,583,828 B2 * | 11/2013 | Chen ............. H04N 21/440218 709/217 |
| 8,611,540 B2 | 12/2013 | Chaturvedi et al. |
| 8,745,132 B2 * | 6/2014 | Obradovich ....... H04N 21/4882 709/204 |
| 8,867,734 B2 * | 10/2014 | Calman ............... H04L 12/1813 709/204 |
| 9,143,489 B2 | 9/2015 | Chaturvedi et al. |
| 9,237,140 B1 * | 1/2016 | Lerner .................. H04L 63/104 |
| 9,264,548 B1 | 2/2016 | Brittain ................ H04M 3/428 |
| 9,292,164 B2 * | 3/2016 | Goldman .............. G06Q 30/02 |
| 9,356,997 B2 | 5/2016 | Chaturvedi et al. |
| 9,459,936 B2 * | 10/2016 | Fallows ................ H04L 67/01 |
| 9,742,846 B2 | 8/2017 | Chaturvedi et al. |
| 10,027,926 B1 | 7/2018 | Schirdewahn et al. |
| 10,091,258 B2 * | 10/2018 | Carter .................. H04L 65/403 |
| 10,097,638 B2 | 10/2018 | Chaturvedi et al. |
| 10,582,050 B2 * | 3/2020 | Deole ................ H04M 3/4285 |
| 10,587,753 B1 | 3/2020 | Ravichandran .. H04N 21/44016 |
| 10,834,256 B1 * | 11/2020 | Nair .................... H04M 3/4285 |
| 10,887,549 B1 * | 1/2021 | Wehrung .............. H04L 65/403 |
| 10,924,709 B1 * | 2/2021 | Faulkner .............. H04L 65/1093 |
| 11,107,490 B1 * | 8/2021 | Slotznick ............. H04M 3/568 |
| 11,315,158 B1 * | 4/2022 | Lidster ............... G06Q 30/0609 |
| 11,380,434 B2 * | 7/2022 | Izadpanah ................ G06F 8/38 |
| 11,546,391 B2 * | 1/2023 | Ponnusamy ........ H04L 12/1827 |
| 2003/0164853 A1 * | 9/2003 | Zhu ....................... H04L 69/329 715/753 |
| 2004/0141005 A1 * | 7/2004 | Banatwala .......... H04L 12/1813 715/751 |
| 2005/0071678 A1 | 3/2005 | Lee et al. |
| 2005/0147212 A1 * | 7/2005 | Benco .................. H04M 3/428 379/215.01 |
| 2006/0064319 A1 * | 3/2006 | Loevner ................. G16H 40/67 705/2 |
| 2006/0188087 A1 * | 8/2006 | Kortum ................ H04M 3/428 379/266.01 |
| 2006/0195519 A1 * | 8/2006 | Slater .................. H04L 12/1822 709/204 |
| 2006/0233163 A1 * | 10/2006 | Celi ..................... H04L 65/103 370/356 |
| 2007/0003044 A1 * | 1/2007 | Liang .................. H04M 3/428 379/215.01 |
| 2008/0002022 A1 * | 1/2008 | VanEpps ................. H04N 7/147 348/E7.081 |
| 2008/0037753 A1 * | 2/2008 | Hofmann .......... H04M 3/42187 379/208.01 |
| 2009/0046838 A1 * | 2/2009 | Andreasson ............ H04M 1/80 379/101.01 |
| 2009/0282251 A1 | 11/2009 | Cook et al. |
| 2009/0319916 A1 * | 12/2009 | Gudipaty ................ H04N 7/15 715/753 |
| 2010/0064344 A1 | 3/2010 | Wang |
| 2010/0299529 A1 | 11/2010 | Fielder |
| 2011/0044211 A1 * | 2/2011 | Long ..................... H04W 4/16 370/259 |
| 2011/0145687 A1 | 6/2011 | Grigsby et al. |
| 2011/0279640 A1 | 11/2011 | Choi |
| 2011/0289155 A1 * | 11/2011 | Pirnazar ................ G06F 16/954 709/250 |
| 2012/0064976 A1 | 3/2012 | Gault et al. |
| 2012/0315880 A1 * | 12/2012 | Peitrow ............. H04M 1/72513 455/412.1 |
| 2013/0018950 A1 * | 1/2013 | Narayanan .......... H04L 12/1818 709/204 |
| 2013/0132605 A1 * | 5/2013 | Kocks ................ H04N 21/262 709/236 |
| 2013/0179941 A1 * | 7/2013 | McGloin .............. G06Q 10/10 726/3 |

(56) References Cited

U.S. PATENT DOCUMENTS

| | | | | |
|---|---|---|---|---|
| 2014/0040783 | A1* | 2/2014 | Goldman | G06F 3/167 |
| | | | | 715/757 |
| 2014/0044249 | A1* | 2/2014 | Brittain | H04L 65/1069 |
| | | | | 379/204.01 |
| 2014/0096036 | A1* | 4/2014 | Mohler | G06Q 10/10 |
| | | | | 715/753 |
| 2014/0340468 | A1* | 11/2014 | Winterstein | H04N 7/15 |
| | | | | 348/14.08 |
| 2015/0185965 | A1* | 7/2015 | Belliveau | G11B 27/007 |
| | | | | 715/723 |
| 2015/0195096 | A1* | 7/2015 | Anka | G06Q 50/01 |
| | | | | 709/205 |
| 2015/0295777 | A1* | 10/2015 | Cholkar | H04L 41/22 |
| | | | | 715/753 |
| 2016/0057391 | A1* | 2/2016 | Block | H04L 12/1822 |
| | | | | 348/14.07 |
| 2016/0234264 | A1* | 8/2016 | Coffman | H04L 65/4015 |
| 2017/0013233 | A1 | 1/2017 | Kuusela et al. | |
| 2017/0171280 | A1 | 6/2017 | Kim | |
| 2017/0249394 | A1* | 8/2017 | Loeb | H04L 63/0407 |
| 2018/0012192 | A1* | 1/2018 | Rosenberg | H04L 65/403 |
| 2018/0176508 | A1* | 6/2018 | Pell | H04L 65/403 |
| 2019/0273767 | A1* | 9/2019 | Nelson | H04M 7/0027 |
| 2019/0306309 | A1* | 10/2019 | Deole | H04M 3/4286 |
| 2020/0259952 | A1* | 8/2020 | Deole | H04M 3/4286 |
| 2020/0274965 | A1* | 8/2020 | Ravichandran | H04N 7/147 |
| 2020/0301647 | A1* | 9/2020 | Yoshida | H04L 65/403 |
| 2020/0382618 | A1* | 12/2020 | Faulkner | H04L 65/403 |
| 2021/0099574 | A1* | 4/2021 | Nair | H04M 3/4285 |
| 2022/0086197 | A1* | 3/2022 | Lohita | H04L 65/1069 |
| 2023/0379370 | A1* | 11/2023 | Lohita | H04L 65/403 |

FOREIGN PATENT DOCUMENTS

| | | |
|---|---|---|
| EP | 1848163 A1 | 10/2007 |
| EP | 1988698 A1 | 11/2008 |
| EP | 1404082 B1 | 10/2012 |
| EP | 1988697 B1 | 2/2018 |
| JP | 2005094600 A | 4/2005 |
| JP | 2005227592 A | 8/2005 |
| JP | 2007043598 A | 2/2007 |
| KR | 20050030548 A | 3/2005 |
| WO | 03079635 A1 | 9/2003 |
| WO | 2005009019 A2 | 1/2005 |
| WO | 2004063843 A3 | 3/2005 |
| WO | 2006064047 A1 | 6/2006 |
| WO | 2006075677 A1 | 7/2006 |
| WO | 2008099420 A3 | 12/2008 |

OTHER PUBLICATIONS

Blanchet et al.; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.
Chathapuram, "Security in Peer-To-Peer Networks", Aug. 8. 2001, XP002251813.
Cooper et al.; "NAT Traversal for dSIP"; Feb. 25, 2007; IETF; IETF draft draft-matthews-p2psip-dsip-nat-traversal-00; pp. 1-23.
Cooper et al.; "The Effect of NATs on P2PSIP Overlay Architecture"; IETF; IETF draft draft-matthews-p2psip-nats-and-overlays-01.txt; pp. 1-20.
Dunigan, Tom, "Almost TCP over UDP (atou)," last modified Jan. 12, 2004; retrieved on Jan. 18, 2011 from 18 pgs.
Hao Wang, Skype VoIP service-architecture and comparison, In: INFOTECH Seminar Advanced Communication Services (ASC), 2005, pp. 4, 7, 8.
Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.
J. Rosenberg et al., SIP: Session Initiation Protocol (Jun. 2008) retrieved at http://tools.ietf.org/html/rfc3261. Relevant pages provided.
J. Rosenberg et al. " Session Traversal Utilities for Nat (STUN)", draft-ietf-behave-rfc3489bis-06, Mar. 5, 2007.
Jeff Tyson, "How Instant Messaging Works", www.verizon.com/learningcenter, Mar. 9, 2005.
Mahy et al., The Session Initiation Protocol (SIP) "Replaces" Header, Sep. 2004, RFC 3891, pp. 1-16.
NiceLog User's Manual 385A0114-08 Rev. A2, Mar. 2004.
Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.
Philippe Bazot et al., Developing SIP and IP Multimedia Subsystem (IMS) Applications (Feb. 5, 2007) retrieved at redbooks IBM form No. SG24-7255-00. Relevant pages provided.
Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.
RFC 5694 ("Peer-to-Peer (P2P) Architecture: Definition, Taxonomies, Examples, and Applicability", Nov. 2009).
Rory Bland, et al., "P2P Routing" Mar. 2002.
Rosenberg, "STUN—Simple Traversal of UDP Through NAT", Sep. 2002, XP015005058.
Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ietf-mmusic-ice-19; pp. 1-120.
Salman A. Baset, et al., "An Analysis of the Skype Peer-to-Peer Internet Telephony Protocol", Department of Computer Science, Columbia University, New York, NY, USA, Sep. 15, 2004.
Seta, N.; Miyajima, H.; Zhang, L;; Fujii, T., "All-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.
Singh et al., "Peer-to Peer Internet Telephony Using SIP", Department of Computer Science, Columbia University, Oct. 31, 2004, XP-002336408.
Sinha, S. and Oglieski, A., a TCP Tutorial, Nov. 1998 (Date posted on Internet: Apr. 19, 2001) [Retrieved from the Internet ].
Srisuresh et al.; "State of Peer-to-Peer(P2P) Communication Across Network Address Translators(NATs)"; Nov. 19, 2007; I ETF; I ETF draft for RFC 5128, draft-ietf-behave-p2p-state-06.txt; pp. 1-33.
T. Dierks & E. Rescorla, The Transport Layer Security (TLS) Protocol (Ver. 1.2, Aug. 2008) retrieved at http://tools.ietf.org/htmllrfc5246. Relevant pages provided.
Wireless Application Protocol—Wireless Transport Layer Security Specification, Version Feb. 18, 2000, Wireless Application Forum, Ltd. 2000; 99 pages.
WISPA: Wireless Internet Service Providers Association; WISPA-CS-IPNA-2.0; May 1, 2009.
XiaHou Jlaxi, et al.: Live Broadcast Stream Push Method, Device and Electronic Device; Document Id: KR-20220139393-A; Mar. 26, 2021; 40 pages.

\* cited by examiner

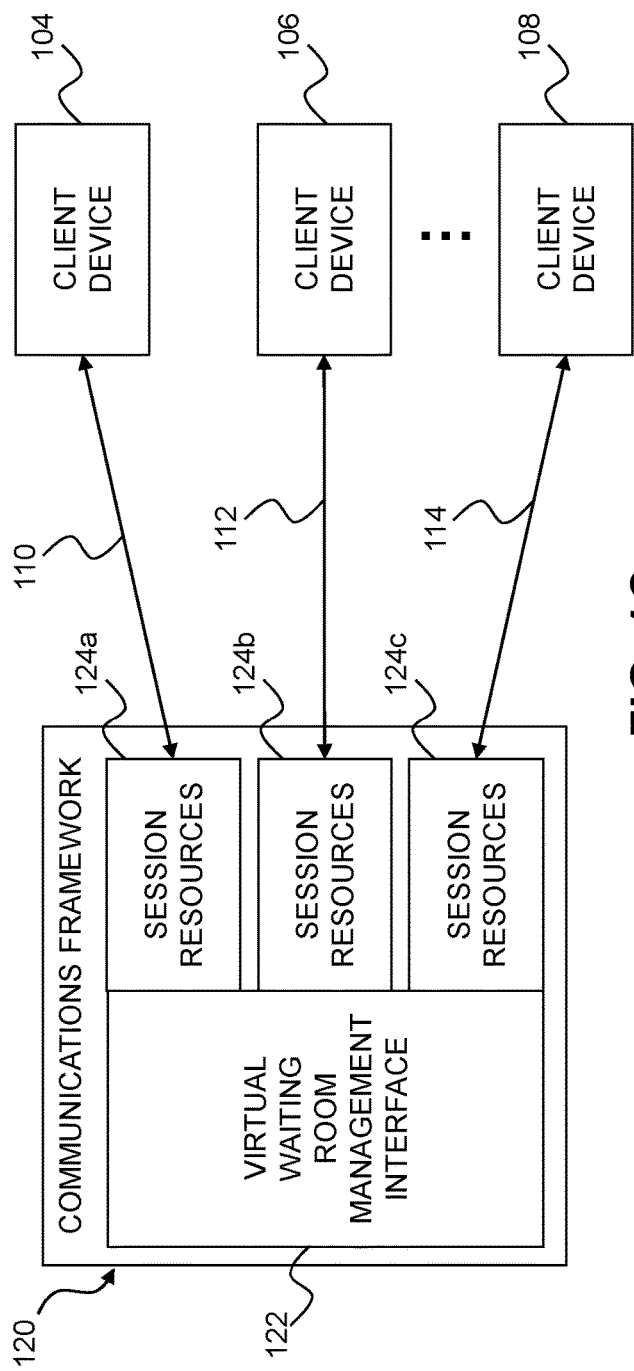
FIG. 1C
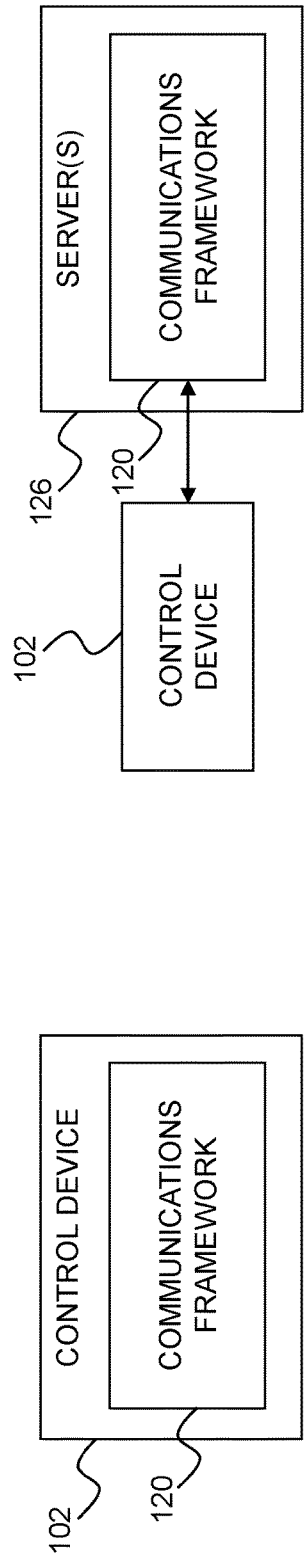
FIG. 1E
FIG. 1D

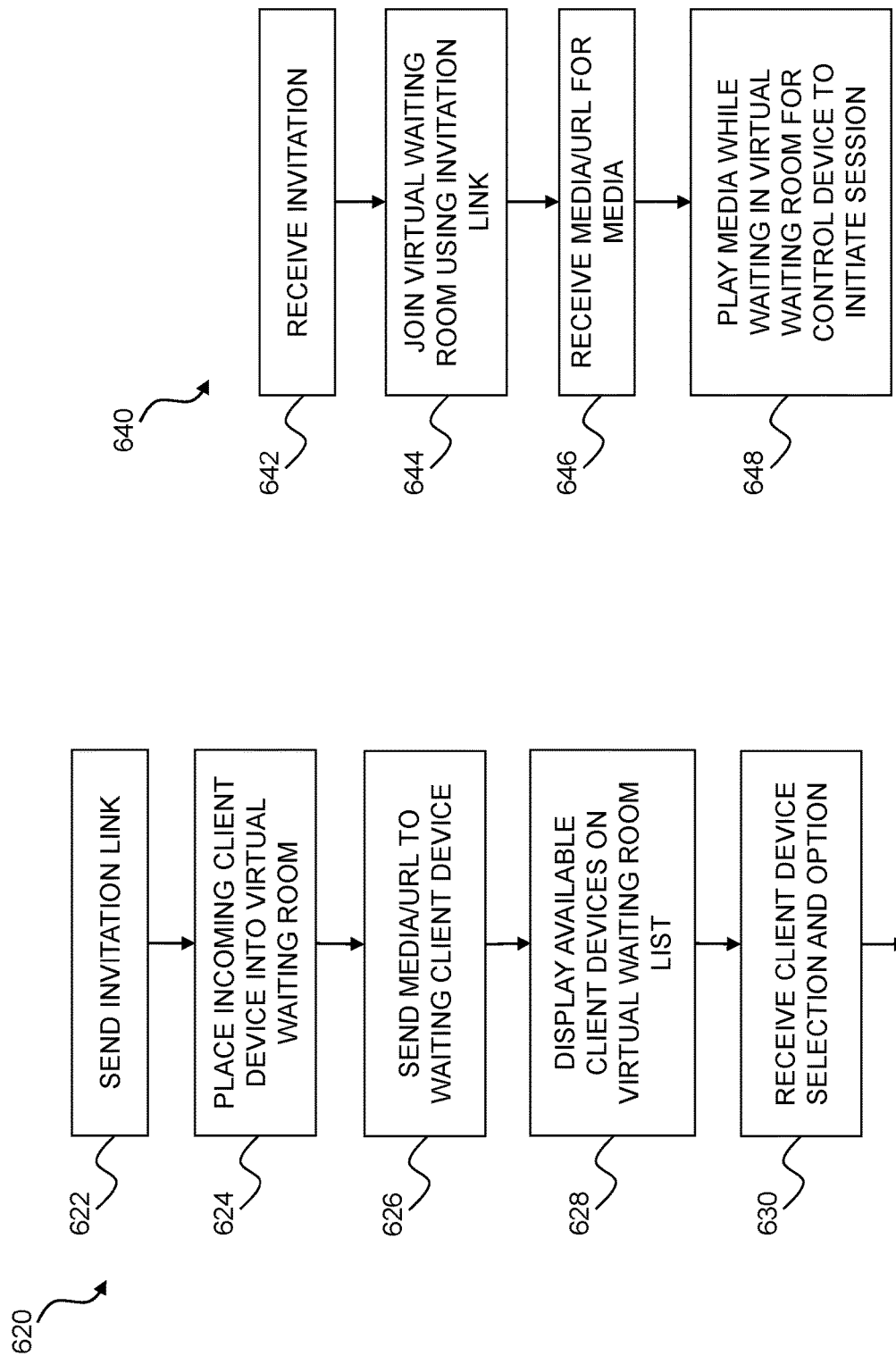

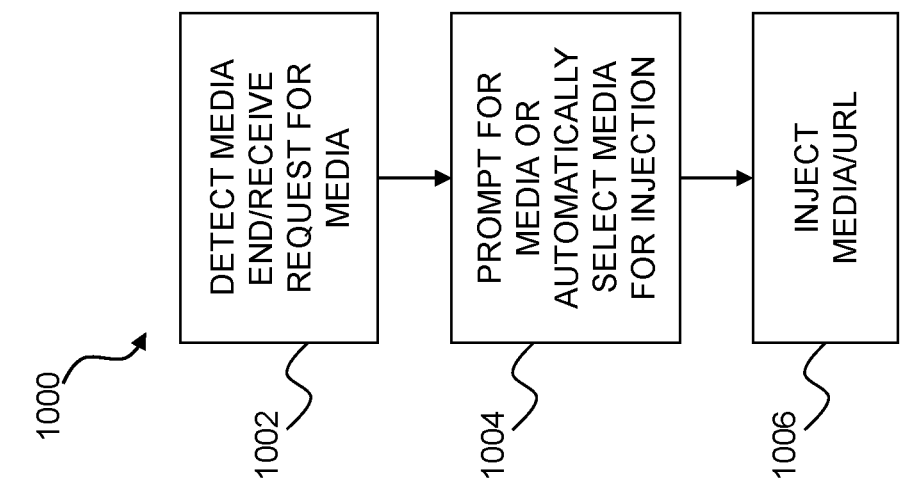
FIG. 10
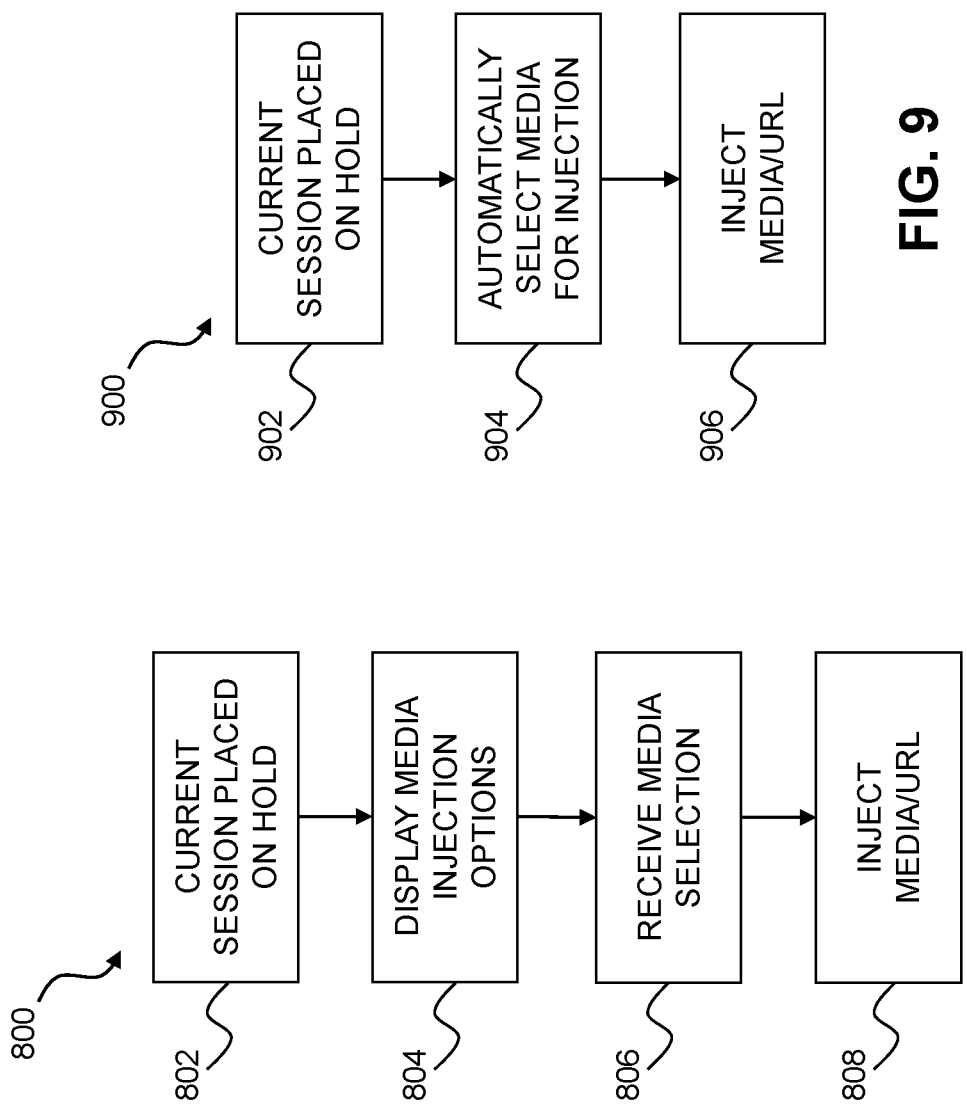
FIG. 9
FIG. 8

| CALL LOGS | | | | |
|---|---|---|---|---|
| SHOW 10 ▼ ENTRIES | | | | |
| DATE | START TIME | END TIME | | DURATION |
| SEP 12, 2020 5:55 PM | 2020-09-12 17:55:50 | 2020-09-12 17:58:54 | | 3 MINS 4 SECS |
| SEP 12, 2020 5:53 PM | 2020-09-12 17:53:41 | 2020-09-12 17:54:00 | | 19 SECS |
| SEP 12, 2020 1:05 PM | 2020-09-12 13:05:58 | 2020-09-12 13:06:03 | | 5 SECS |
| SEP 12, 2020 1:05 PM | 2020-09-12 13:05:31 | 2020-09-12 13:05:37 | | 6 SECS |
| SEP 12, 2020 1:04 PM | 2020-09-12 13:04:03 | 2020-09-12 13:04:33 | | 30 SECS |
| SEP 12, 2020 12:56 PM | 2020-09-12 12:56:30 | 2020-09-12 12:58:50 | | 2 MINS 20 SECS |
| SHOWING 1 TO 6 OF 6 ENTRIES | | | PREVIOUS 1 | NEXT |

DASHBOARD — 1802
CONFERENCE — 1804
CALL LOGS — 1806
SIGN OUT — 1808

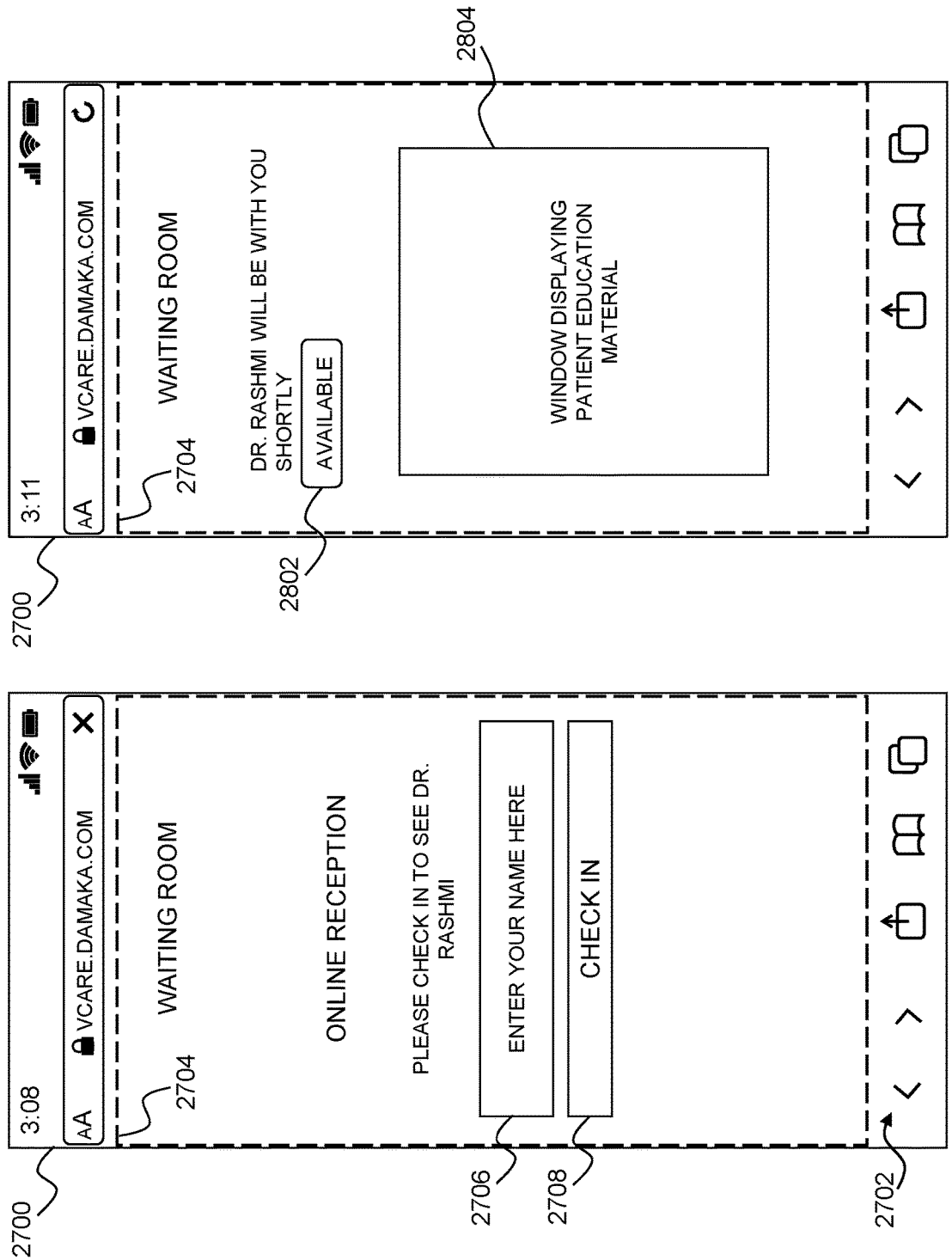

SYSTEM AND METHOD FOR ESTABLISHING AND MANAGING MULTIPLE CALL SESSIONS FROM A CENTRALIZED CONTROL INTERFACE

CROSS-REFERENCE TO RELATED APPLICATIONS

This application is a continuation of U.S. application Ser. No. 17/474,467, filed Sep. 14, 2021, entitled SYSTEM AND METHOD FOR ESTABLISHING AND MANAGING MULTIPLE INDEPENDENT CALL SESSIONS FROM A CENTRALIZED CONTROL INTERFACE, which claims the benefit of U.S. Provisional Application Ser. No. 63/077,892, filed on Sep. 14, 2020, and entitled SYSTEM AND METHOD FOR ESTABLISHING AND MANAGING MULTIPLE INDEPENDENT CALL SESSIONS FROM A CENTRALIZED CONTROL INTERFACE. U.S. application Ser. No. 17/474,467 also claims the benefit of U.S. Provisional Application Ser. No. 63/176,419, filed on Apr. 19, 2021, entitled SYSTEM AND METHOD FOR HIGHLY SCALABLE BROWSER-BASED AUDIO/VIDEO CONFERENCING, which are incorporated by reference herein in its entirety.

This application claims the benefit of U.S. Provisional Application Ser. No. 63/176,419, filed on Apr. 19, 2021, and entitled SYSTEM AND METHOD FOR HIGHLY SCALABLE BROWSER-BASED AUDIO/VIDEO CONFERENCING, which is incorporated by reference herein in its entirety.

BACKGROUND

The manner in which communication sessions with remote parties occur is currently limited in functionality and flexibility. Accordingly, what is needed are a system and method that addresses these issues.

BRIEF DESCRIPTION OF THE DRAWINGS

For a more complete understanding, reference is now made to the following description taken in conjunction with the accompanying Drawings in which:

FIG. 1C illustrates one embodiment of a virtual waiting room and call system within the environment of FIG. 1A;

FIGS. 1D-1H illustrate embodiments of different arrangements of the components of the virtual waiting room and call system of FIG. 1C;

FIG. 6B is a flow chart illustrating an embodiment of a process that may be executed by a control device;

FIG. 6C is a flow chart illustrating an embodiment of a process that may be executed by a client device;

FIGS. 8-10 are flow charts illustrating embodiments of processes that may be executed by a control device to provide media for display on a client device;

FIGS. 18-26 illustrate embodiments of a GUI that may be used by a control device;

FIGS. 27-29 illustrate embodiments of a GUI that may be used by a client device.

DETAILED DESCRIPTION

Figure 1A:
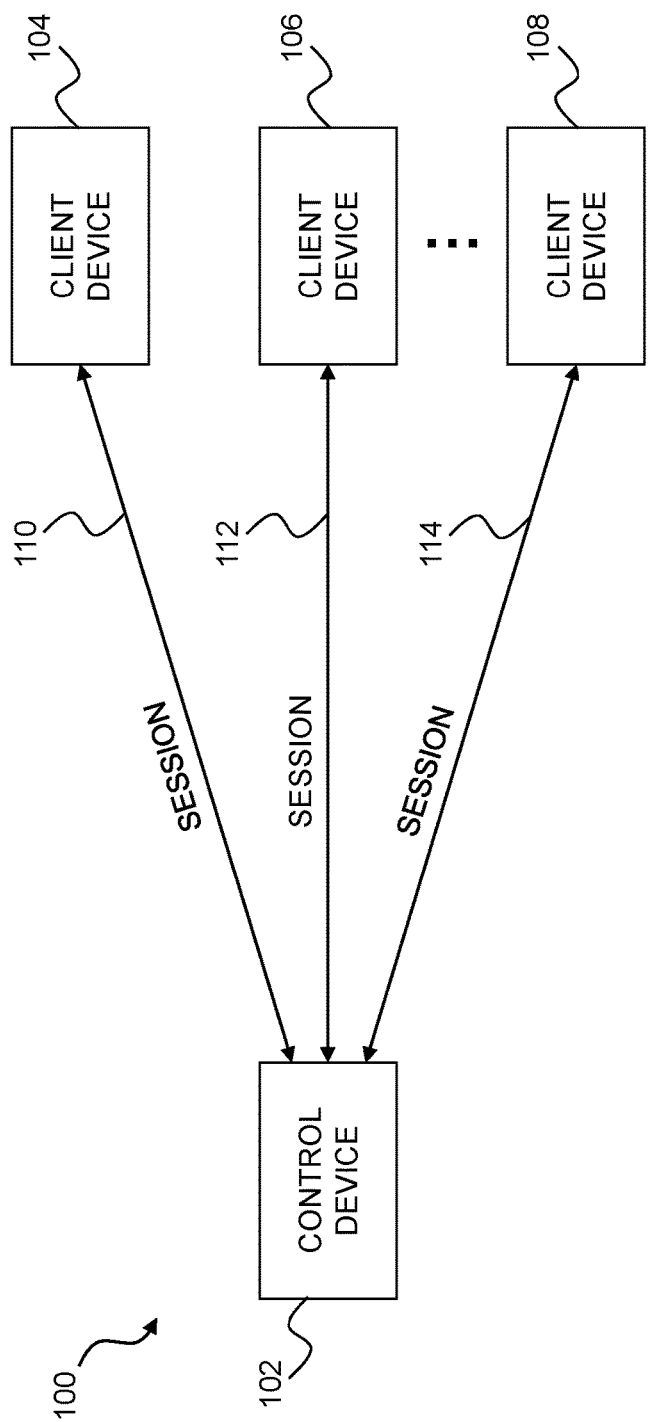
FIGS. 1A and 1B illustrate embodiments of environments within which a control device may manage separate communication sessions with one or more client devices.

It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1B:
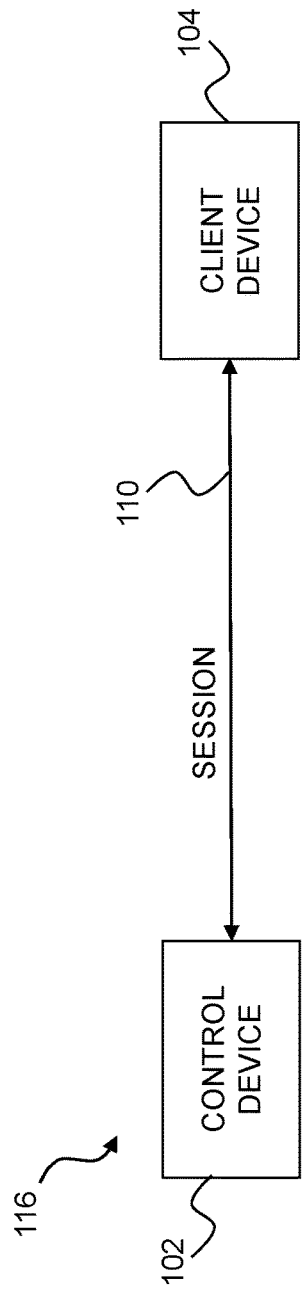

Referring to FIGS. 1A and 1B, embodiments of environments are illustrated within which various aspects of the present disclosure may practiced. Referring specifically to FIG. 1A, an environment 100 includes a control device 102 that has established communication sessions with a client device 104, a client device 106, and a client device 108. The control device 102 is coupled to the client device 104 via a session 110, to the client device 106 via a session 112, and to the client device 108 via a session 114. Although only three client devices are illustrated, it is understood that any number of client devices may be in communication with the control device 102, subject to technical limitations such as bandwidth, processing power, and similar factors.

FIG. 1B illustrates an environment 116 in which the control device 102 has established only the communication session 110 with the client device 104. It is understood that the environments 100 and 116 may be viewed as the same environment in different states. For example, the control device 102 of FIG. 1A may drop two sessions to reach the single session of FIG. 1B. Similarly, the control device 102 of FIG. 1B may add two sessions to reach the three sessions of FIG. 1A.

The control device 102 and client devices 104, 106, and 108 may be mobile devices (e.g., tablets, smartphones, personal digital assistants (PDAs), or netbooks), laptops, desktops, workstations, smart televisions, and/or any other computing device capable of receiving and sending electronic communications via a wired or wireless network connection. Such communications may be direct (e.g., via a peer-to-peer network, an ad hoc network, or using a direct connection), indirect, such as through a server or other proxy (e.g., in a client-server model), or may use a combination of direct and indirect communications.

While multiple sessions may be combined into a single session (e.g., as a conference call or a whiteboard sharing session), it may be desirable in some scenarios described herein to maintain the sessions 110, 112, and 114 as independent sessions. Accordingly, with independent sessions, only the control device 102 has access to the session established with each of the client devices 104, 106, and 108, and the client devices do not have access to the sessions of the other client devices. In other words, neither the client device 106 nor the client device 108 may access the session 110 unless the control device 102 specifically merges the sessions, and such functionality may or may not be available to the control device depending on the particular configuration of the control device and/or client devices. For example, such functionality may be disabled to prevent a user of the control device 102 from inadvertently merging sessions. This may be of particular value in environments where privacy requirements are high and possibly regulated by law, such as telemedicine and counseling environments.

In other embodiments, a client device may be provided the needed functionality to invite another device to a session. In such embodiments, the other device may not be part of an existing session, but would be invited to participate in the session. Each session may be end-to-end encrypted for both signaling and media. This enables sessions to be channeled through third-party servers without compromising private information.

A session may be accessed by the control device 102 and client devices in various ways. For example, a session may be accessed in a web based manner via a web browser (e.g., based solely on a browser's native capabilities or using scripting, an applet, and/or other browser related functionality), or may be accessed in an application based manner using a downloaded application that is installed and/or used to execute a temporary file. It is understood that the control device and client device may access a session in different ways, such as an installed application for the control device and browser access for the client device or vice versa.

The terms "control device" and "client device" as used herein do not in themselves dictate a server/client or other particular relationship between the control and client devices. As will be seen in following examples, the terms are generally used in a relational manner to indicate that the control device is controlling one or more sessions via a control interface, and each client device is communicating with the control device via one of those sessions. In some embodiments, the control device 102 may have access to functionality not available to the client device, such as the ability to inject videos and/or other media into the session when the session is ongoing or placed on hold. In addition, it is understood that each of the control device and client devices are generally used for interactions with a user, and the user information may be used or displayed in any given example herein. For example, the control device 102 may be identified as such, or may be identified by a user name or other designation.

For purposes of example, each of the communication sessions 110, 112, and 114 is described with respect to a hybrid peer-to-peer model, but the present disclosure is not limited to such models. It is understood that each of the sessions 110, 112, and 114 may include multiple connections or channels for different functions, such as a connection/channel for an audio/visual call and another connection/channel for document sharing. Alternatively, a single connection/channel may be used to provide multiple functions. Examples of hybrid peer-to-peer communications and functionality that may be used herein are disclosed in U.S. Pat. Nos. 7,656,870; 7,623,516; 7,623,476; 7,933,260; 8,050,272; 8,218,444; 8,446,900; 8,694,587; 8,892,646; 9,027,032; and 9,356,997.

From a technical perspective, each device may act as a client, a server, and/or as something else depending on the underlying technological framework used to establish and maintain the communication sessions. For example, in a hybrid peer-to-peer framework, both the control device 102 and a client device may take the roles of a server and a client, depending on which way information is being transferred at a given time. In a traditional client-server framework, both the control device 102 and the client device may be clients interacting with a server that is separate from either device. Accordingly, it is understood that the functionality described herein may be translated to various technological frameworks, with appropriate method steps and message flows that correspond to the particular framework in which the present disclosure is implemented.

Referring to FIG. 1C, one embodiment of a communications framework 120 is illustrated with a virtual waiting room (VWR) management interface 122. The VWR 122 may be used to manage session resources 124a-124c that handle the actual communications with the client devices 104, 106, and 108, respectively. For example, the session resources 124a-124c may be used for the allocation of memory, communication sockets, data prioritization, and/or other resources that are used to send and receive data. The VWR management interface 122 may provide a visual view of the end result (e.g., the availability and/or existence of multiple sessions) and provide management components such as interactive elements (e.g., buttons) for placing calls on hold, providing users with uniform communication and collaboration (UCC) functionality, and similar features. In some embodiments, the VWR management interface 122 may be further divided to provide a backend interface that may be used to send invitations to the VWR, schedule calls, and perform similar functions, and a frontend interface that may then access the calls waiting in the VWR. The division and organization of such functionality may differ based on the particular implementation.

Figure 1F:
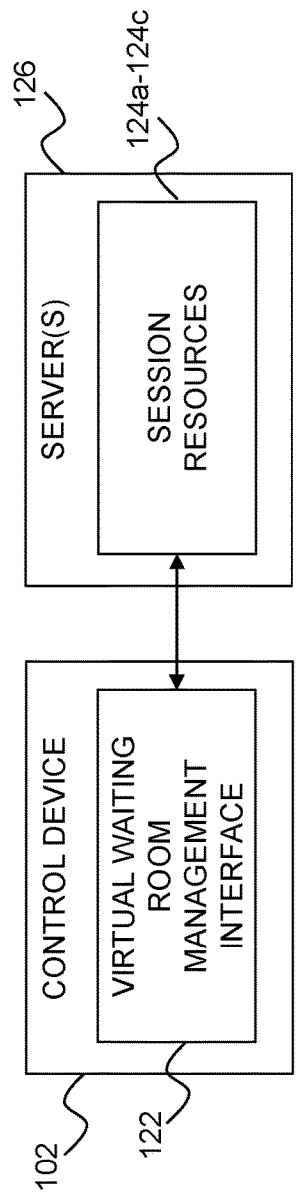
Figure 1G:
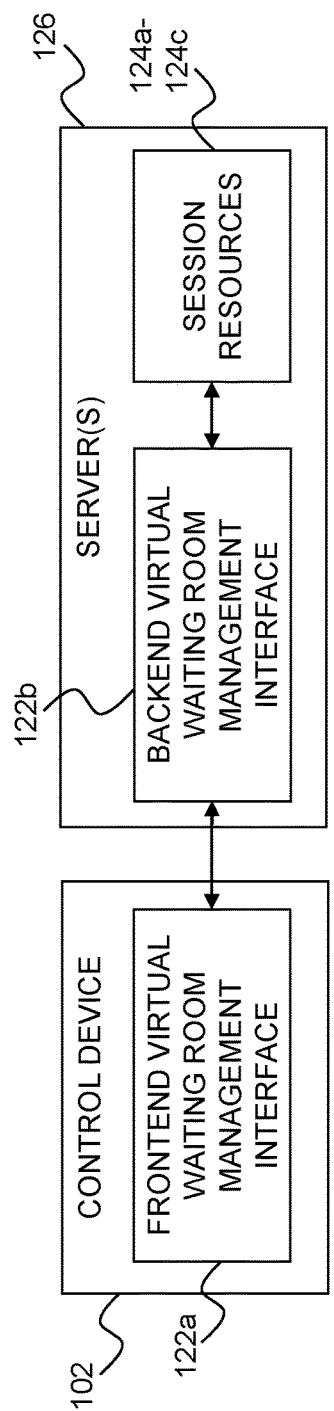
Figure 1H:
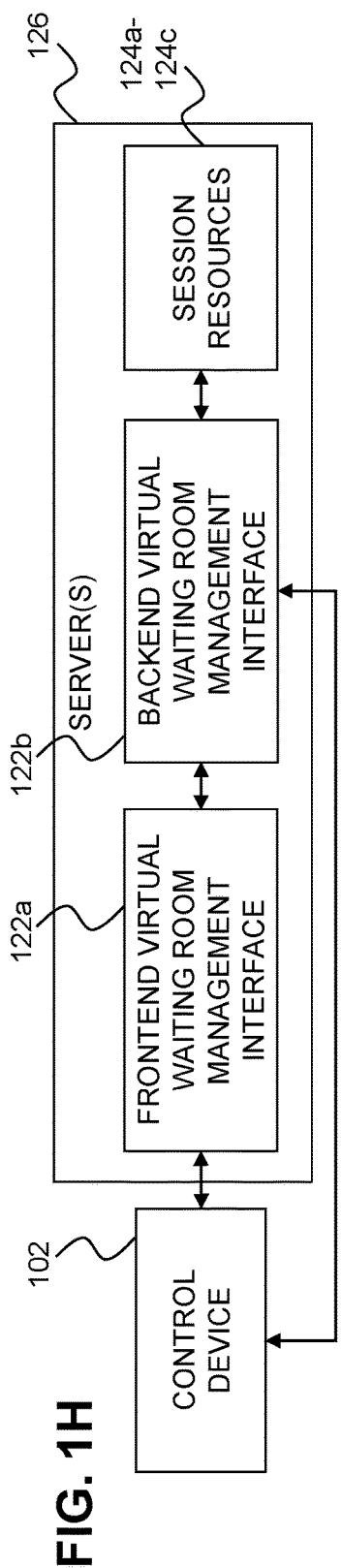

Referring to FIGS. 1D-1G, embodiments of different arrangements of the communications framework 120 of FIG. 1C are illustrated. In FIG. 1D, the communications framework 120 is located on the control device 102. In FIG. 1E, the communications framework 120 is located on one or more servers 126 and accessed by the control device 102. In FIG. 1F, the VRM management interface 122 is located on the control device 102, and the session resources 124a-124c are located on the server 126. In FIG. 1G, the VRM management interface 122 is divided into a frontend portion 122a and a backend portion 122b. The frontend portion 122a is located on the control device 102, and the backend portion 122b and session resources 124a-124c are located on the server 126. In FIG. 1H, the VRM management interface 122 is divided into a frontend portion 122a and a backend portion 122b, both of which are located on the server 126 along with the session resources 124a-124c. In some embodiments, the control device 102 may also be directly coupled to the backend portion 122b, as shown in FIG. 1H. The server 126 may represent one or more virtual and/or physical servers in FIGS. 1E-1H. It is understood that many different arrangements of functionality are possible, and FIGS. 1C-1H are meant for purposes of example only and are not intended to be limiting.

The communications framework 120 may enable all of the client devices 104, 106, and 108 to request access to the control device 102 via a single, identical uniform resource locator (URL) or other uniform resource identifier (URI). Because the communications framework 120 enables sessions to be established and managed together, it can identify different session requests and set each session up independently even though all requests are received via the same URL. This means that either static or dynamic URL allocation may be used, and a single URL can be send to multiple invitees for independent sessions. It is understood that this is not required and that unique URLs may be used if desired.

Figure 2:
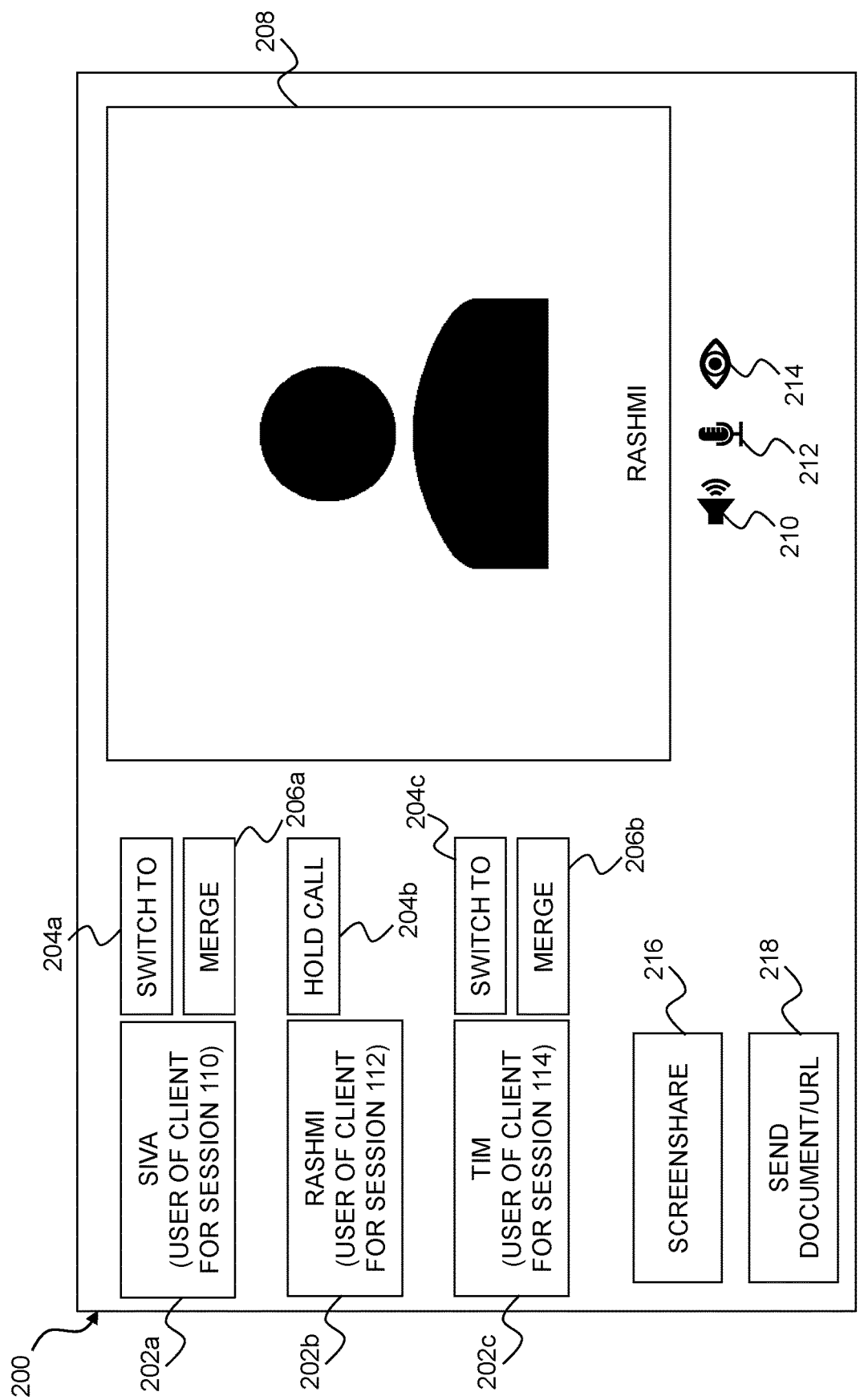
FIG. 2-5 illustrate embodiments of a graphical user interface (GUI) that may be used by the control device of FIGS. 1A and 1B.

Referring to FIG. 2, one embodiment of a graphical user interface (GUI) 200 is illustrated for the control device 102 of FIGS. 1A and 1B. The GUI 200 may represent, for example, the VRM management interface 122 of FIGS. 1C and 1F, and the frontend VRM management interface 122a of FIGS. 1G and 1H.

In the present example, the GUI 200 may be used to control multiple communication sessions, such as the sessions 110, 112, and 114. Individual sessions may be added or dropped without affecting the status of the other sessions. Depending on the embodiment, a limited number of session slots may be available, or sessions may be added until constrained by technological or other factors (e.g., memory, bandwidth, or available time slots). The GUI 200 may be web-based and accessible by control device 102 via a web browser, or may be application based and accessible by the control device using a downloaded application that is either installed or used to execute a temporary file.

In the present example, the sessions are with individuals using the client devices 104, 106, and 108. The sessions are separate and remain so unless merged by the control device 102. The client devices 104, 106, and 108 may not have the ability to unilaterally merge with another session, but may have the ability to approve or reject a merge initiated by the control device 102. In addition, the control device 102 and/or the client devices 104, 106, and 108 may have the ability to create a new session (e.g., rather than merging an existing session) and add that session to an existing session.

The GUI 200 provides a session list for the user of the device 102, with a session indicator 202a for the session 110, a session indicator 202b for the session 112, and a session indicator 202c for the session 114. In the present example, each session indicator 202a-202c includes a name for the individual communicating via the respective client device.

The GUI 200 may further include controls for each of the sessions 110, 112, and 114, with a control 204a for session 110, a control 204b for session 112, and a control 204c for session 114. The controls 204a-204c enable a currently active session to be put on hold (e.g., the control 204b) or may be used to switch to a currently held session (e.g., the controls 204a and 204c). Switching to a session that is on hold may automatically put the current session hold. Putting the current session on hold may retain the current session as the active session (e.g., may place the current session on hold without switching to another session). Additional controls 206a and 206b may be used to merge existing sessions.

A video display window 208 may be provided for a video call in the active session. As the current session is with Rashmi, her name may be provided in the window. Controls such as a speaker button 210, a mute button 212, and a video button 214 may be provided for control over the audio and video aspects of the call.

A screenshare button 216 may be provided to enable screen sharing. A send button 218 may be provided to send data in the current session. For example, selection of the send button 218 may open a dialog box or menu from which one or more files, URLs, and/or other data may be selected for transmission to the client device separate from, or embedded into, the ongoing call. The terms "file" and "media" as used herein include any type of text, image, model (e.g., a 3-D model or information needed to render/manipulate such a model), audio, and/or video file or combination of files, and may include files having multiple media types (e.g., an audio/video file or a text document with inline or linked images).

The data may be local on the control device 102, may be retrieved from a storage location (e.g., a server or database) prior to being sent by the control device, or may be accessed by the client device from a storage location (e.g., a server or database) using a link or other access mechanism provided by the control device. The data may be send as a discrete file or streamed, depending on the particular file and transfer mechanism. Data may also be provided via a link to the client device.

The send process may be accomplished in different ways. The system may be limited using various parameters or may dynamically adjust how data is sent based on factors such as available bandwidth and processing power, the type of data to be sent, whether the call is on hold or active, and similar factors.

Figure 3:
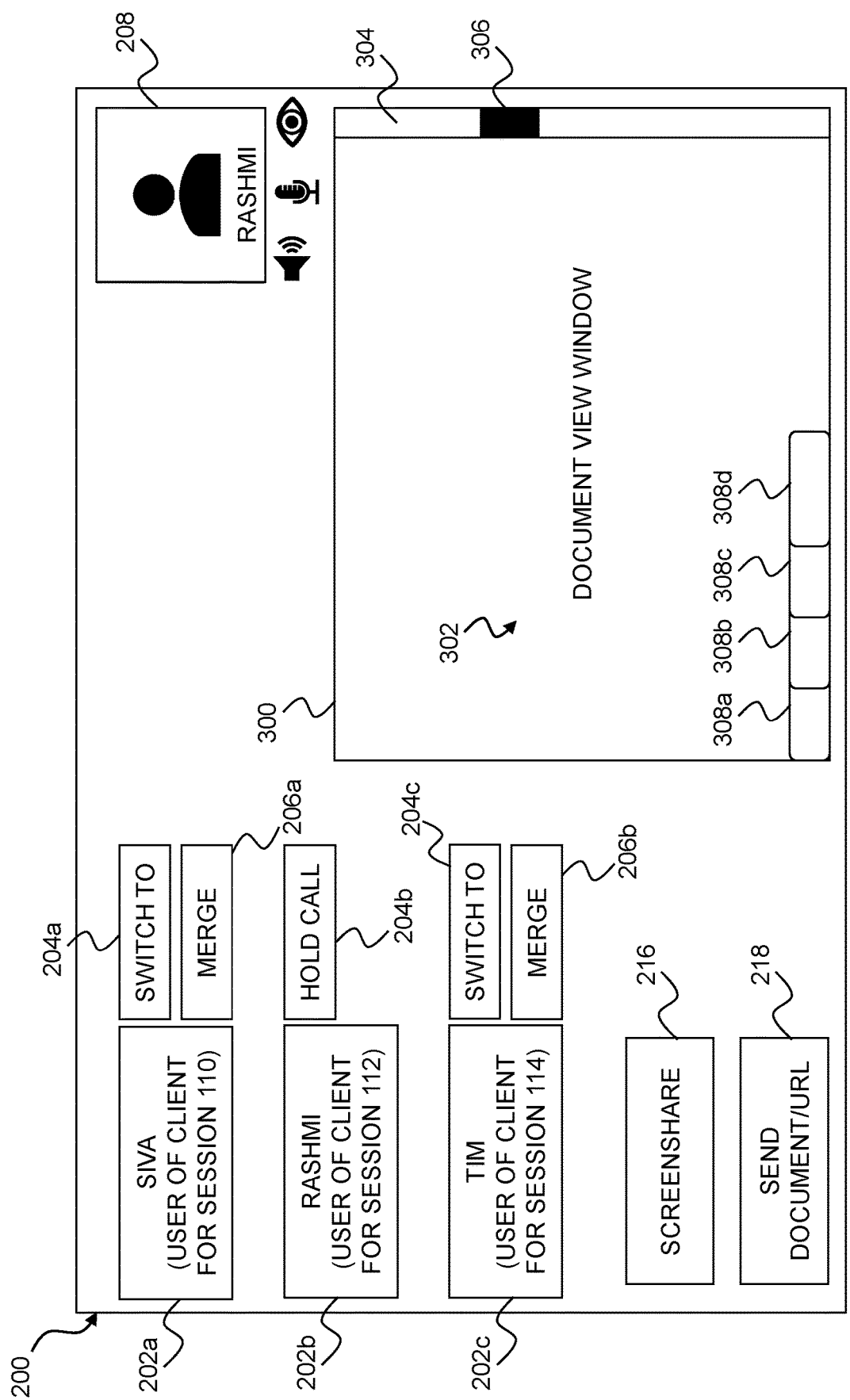

Referring to FIG. 3, for example, a file may be sent during an active call so that the control and/or client devices may display the file while the call is ongoing. The file may be an image, a text file, a video file, or any other file type or combination of types. The GUI 200 may provide a file view window 300 with a file viewing space 302. Depending on the size of the file, a slider 304 and slider control 306 may be used to scroll through the file vertically. A horizontal control (not shown) similar to the slider 304 for horizontal movement may be provided in some embodiments. A 3D control (not shown) may be provided to manipulate 3D files. One or more tabs or other selection components, such as tabs 308a-308d, may be provided to access multiple files.

In other embodiments, data may be sent while the call is on hold, enabling the client device to display the video file or other file while waiting for the control device 102 to restore the session to active status. One embodiment includes sending/beginning to stream a file and then placing the session on hold (the file may still be sending/streaming while on hold in some examples). Another embodiment includes placing the session on hold and then sending/streaming the file to the client device. Still another embodiment includes sending a URL to the client device before or after placing the session on hold, and the client device selects the URL to download or stream the file. Such data transmissions may require user acceptance/authorization or may automatically play on the client device.

In some embodiments, a URL or a file may be sent or streamed to the client device from a preset list of available options before or after the session is put on hold. The selection may be manual or automatic, with automatic selections having a variety of options such as predefined, prioritized, based on the current session's context, and/or random. In some embodiments, user engagement may be tracked to record whether the file was viewed and, if so, how much of the file was viewed. In other embodiments, the file may simply be transferred without tracking user engagement.

Each feature of the GUI 200, including the session indicators 202a-202c and controls 204a-204c, 206a, and 206b may include text, colors, border modifications (e.g., dotted lines, thicker or multiple lines, etc.), and/or other variations to indicate the status of the associated session and/or available functionality. For example, the active session of session indicator 202b may be outlined or filled with green, and the inactive sessions of session indicators 202a and 202b may be outlined or filled with yellow or red. Additionally or alternatively, some or all section indicators may be shaded in color, may display symbols, etc., to indicate the status of their respective sessions. Functionality may be grayed out or removed if not available. Furthermore, the amount of time on hold may be indicated via a visible timer, changes in the session indicator (e.g., slowly turning from yellow to red), and/or using other methods.

In addition, it is understood that many different arrangements of various elements illustrated on the GUI 200 may be used. Elements may be removed, added, combined, further divided, and positioned differently. Accordingly, it is understood that many different graphical presentation and implementation techniques may be used with the GUI 200 and the present disclosure is not intended to be limited to those explicitly illustrated or described.

Figure 4:
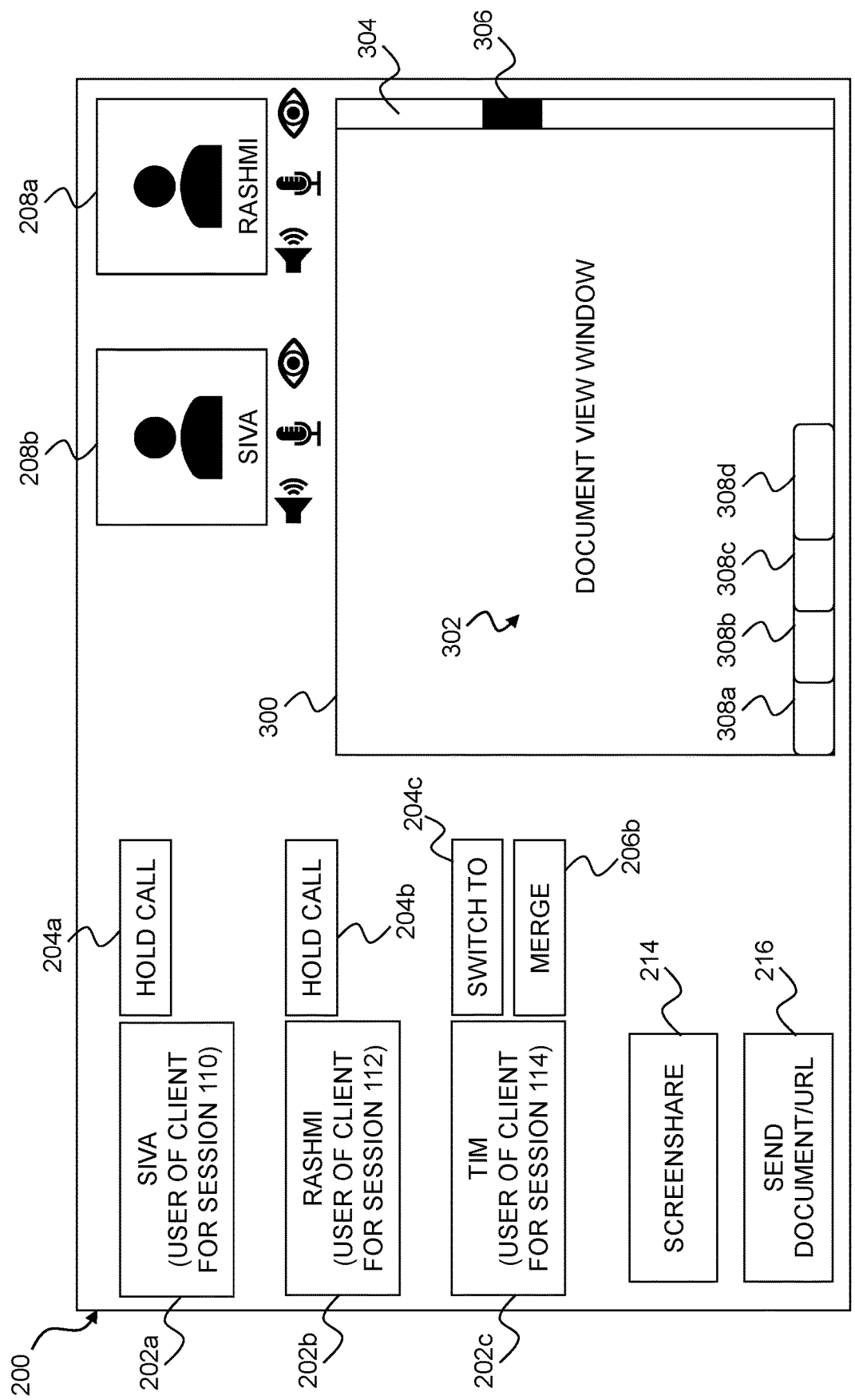

Referring to FIG. 4, one embodiment of the GUI 200 of FIG. 3 is shown with session 110 merged with session 112, so a video window 208b for Siva is now present. Document sharing and other functionality may continue with both Siva and Rashmi.

Figure 5:
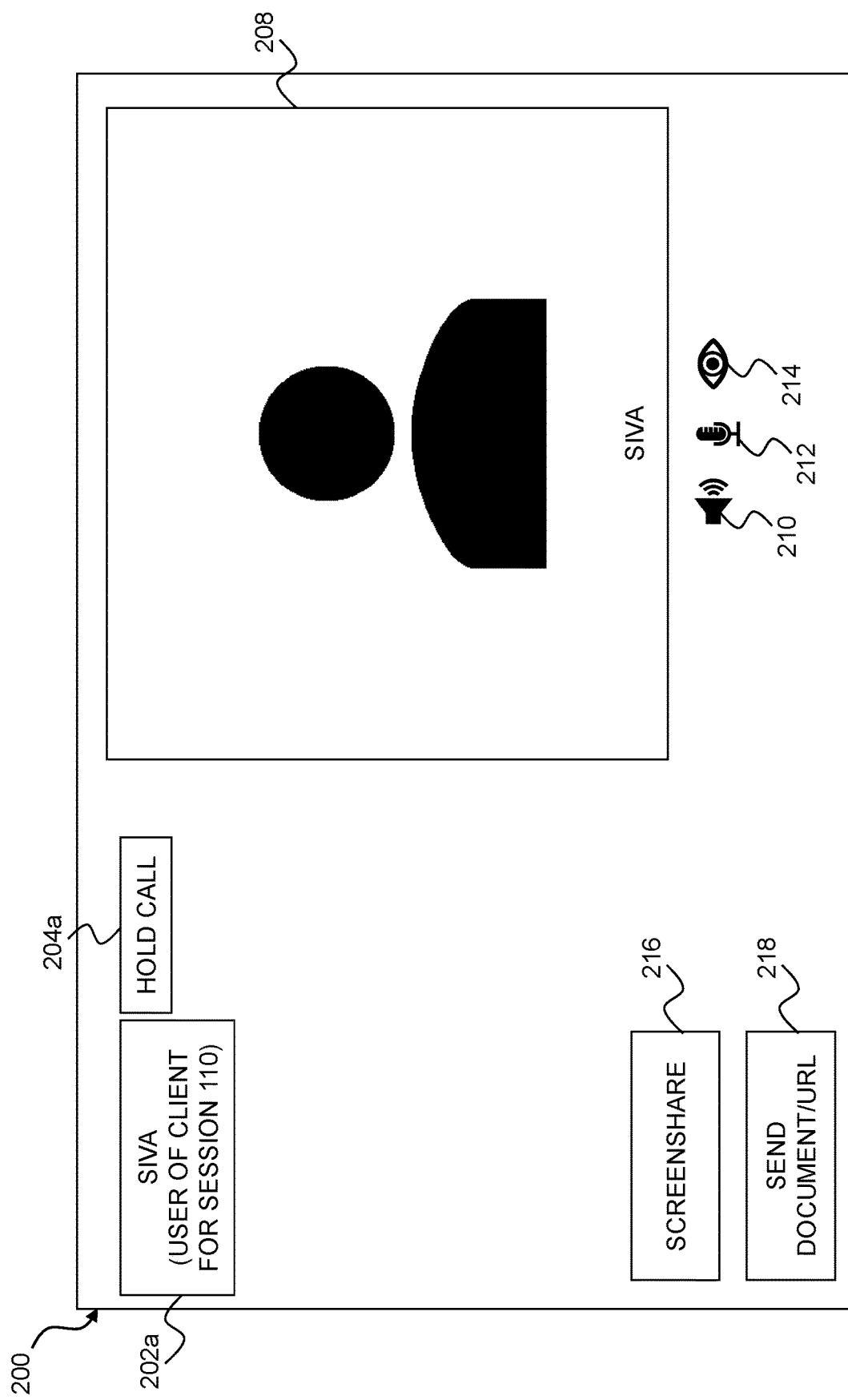

Referring to FIG. 5, one embodiment of the GUI 200 of FIG. 2 is shown with a single call session. Some functionality displayed with respect to FIG. 2 is not displayed in this example since only the single call is present.

Figure 6A:
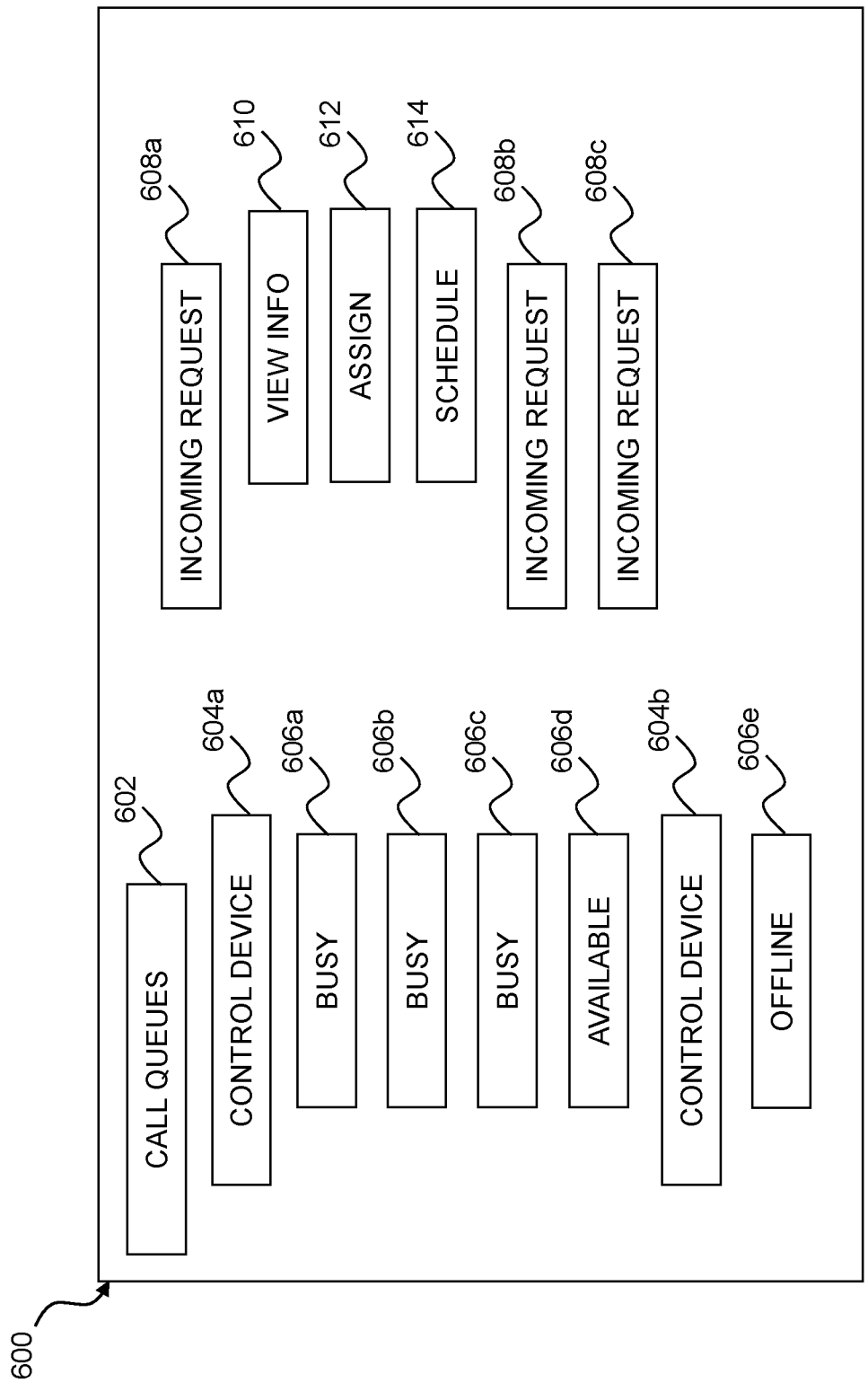
FIG. 6A illustrates one embodiment of a GUI by which call requests may be assigned to a virtual waiting room.

Referring to FIG. 6A, one embodiment of a GUI 600 is illustrated. The GUI 600 may represent, for example, the backend VRM management interface 122b of FIGS. 1G and 1H. In the present example, the GUI 600 includes one or more possible call queues 602. The call queues include a queue for a control device 604a and a control device 604b (or names associated with those devices). The queue for the control device 604 has four available slots, with slots 606a-606c indicated as being busy, and slot 606d indicated as being available. The control device 604b has no available slots and is indicated as being offline.

The GUI 600 is displaying incoming requests 608a-608c. The incoming request 608a has been selected, showing additional selection possibilities such as an additional information button 610, an assignment button 612, and a schedule button 614. The incoming request button 610 may provide additional information about the caller, whether a particular queue should be used (e.g., an appointment for a particular doctor rather than a general call for first available), and similar user specific details. The assignment button 612 may be used to assign the call to a particular available slot (e.g., the slot 606d). This will place the request in the virtual waiting room for the control device 604a. The schedule button 614 may be used to schedule a later call, such as with the control device 604b when it comes online. In some embodiments (not shown), the control device 604b may have slots available for future calls, and the incoming request 608a may be assigned to one such slot.

Referring to FIG. 6B, a flow chart illustrates one embodiment of a process 620, executable by the control device 102 or a component of the communications framework 120, by which client devices may be invited to a virtual waiting room and provided media to display while waiting. In step 622, the control device 102 or a component of the communications framework 120 sends an invitation to a client device. In step 624, the incoming client device is placed in the virtual waiting room. In step 626, media (e.g., audio, video, text, images, and/or other types of files) or URLs representing media locations may be sent to the waiting client device. In some embodiments, step 626 may occur as part of the invitation of step 622, between steps 622 and 624, or with step 624.

In step 628, a list of client devices in the virtual waiting room may be displayed. In step 630, a selection of a particular client device is received with any additional options (e.g., whether the session is to be initiated as a chat session, audio only call, or video call). In step 632, the session is initiated. Step 632 will generally end or suspend the media on the client device. Playback may continue if the session is again placed on hold, if the user of the client device indicates they wish to continue, and/or based on other parameters.

Referring to FIG. 6C, a flow chart illustrates one embodiment of a process 640, executable by a client device, by which the client device may be invited to a virtual waiting room and provided media to display while waiting. In step 642, the client device 102 receives an invitation to the virtual waiting room and joins in step 644. In step 646, media (e.g., audio, video, text, images, and/or other types of files) or URLs representing media locations are received by the waiting client device. In some embodiments, step 646 may occur as part of the invitation of step 642, between steps 642 and 644, or with step 644. In step 648, the client device plays the media while waiting for the session to begin.

Referring to FIGS. 7A-7E, embodiments are illustrated where the control device 102 is sending media (e.g., audio, video, text, images, and/or other types of files) to one or more client devices. With respect to each of FIGS. 7A-7E, as described previously, the sending of media and/or URLs may occur with or without putting the corresponding communication session(s) on hold. This process enables educational material, advertisements, and/or other material to be displayed on a client device while the session is active or on hold.

The particular information may be selected based on the context of the session. For example, if the session is a medical consultation, the media may be related to available diagnostic procedures, potentially applicable drugs, and/or other information that may be used to inform and/or educate the patient while waiting for the session to continue. If the session is for discussing the purchase or rental of a product or service, the media may be related to options, upgrades, alternatives, availability, special deals, and/or other information that may be applicable to the consumer. If the session is a consultation session for advice (e.g., beauty advice, counseling, recruiting, or professional development), the media may be related to various options, products, subscriptions, and/or other information that may be applicable to the individual seeking advice. The media may play automatically or may require the user of the client device to accept the media.

Figure 7A:
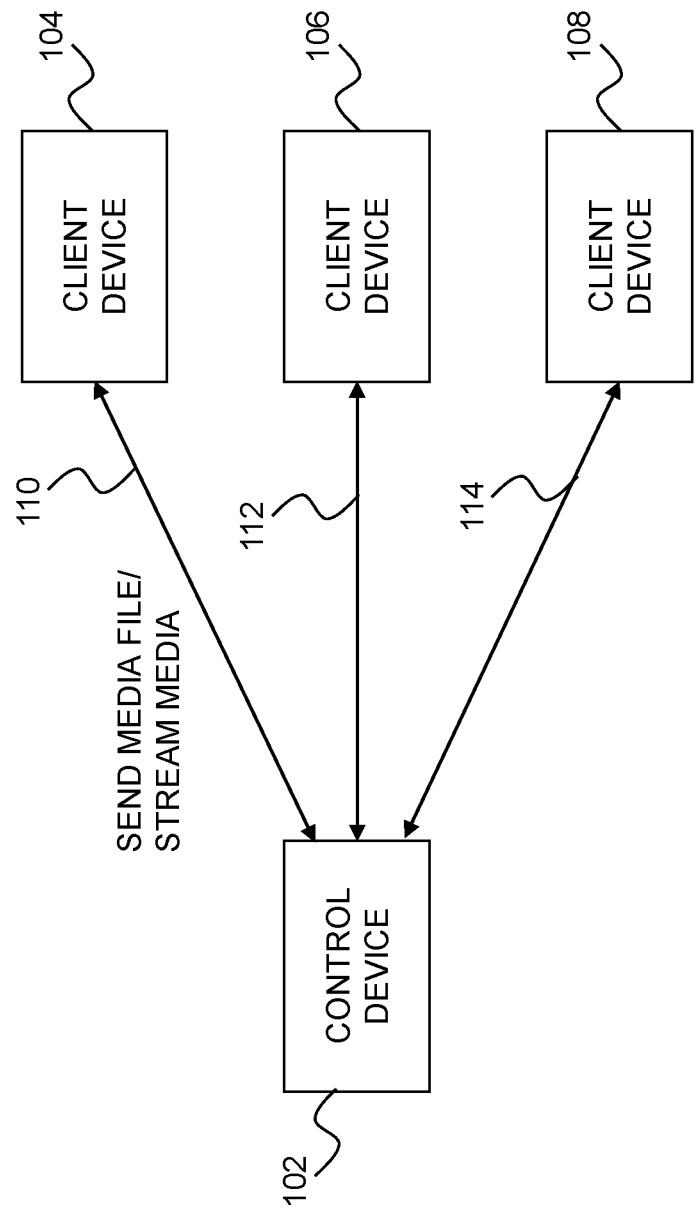
FIGS. 7A-7E illustrate processes by which media may be injected into a session, either directly or via a URL, to be played when the session is active or on hold.
Figure 7B:
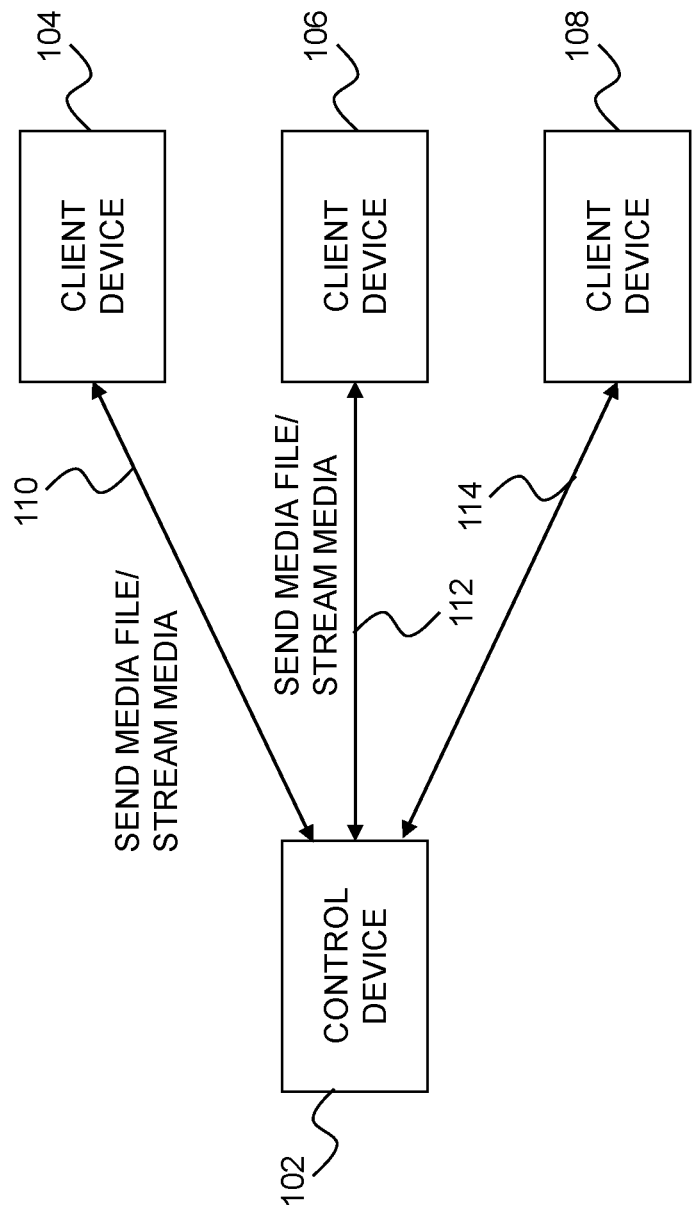

In FIG. 7A, the media is sent directly to the client device 104. In FIG. 7B, the media is sent directly to the client devices 104 and 106. The client devices 104 and 106 may be in independent sessions with the control device 102 or may be in a conference call together. The media sent to each of the client devices 104 and 106 may be identical or different.

Figure 7C:
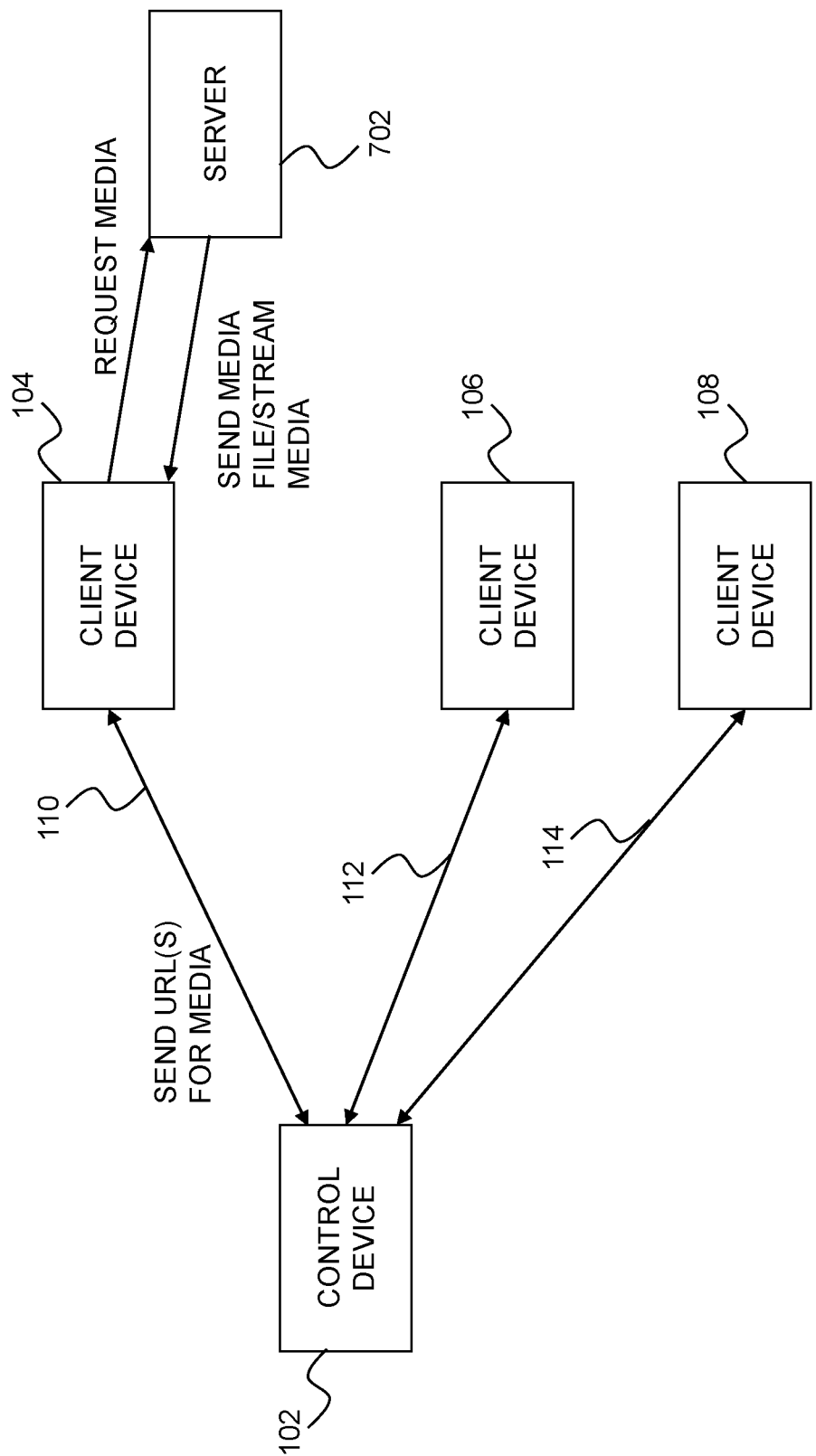
Figure 7D:
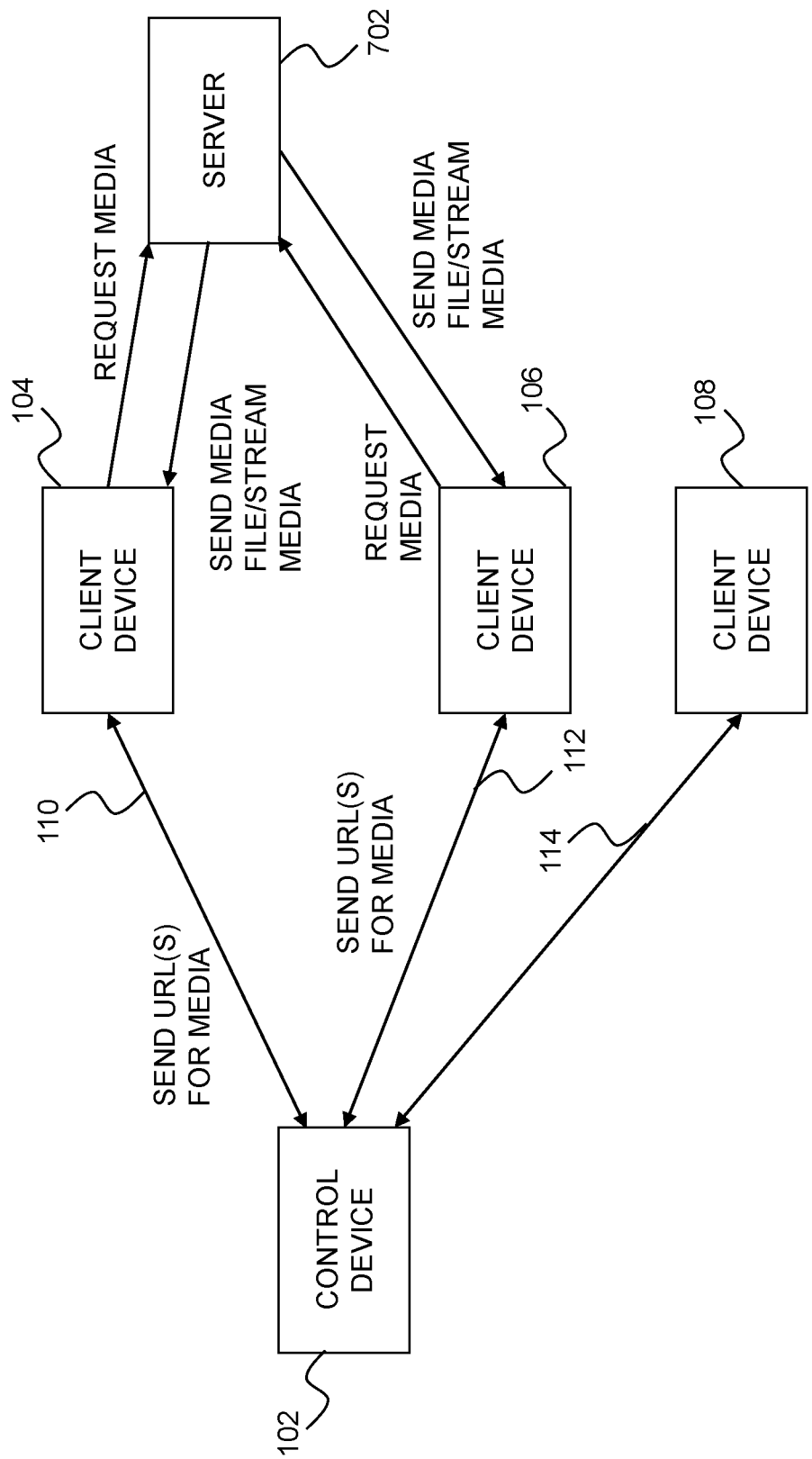

In FIG. 7C, a URL is sent to the client device 104 and the client device 104 then retrieves the media from a server 702 using the URL. In FIG. 7D, a URL is sent to each of the client devices 104 and 106, and each client device 104 and 106 then retrieves the media from the server 702 using the URL. The client devices 104 and 106 may be in independent sessions with the control device 102 or may be in a conference call together. The URL sent to each of the client devices 104 and 106 may be identical or different, and may direct the client devices to the same server or to different servers.

Figure 7E:
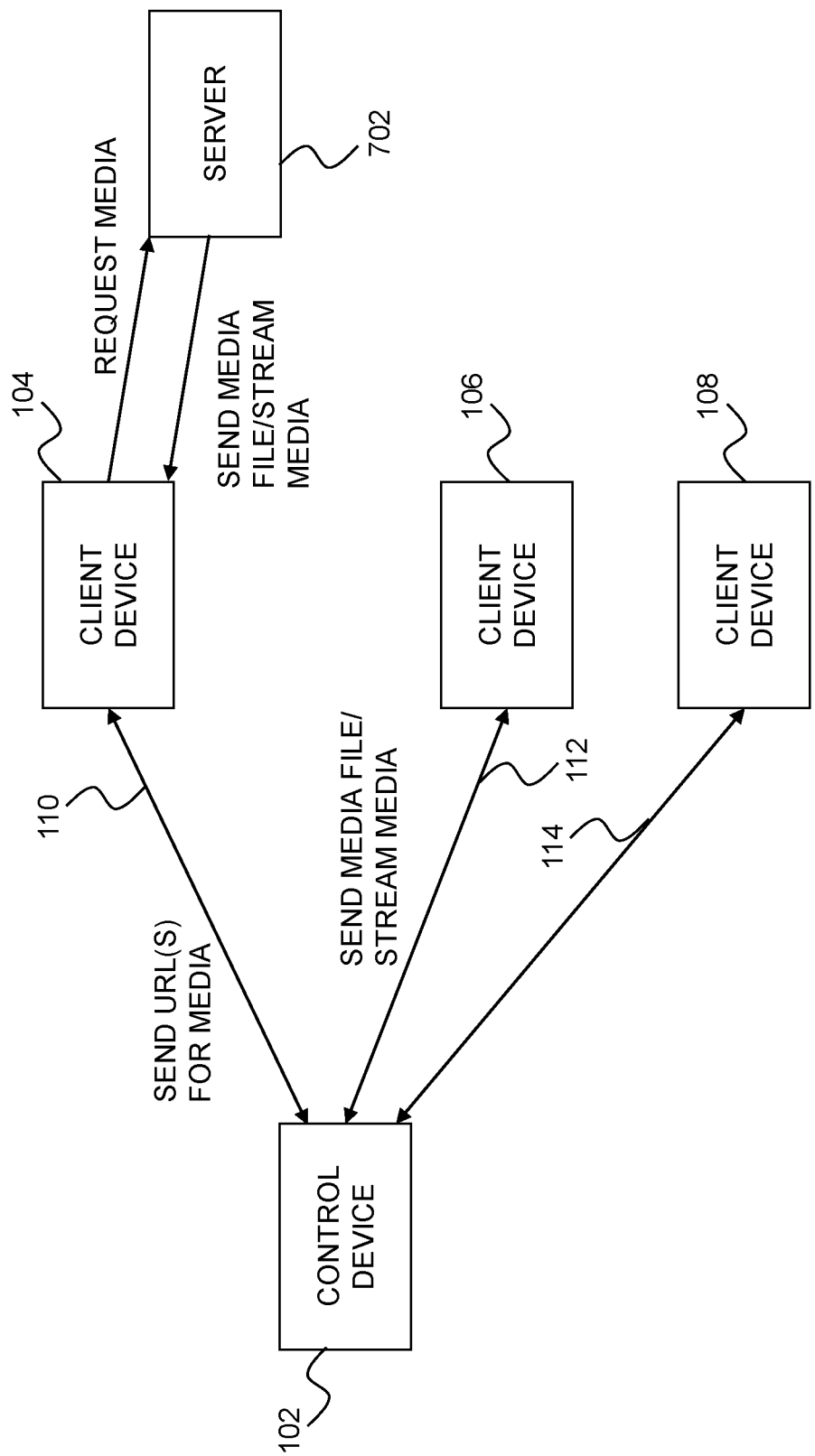

In FIG. 7E, the media is sent directly to the client device 106, and a URL is sent to the client device 104, which then retrieves the media from the server 702 using the URL. The client devices 104 and 106 may be in independent sessions with the control device 102 or may be in a conference call together. The media directly sent and represented by the URL may be identical or different.

Referring to FIG. 8, a flow chart illustrates one embodiment of a process 800 by which media may be sent during a period in which a communication session is on hold or to be placed on hold. In step 802, the control device 102 or a component of the communications framework 120 identifies that the current session has been placed on hold. In step 804, media options are provided to a user of the control device 102. In step 806, a media selection is received. In step 808, the media or URL is injected into the media session for delivery to the client device 104. In some embodiments, step 802 may occur after step 804, 806, or 808.

Referring to FIG. 9, a flow chart illustrates one embodiment of a process 900 by which media may be sent during a period in which a communication session is on hold or to be placed on hold. In step 902, the control device 102 or a component of the communications framework 120 identifies that the current session has been placed on hold. In step 904, media is automatically selected using a predefined priority list, a randomized selection process, or another method. In step 908, the media or URL is injected into the media session for delivery to the client device 104. In some embodiments, step 902 may occur after step 904 or 906.

Referring to FIG. 10, a flow chart illustrates one embodiment of a process 1000 by which previously sent media may have been fully consumed or a request may be received by the client device 104. In step 1002, the control device 102 or a component of the communications framework 120 detects that previously sent media has ended and/or receives a request for media from the client device 104. In step 1004, media is obtained as described with respect to steps 804 and 806 of FIG. 8 or step 904 of FIG. 9. In step 1006, the media or URL is injected into the media session for delivery to the client device 104. In some embodiments, step 1002 may occur after step 1004.

Figure 11:
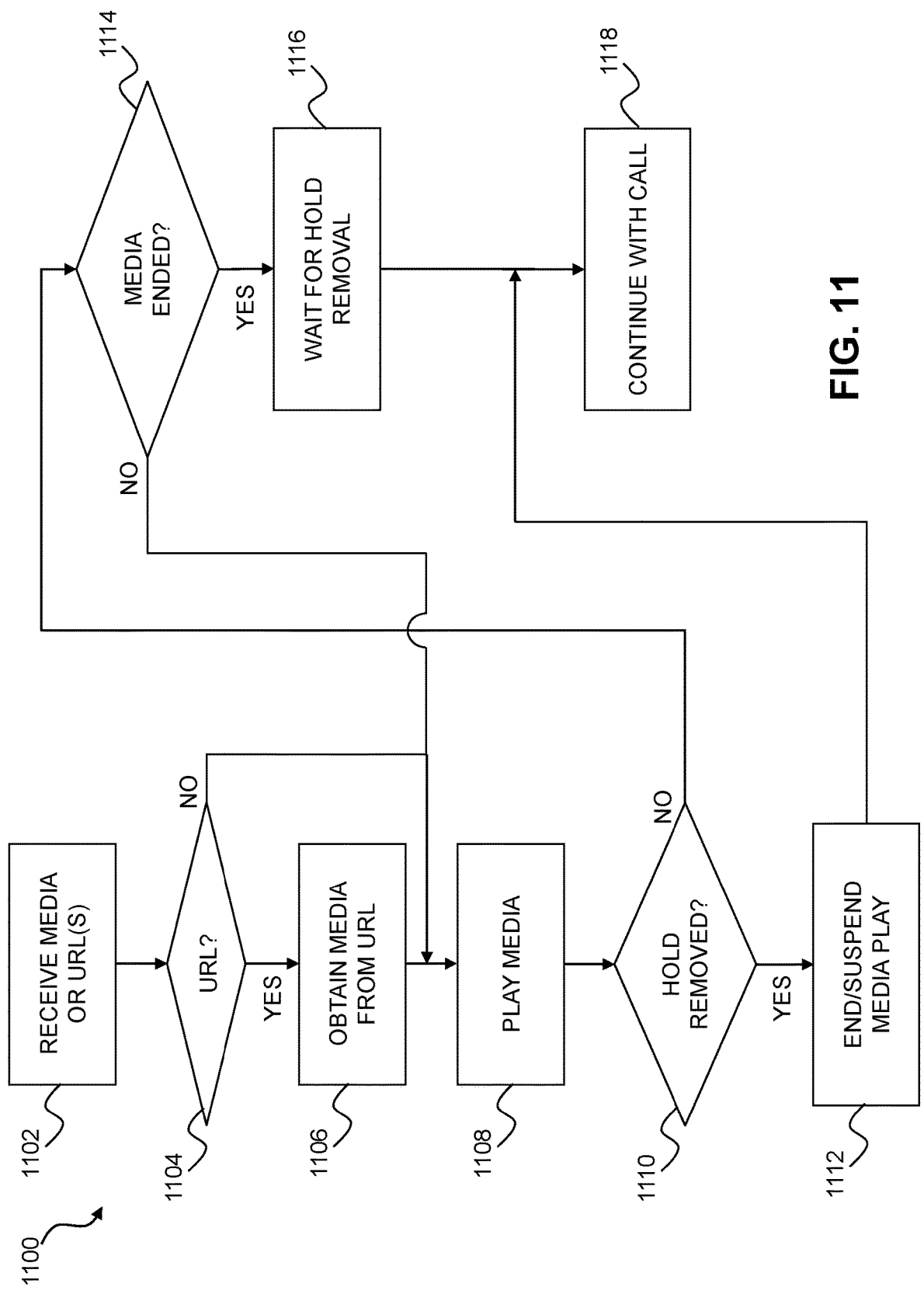
FIG. 11 is a flow chart illustrating an embodiment of a process that may be executed by a client device.

Referring to FIG. 11, a flow chart illustrates one embodiment of a process 1100 by which media may be received for use by the client device 104 during a period in which a communication session is on hold or to be placed on hold. In the present example, the session 110 has been placed on hold prior to step 1102, but the hold may be placed at any time before the execution of step 1110 in other embodiments.

In step 1102, media or a URL is received. Although not shown, an authorization step may be present in some embodiments that enables a user of the client device 104 to reject the media/URL. If this occurs, the method 1100 may move directly to step 1116. The following description of FIG. 11 assumes that authorization has occurred or was not needed.

If media is received in step 1102 as determined in step 1104, the method proceeds to step 1108 where the media is played. If a URL is received, the method 1100 moves to step 1106 to obtain the media before moving to step 1108. If the hold remains in place as determined in step 1110, the media may continue playing. It is understood that step 1110 may be an interrupt rather than a determination, in which case the media may play until an interrupt occurs.

If the hold is removed, the media is ended/suspended in step 1112 and the method 1100 moves to step 1118 where the call is continued. There may be a closing notice, such as a an audio or text "Thank you" as the media is being closed. If the hold remains, the method 1110 may determine if the media has ended (e.g., finished playing if a video or audio file). If the media has not ended, the method 1100 may return to step 1108 and continue playing the media. If the media has ended, the method 1100 waits for the removal of the hold in step 1116. Once the hold is removed, the call continues in step 1118. In some embodiments, the client device 104 may request additional media in following step 1114 or may receive additional media as indicated in FIG. 10.

In some embodiments described in the present disclosure, analytical data may be compiled. For example, if media is played while sessions are on hold, the media name, number of times the media is played, whether the media was paused or reversed for additional viewing, the control device that selected the media, and similar information may be compiled. Such data may be used to determine effectiveness of particular media, gauge interest, identify effectiveness or use patterns relative to other media, etc.

Figure 12A:
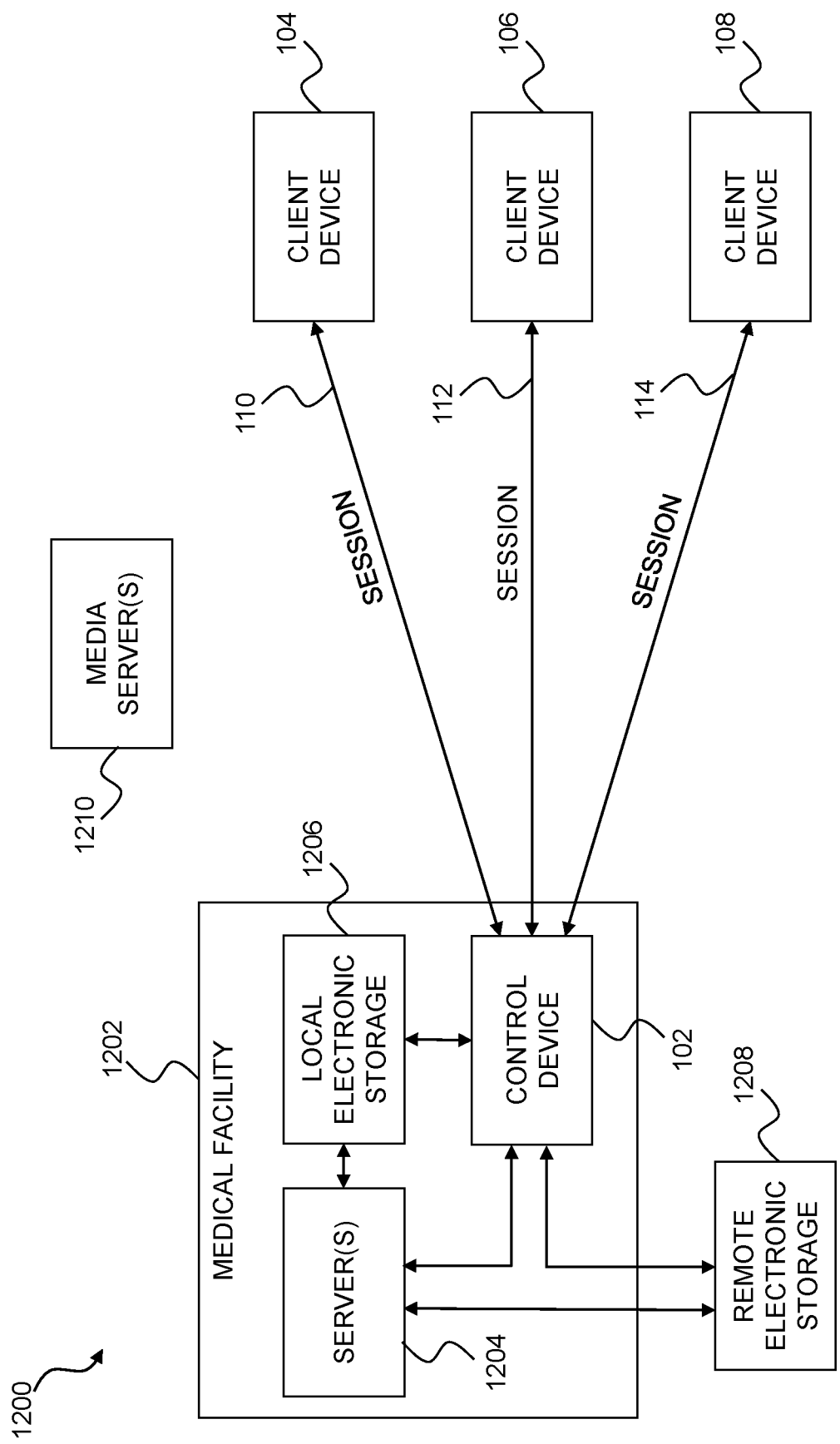
FIGS. 12A and 12B illustrate embodiments of a medical facility environment within which a control device may manage communication sessions with multiple client devices.

Referring to FIG. 12A, in one embodiment, the components of the environment 100 of FIG. 1A are illustrated in a medical environment 1200. Accordingly, the environment 1200 includes a medical facility 1202, which may be all or a portion of a hospital, clinic, doctor's office, and/or any other medical facility. It is understood that the medical facility 1202 may operate within a larger facility, such as a clinic located within a hospital or on a hospital's grounds. The medical facility 1202 may include or otherwise access a server 1204, a local electronic storage 1206 (e.g., a database), and/or a remote electronic storage 1208. In some embodiments, the server 1204 may incorporate one or both of the local/remote electronic storages 1206/1208 into the server. In other embodiments, the server 1204 may be located outside of the medical facility 1202, such as a server provided by a hospital for a clinic's use or a cloud based server.

The server 1204 may host at least some of the technology needed for the communications and virtual waiting room functionality to operate. For example, if the technological framework is a hybrid peer-to-peer system, the server 1204 may function as the server that performs operations needed for such a system as described in previously referenced U.S. Pat. Nos. 7,656,870; 7,623,516; 7,623,476; 7,933,260; 8,050,272; 8,218,444; 8,446,900; 8,694,587; 8,892,646; 9,027,032; and 9,356,997.

Figure 12B:
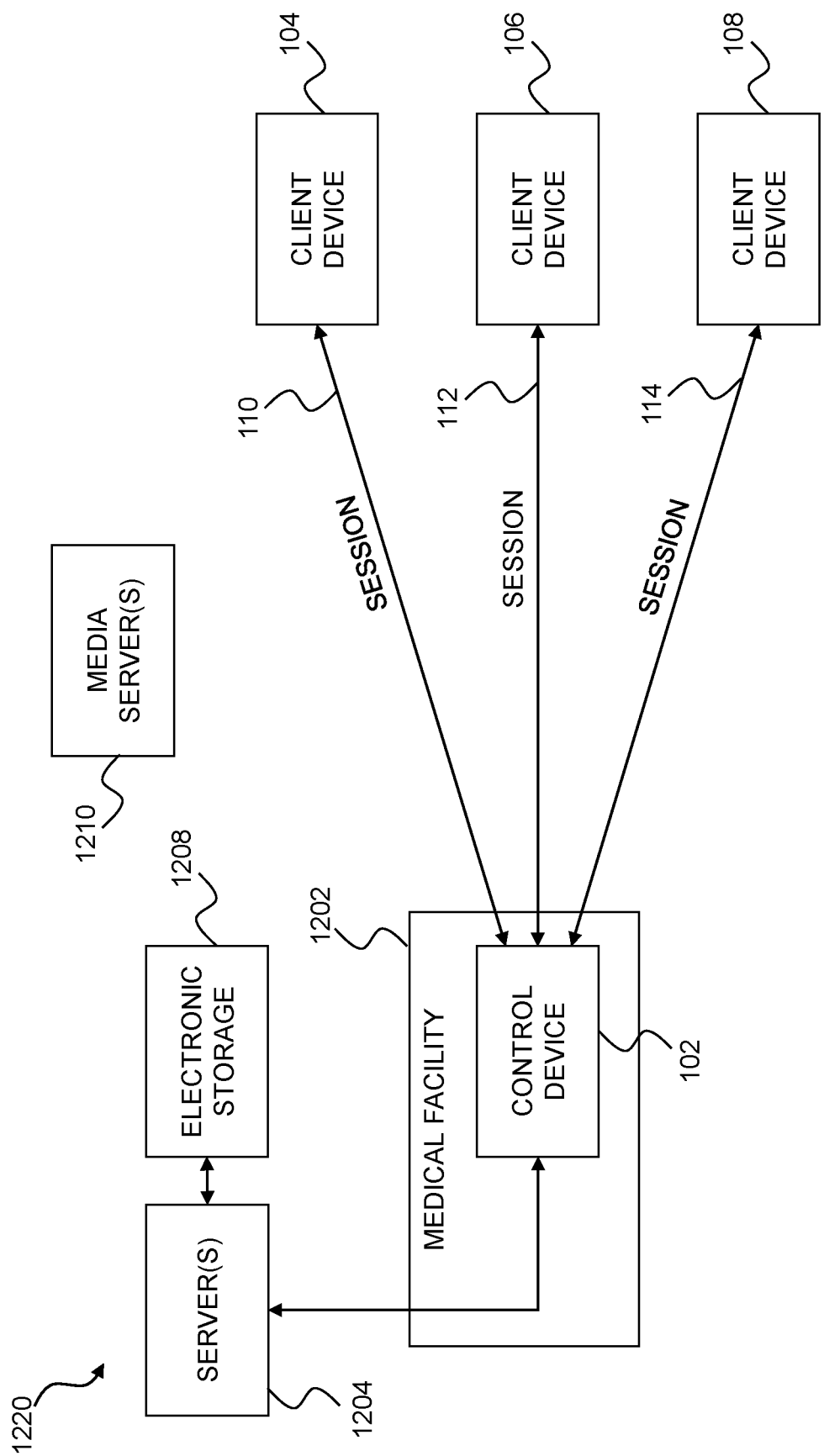

With additional reference to FIG. 12B, another embodiment of the medical environment 1200 is illustrated as an environment 1220. In this example, the server 1204 and electronic storage 1208 (which may be combined with or separate from the server 1204) are remote from the medical facility 1202. For example, the server 1204 and electronic storage 1208 may be provided via cloud services that are owned or leased by the medical facility 1202.

With respect to both FIGS. 12A and 12B, if the server 1204 and local/remote electronic storages 1206/1208 are under control of the medical facility 1202, oversight of legal and ethical considerations (e.g., compliance with the Health Insurance Portability and Accountability Act (HIPAA) and other applicable laws and ethical rules) may be simplified as third parties will not be in control or have access to any regulated information. It is noted that the server 1204 and electronic storage 1208 of FIG. 12B may be viewed as being under control of the medical facility as long as the medical facility personnel are the only ones to have access to the remote components and/or regulated information that is processed or stored by the server/electronic storage. In addition, as each session may be end-to-end encrypted for both signaling and media, sessions can be channeled through third-party servers without compromising private information.

If media is to be injected into a session while the session is active or on hold, a URL or list of URLs may be provided to the server 1204, one or both of the electronic storages 1206/1208, and/or to the control device 102. This avoids the need to store the media within the medical facility, although such storage may be used for at least some of the media in some embodiments. Media may also be stored on a remote server 1210 that may or may not be associated with the medical facility 1202.

In some embodiments, the control device 102 may not be located within the medical facility some or all of the time. For example, if the control device 102 is a tablet, a doctor within the medical facility may use the tablet from home. In other embodiments, the control device 102 may be limited in functionality based on a geofence, time parameters, and/or other restrictions.

The previously described functionality and interfaces may be directed to the medical environment 1200. For example, the control device 102 may be associated with a doctor, a nurse practitioner, or other medical personnel (all personnel may be generally referred to herein as "doctor" for purposes of illustration). The client devices 104, 106, and 108 may be associated with patients of the doctor. The sessions 110, 112, and 114 are to remain separate as each may involve the transfer of confidential and sensitive health data in the form of verbal and visual communications, text chat, documents, images (e.g., CAT scans and X-rays), etc.

As described previously, additional client devices may be added to a session in a conference call if desired. For example, if the patient is a minor, a parent or guardian may be present. Family members, friends, other medical personnel (e.g., specialists), and/or other individuals may be added to a session. If needed, consent forms may be sent to users of client devices to ensure that proper documentation procedures are followed, just as they would be for in-office visits. Accordingly, by sending and receiving online forms, scans or images of signatures, and similar electronic documents, the present disclosure enables established procedures to be maintained even in virtual consultations.

Reminders may be used if documents are needed, or functionality may be blocked until certain steps are taken. For example, audio and video may not be available to a client device unless a consent form is received. It is understood that such constraints are customizable and may not be required unless desired. Patient education (PE) information, advertisements, and other information may be sent to the client devices as described in previous embodiments, either directly (e.g., as shown in FIG. 7A) or indirectly (e.g., as shown in FIG. 7B).

Figure 12C:
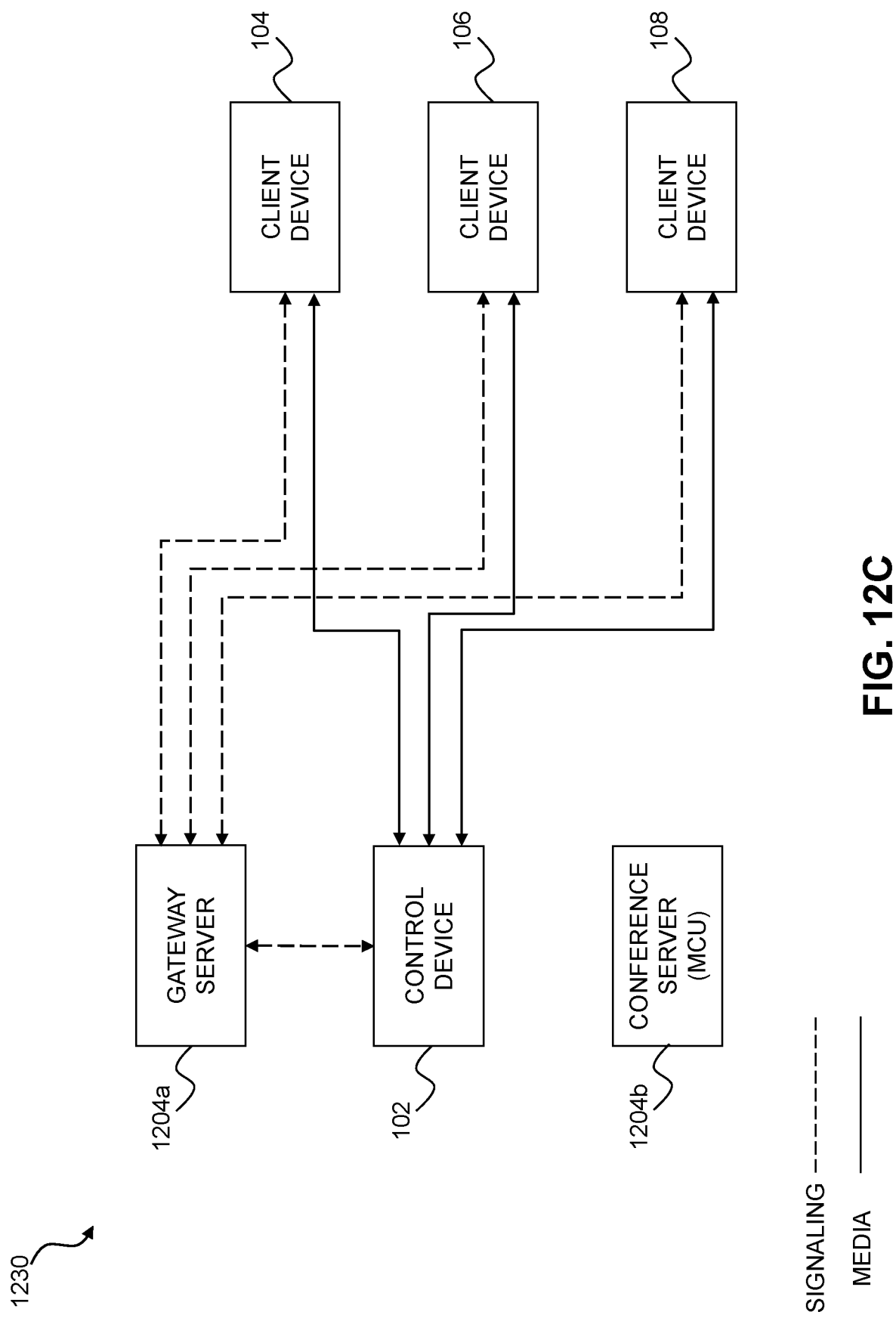
FIGS. 12C and 12D illustrate embodiments of FIGS. 1A-1C, 12A, and 12B that use one or more servers for conference calls.

Referring to FIG. 12C, one embodiment of an environment 1230 illustrates components of the environments 1200 (FIG. 12A) and 1220 (FIG. 12B), although it is understood that the components of the environment 1230 may be used in any many different implementations of the present disclosure. In the present example, the server 1204 is represented by a gateway server 1204a and a conference server 1204b, which may include a multipoint control unit (MCU) designed to facilitate conference calls. In other embodiments, the functionality of the servers 1204a and 1204b may be performed by a single server, in which case only the single server would be present. In the present example, the control device 102 is in one-to-one sessions (e.g., an active call, on hold, or waiting) with each of the client devices 104, 106, and 108. Accordingly, the conference server 1204b is not needed. The gateway server 1204a handles signaling for the control device and client devices, while media moves directly between the control device 102 and each client device.

Figure 12D:
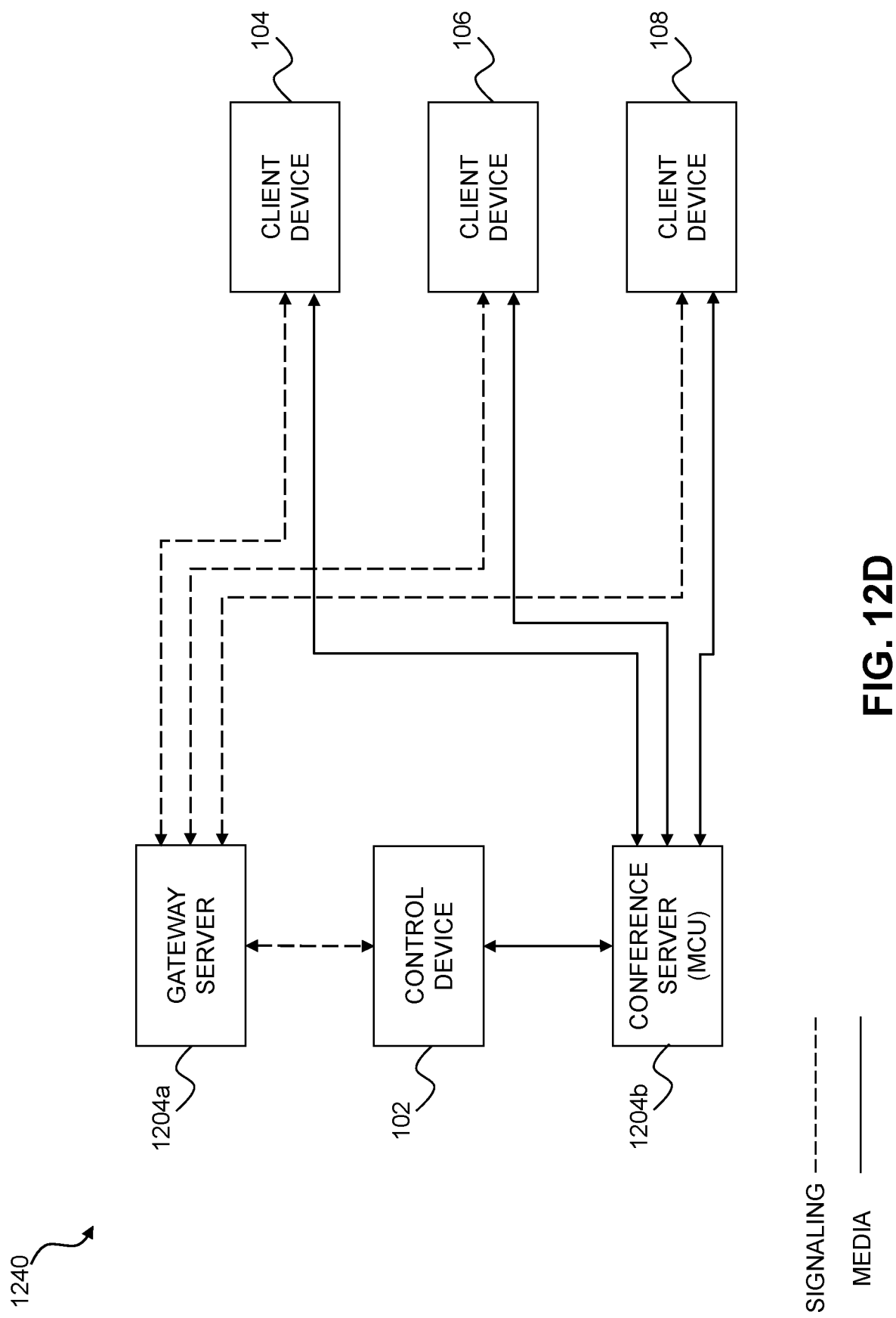

Referring to FIG. 12D, one embodiment of an environment 1240 illustrates the components of the environment 1230 in a conference call scenario. The control device 102 is involved in a conference call with the client devices 104, 106, and 108. The gateway server 1204a handles signaling for the control device and client devices, while media moves between the control device and client devices through the conference server 1204b.

FIGS. 13A-17F are embodiments of sequence diagrams illustrating various processes that may be executed within the environments of FIG. 1A, 1B, and 12A-12D. Although the particular examples of FIGS. 13A-17F may contain details relevant specifically to the medical environment 1200 of FIGS. 12A and 12B (e.g., references to doctors, patients, patient education material, and other medical oriented terminology), the various steps may be applied to many different environments, including sessions between consultants and clients, teachers and students, and salespeople and customers.

It is understood that the sequence diagrams described herein illustrate various exemplary functions and operations that may occur within various communication environments. It is understood that these diagrams are not exhaustive and that various steps may be excluded from the diagrams to clarify the aspect being described. For example, it is understood that some actions, such as network authentication processes and notifications, may have been performed prior to the first step of a sequence diagram. Such actions may depend on the particular type and configuration of a particular device, including how network access is obtained (e.g., cellular or WLAN access). Other actions may occur between illustrated steps or simultaneously with illustrated steps, including network messaging for call maintenance (including handoffs), communications with other devices (e.g., email, text messages, and/or voice calls (including conference calls)), and similar actions. In addition, is it understood that single messages may be illustrated or described, and such messages may actually represent a series of messages.

Referring to FIGS. 13A-13D, one embodiment of a sequence diagram illustrates a process 1300 by which the control device 102 (representing a doctor) within the medical environment of FIGS. 12A and 12B may communicate with client devices 104 (representing a first patient) and 106 (representing a second patient) in separate sessions. It is understood that some steps (such as file sharing or screen sharing) may occur at different times than those illustrated in FIGS. 13A-13D (or not at all), and that such steps are included to show how general message flows for various features may be incorporated.

For purposes of simplicity in this and following embodiments, the control device 102 may be hosting or otherwise providing the waiting room. In embodiments where a separate device or server is providing the waiting room (e.g., the gateway server 1204a of FIGS. 12C and 12D), additional messages would be passed between the control device 102 and the hosting device/server with information about waiting patients, etc., and client devices would interact with the hosting device/server as needed.

Figure 13A:
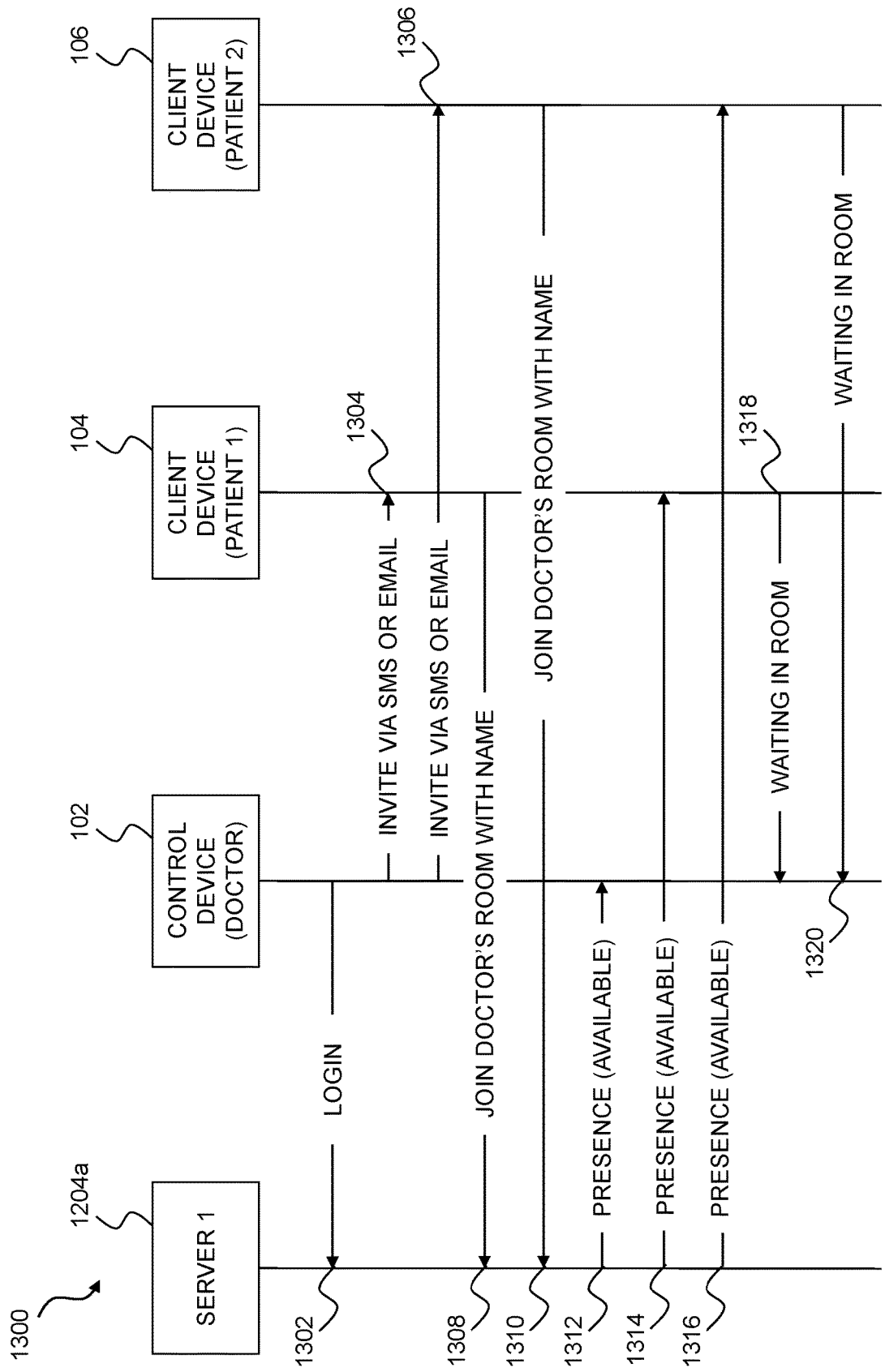
FIGS. 13A-17F are embodiments of sequence diagrams illustrating various processes that may be executed within the environments of FIGS. 1A, 1B, and 12A-12F.

Referring specifically to FIG. 13A, in step 1302, the control device 102 logs into a server 1204, which is the server 1204 of FIG. 12A or 12B in the present example. In steps 1304 and 1306, respectively, the control device 102 sends an invitation to the client devices 104 and 106 via email, SMS, or other communication channels. In steps 1308 and 1310, respectively, the client devices 104 and 106 join the doctor's waiting room (which may be specific to the doctor or may be a general waiting room in the medical facility). In step 1312, the server 1204 notifies the control device 102 of the available status of the client devices 104 and 106. In steps 1314 and 1316, respectively, the server 1204 notifies the client devices 104 and 106 of the available status of the control device 102. In steps 1318 and 1320, respectively, the client devices 104 and 106 notify the control device 102 that they are in the waiting room.

Figure 13B:
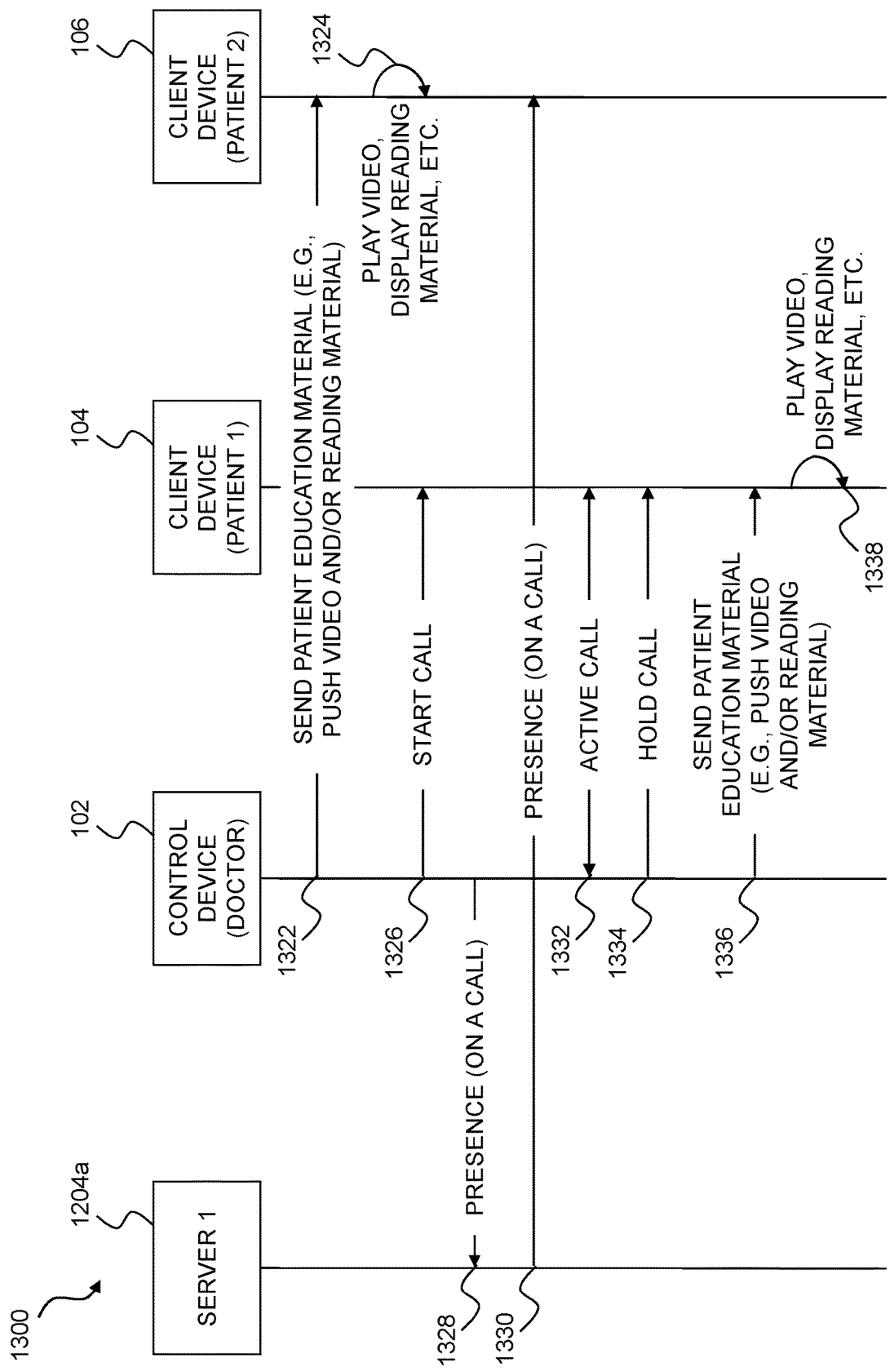

Referring specifically to FIG. 13B, in step 1322, the control device 102 sends patient education material to the client device 106, which the client device 106 displays to its user in step 1324. As this process has been described in previous embodiments, it is not further detailed here. In step 1326, the control device 102 starts a session (e.g., an audio or video call) with the client device 104. In step 1328, the control device 102 notifies the server 1204 that it is on a call, and the server 1204 updates the control device's status to the client device 106 in step 1330. At this time, there is an active call between the control device 102 and the client device 104 as indicated by step 1332. In step 1334, the control device 102 places the active call with the client device 104 on hold. In step 1336, the control device 102 sends patient education material to the client device 104, which the client device 104 displays to its user in step 1338.

Figure 13C:
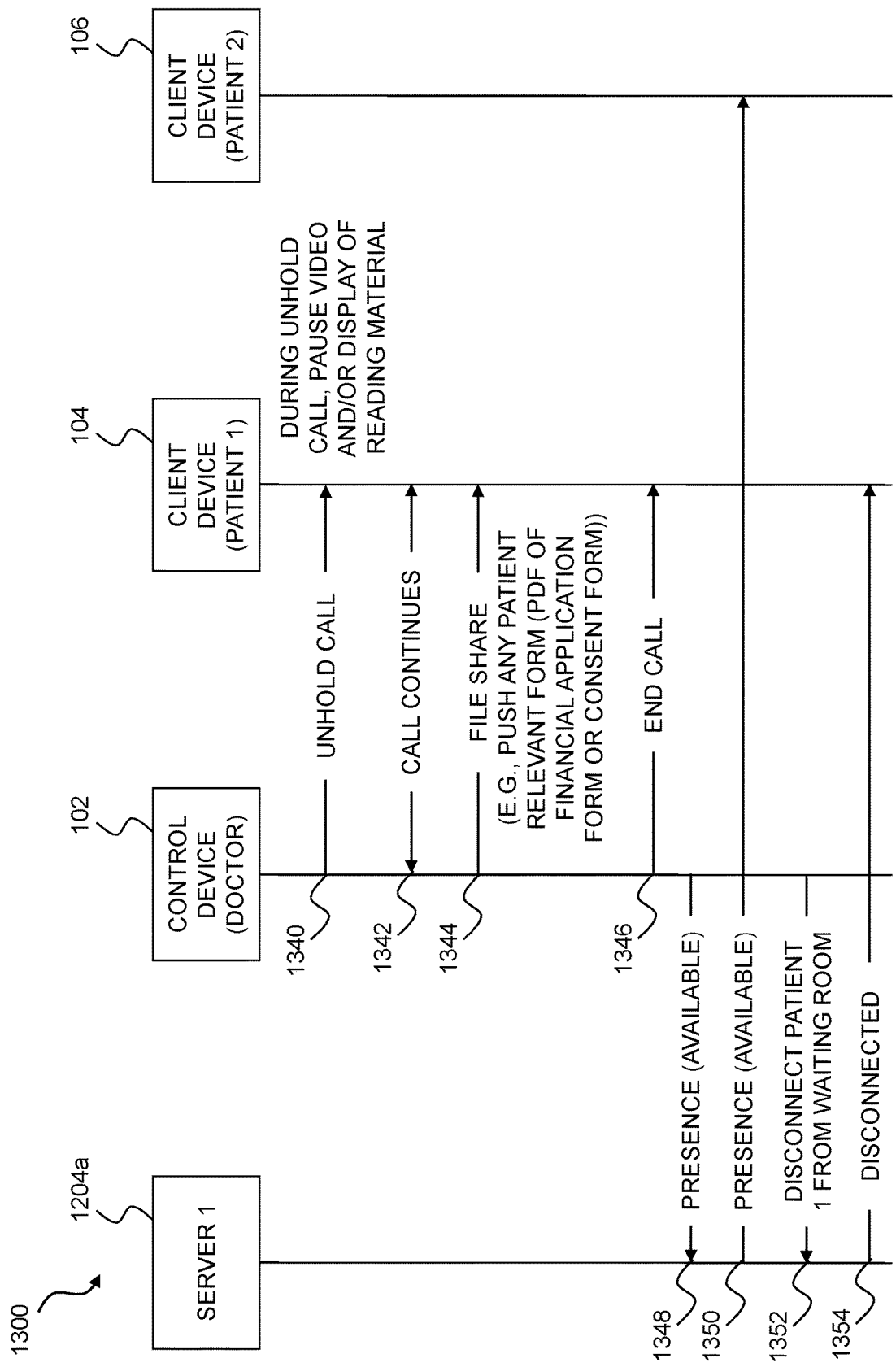

Referring specifically to FIG. 13C, in step 1340, the control device 102 removes the hold on the call with the client device 104. When the hold is removed, the display of the media sent to the client device 104 in step 1336 may be paused or otherwise suspended. At this time, the active call between the control device 102 and the client device 104 continues as indicated by step 1342. In step 1344, the control device 102 shares one or more files with the client 104 during the active call. In step 1346, the active call between the control device 102 and the client device 104 is ended. In step 1348, the control device 102 updates its status with the server 1204 as available, and the server 1204 notifies the client device 106 of the updated status in step 1350. In step 1352, the control device 102 instructs the server 1204 to disconnect the client device 104 from the waiting room, and the server 1204 notifies the client device 104 of the disconnection in step 1354.

Figure 13D:
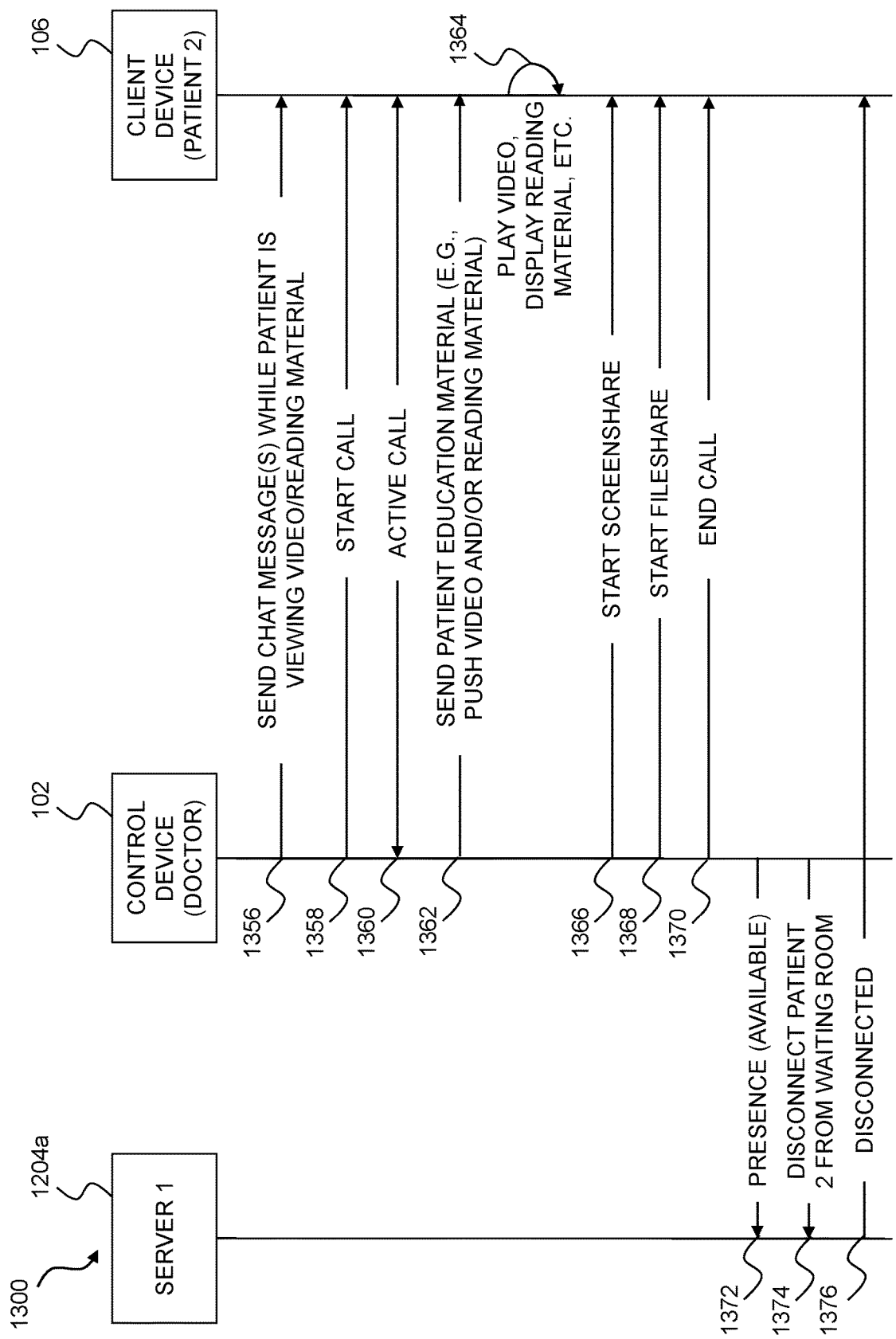

Referring specifically to FIG. 13D, in step 1356, the control device 102 sends a chat message to the client device 106 while the client device is displaying the media. For example, the chat message may inform the user of the client device that the doctor is now ready or will be ready in a particular amount of time (e.g., five minutes). In step 1358, the control device 102 starts the call with the client device 106. At this time, there is an active call between the control device 102 and the client device 106 as indicated by step 1360. In step 1362, the control device 102 sends patient education material to the client device 106 during the active call, which the client device 106 displays to its user in step 1364. In step 1366, the control device 102 shares its screen with the client 106 during the active call. In step 1368, the control device 102 shares one or more files with the client 106 during the active call.

In step 1370, the active call between the control device 102 and the client device 106 is ended. In step 1372, the control device 102 updates its status with the server 1204 as available. In step 1374, the control device 102 instructs the server 1204 to disconnect the client device 106 from the waiting room, and the server 1204 notifies the client device 106 of the disconnection in step 1376.

Figure 14A:
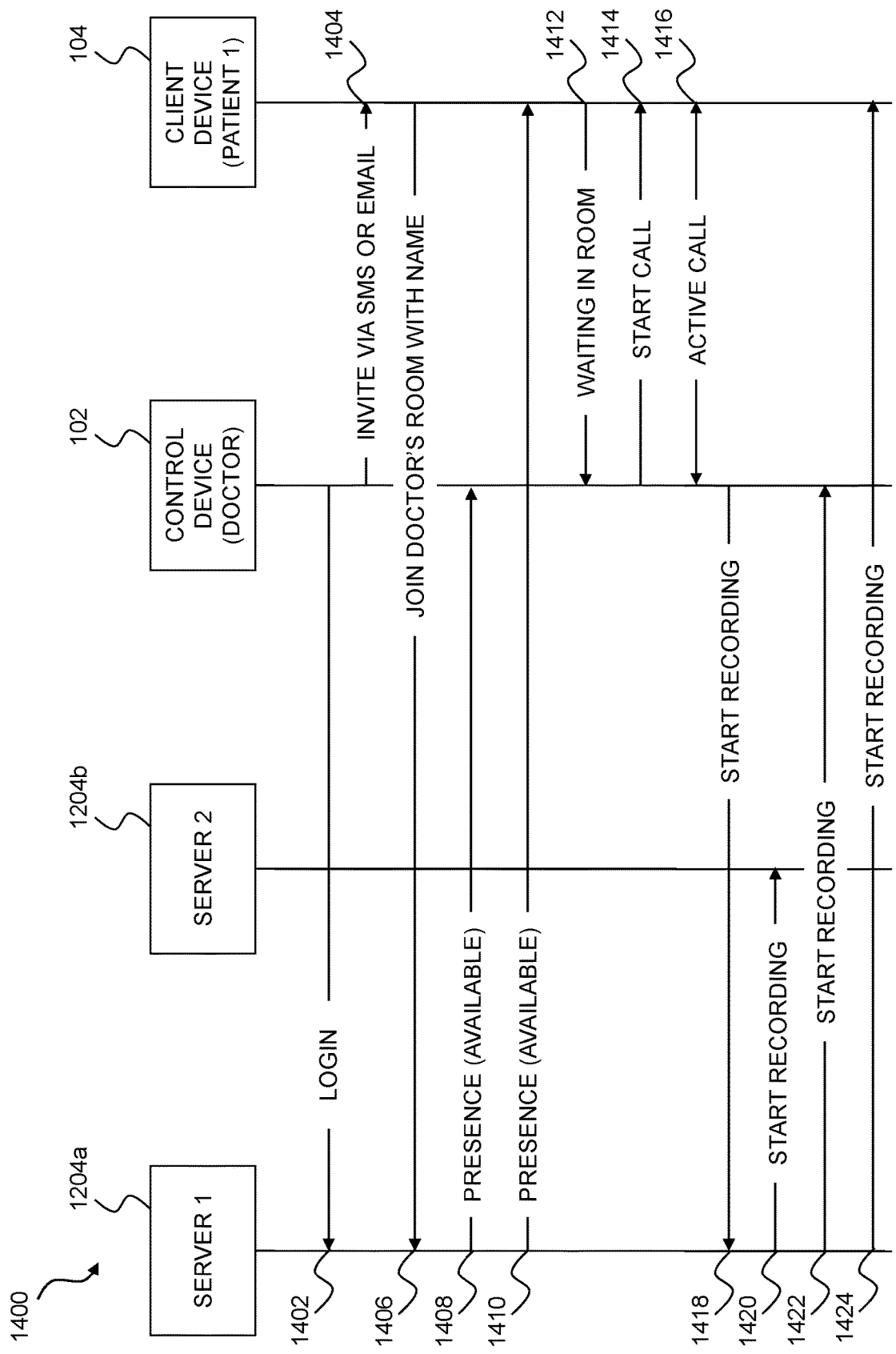
Figure 14B:
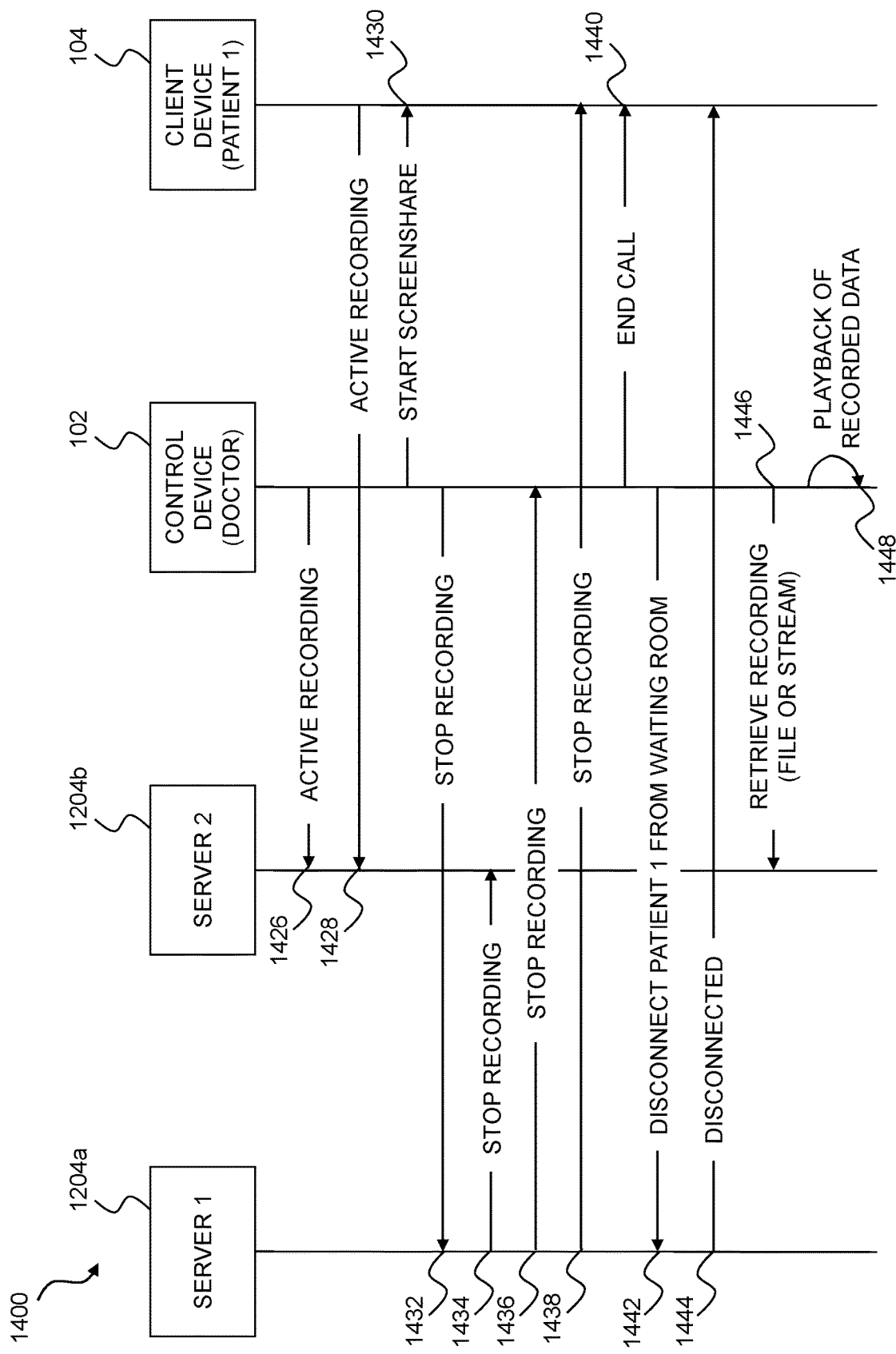

Referring to FIGS. 14A and 14B, one embodiment of a sequence diagram illustrates a process 1400 by which the control device 102 (representing a doctor) within the medical environment of FIGS. 12A and 12B may communicate with client devices 104 (representing a first patient) and 106 (representing a second patient) in separate sessions. It is understood that some steps (such as file sharing or screen sharing) may occur at different times than those illustrated in FIGS. 14A and 14B (or not at all), and that such steps are included to show how general message flows for various features may be incorporated.

Referring specifically to FIG. 14A, in step 1402, the control device 102 logs into a server 1204a, which is the server 1204 of FIG. 12A or 12B in the present example. In step 1404, the control device 102 sends an invitation to the client device 104 via email, SMS, or another communication channel. In step 1406, the client device 104 joins the doctor's waiting room (which may be specific to the doctor or may be a general waiting room in the medical facility). In step 1408, the server 1204a notifies the control device 102 of the available status of the client device 104. In step 1410, the server 1204a notifies the client device 104 of the available status of the control device 102. In step 1412, the client device 104 notifies the control device 102 that it is in the waiting room. In step 1414, the control device 102 begins a call session with the client device 104. At this time, there is an active call between the control device 102 and the client device 104 as indicated by step 1416.

In step 1418, the control device 102 notifies the server 1204a to begin recording. In step 1420, the server 1204a instructs the server 1204b (which may be the same server as the server 1204a or a different server) to set up a recording session for the control device 102 and the client device 104. In steps 1422 and 1426, respectively, the server 1204a sends a start recording message to the control device 102 and client device 104 to begin recording. This message may contain information needed to send data to the server 1204b.

Referring specifically to FIG. 14B, in steps 1426 and 1428, respectively, the control device 102 and the client device 104 send session media to the server 1204b to be recorded. In step 1530, the control device 102 shares its screen with the client device 104, which may happen many different times during the call. In step 1432, the control device 102 notifies the server 1204a to stop recording. In step 1434, the server 1204a instructs the server 1204b to stop the recording session. In steps 1436 and 1438, respectively, the server 1204a sends a stop recording message to the control device 102 and client device 104.

In 1440, the active call between the control device 102 and the client device 104 is ended. Although not shown, the control device 102 may update its status with the server 1204a as available. In step 1442, the control device 102 instructs the server 1204a to disconnect the client device 104 from the waiting room, and the server 1204a notifies the client device 104 of the disconnection in step 1444. In step 1446, the control device 102 may retrieve the recording from the server 1204b and play back the session in step 1448.

Referring to FIGS. 15A-15F, one embodiment of a sequence diagram illustrates a process 1500 by which the control device 102 (representing a doctor) within the medical environment of FIGS. 12A and 12B may communicate with client devices 104 (representing a first patient) and 106

(representing a second patient) in a conference call. It is understood that some steps (such as file sharing or screen sharing) may occur at different times than those illustrated in FIGS. 15A-15F (or not at all), and that such steps are included to show how general message flows for various features may be incorporated.

Figure 15A:
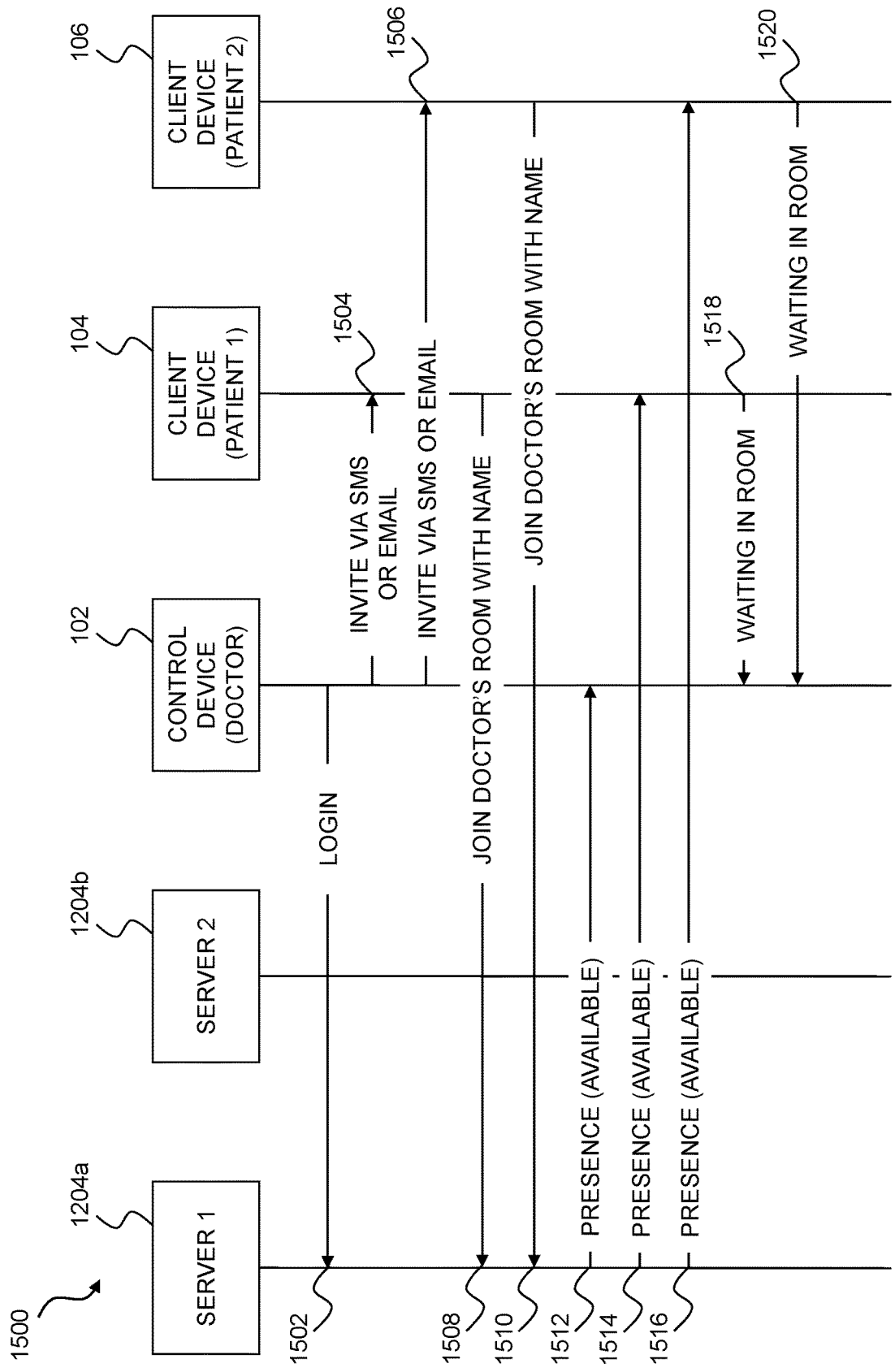

Referring specifically to FIG. 15A, in step 1502, the control device 102 logs into a server 1204a, which is the server 1204a of FIGS. 12C and 12D in the present example. In steps 1504 and 1506, respectively, the control device 102 sends an invitation to the client devices 104 and 106 via email, SMS, or other communication channels. In steps 1508 and 1510, respectively, the client devices 104 and 106 join the doctor's waiting room (which may be specific to the doctor or may be a general waiting room in the medical facility). In step 1512, the server 1204a notifies the control device 102 of the available status of the client devices 104 and 106. In steps 1514 and 1516, respectively, the server 1204a notifies the client devices 104 and 106 of the available status of the control device 102. In steps 1518 and 1520, respectively, the client devices 104 and 106 notify the control device 102 that they are in the waiting room.

Figure 15B:
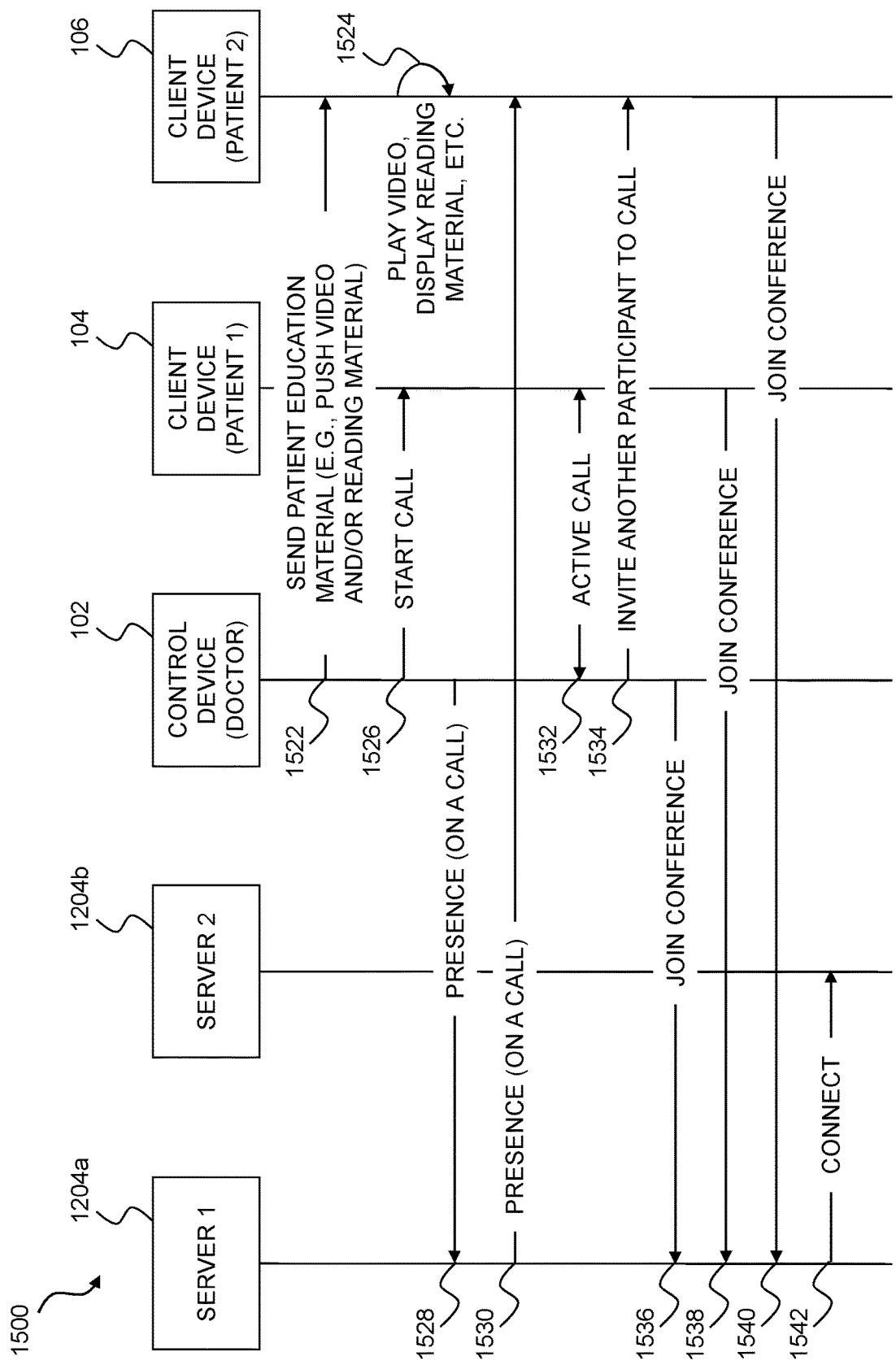

Referring specifically to FIG. 15B, in step 1522, the control device 102 sends patient education material to the client device 106, which the client device 106 displays to its user in step 1524. As this process has been described in previous embodiments, it is not further detailed here. In step 1526, the control device 102 starts a session (e.g., an audio or video call) with the client device 104. In step 1528, the control device 102 notifies the server 1204a that it is on a call, and the server 1204a updates the control device's status to the client device 106 in step 1530. At this time, there is an active call between the control device 102 and the client device 104 as indicated by step 1532.

In step 1534, the control device 102 invites the client device 106 to join the ongoing call of step 1532. However, the control device 102 does not host the conference call itself and so sends a message to the server 1204a that it is joining a conference call. The message may include the identify of the other participants (e.g., the client devices 104 and 106) and may serve as an instruction to the server 1204a to set up the call. In steps 1540 and 1542, respectively, the client devices 104 and 106 send messages to the server 1204a to join the conference call. In step 1542, the server 1204a connects to a server 1204b, which is the server 1204b of FIGS. 12C and 12D in the present example.

Figure 15C:
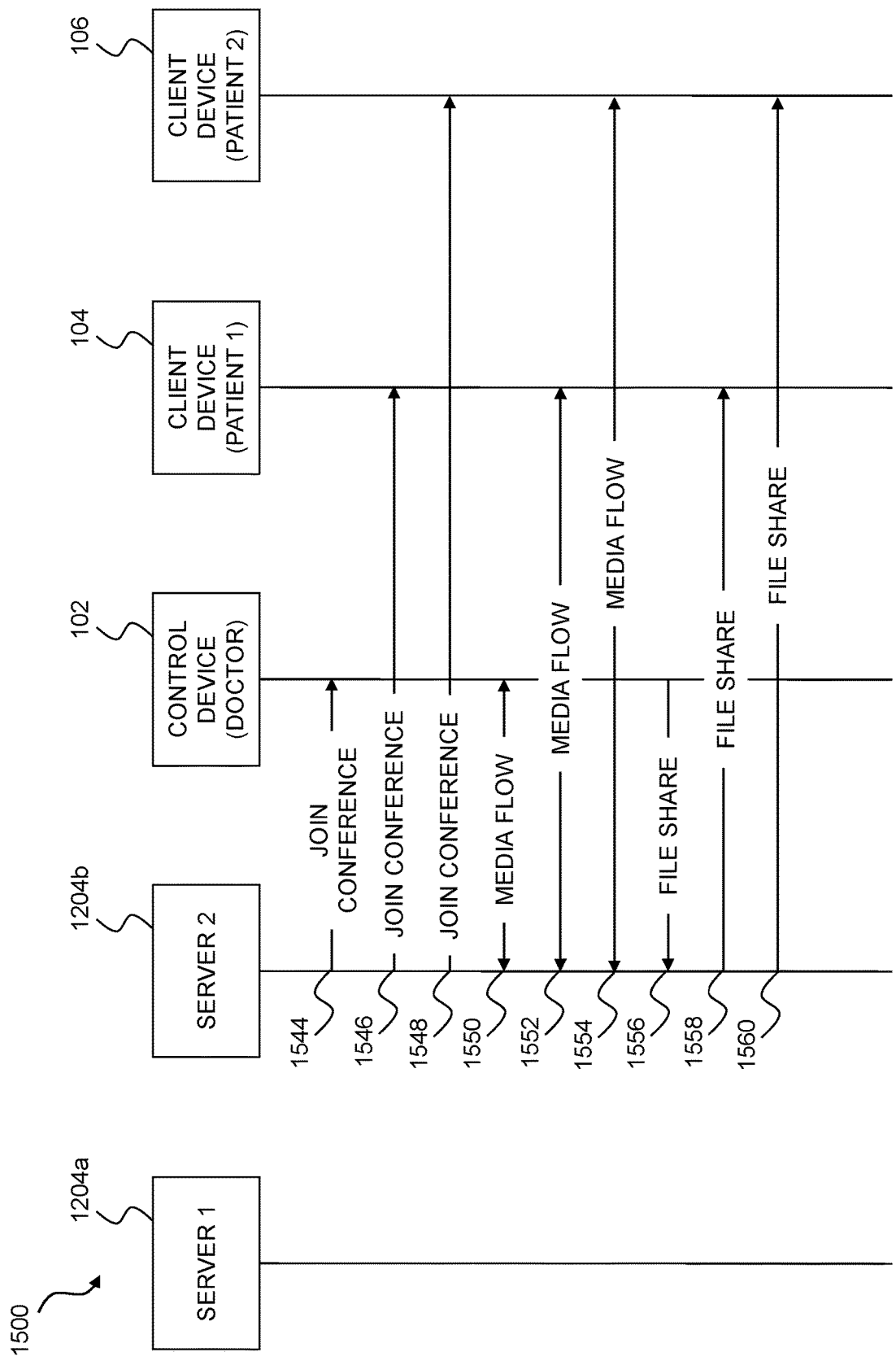

Referring specifically to FIG. 15C, in steps 1544, 1546, and 1548, the server 1204b joins the control device 102, client device 104, and client device 106 in a conference call. As the server 1204b manages the media for the conference call, media for the call (e.g., audio and/or video) flows between the server 1204b and each of the control device 102, client device 104, and client device 106 as shown by arrows 1550, 1552, and 1554, respectively. File sharing data also flows between the server 1204b and each of the control device 102, client device 104, and client device 106 as shown by arrows 1556, 1558, and 1560, respectively.

Figure 15D:
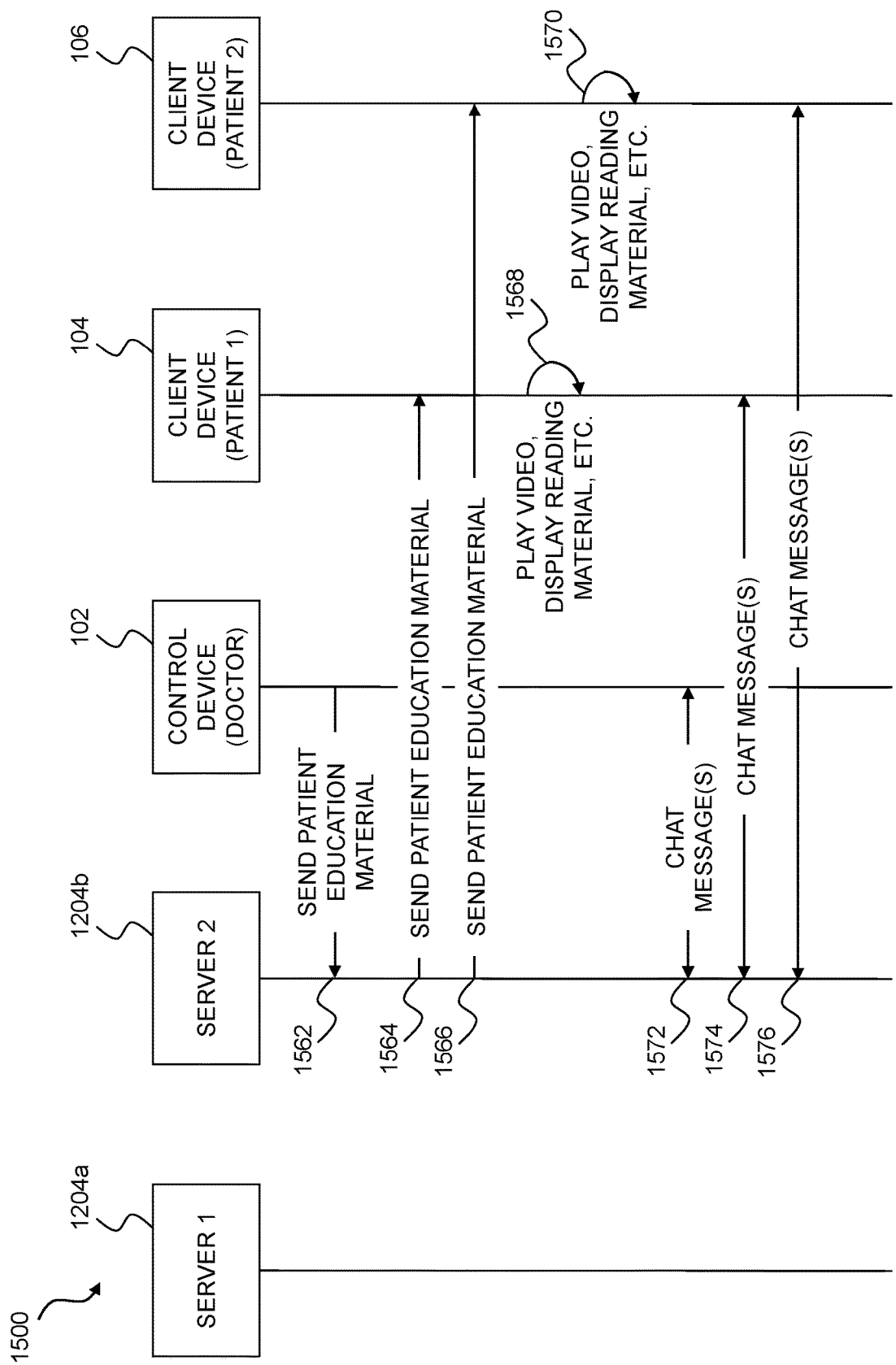

Referring specifically to FIG. 15D, in step 1562, the control device 102 may send patient education material to the server 1204b, which then sends the material to the client devices 104 and 106 in steps 1564 and 1566, respectively. The client 104 displays the material to its user in step 1568 and the client device 106 displays the material to its user in step 1570. Chat messages also flow between the server 1204b and each of the control device 102, client device 104, and client device 106 as shown by arrows 1572, 1574, and 1576, respectively.

Figure 15E:
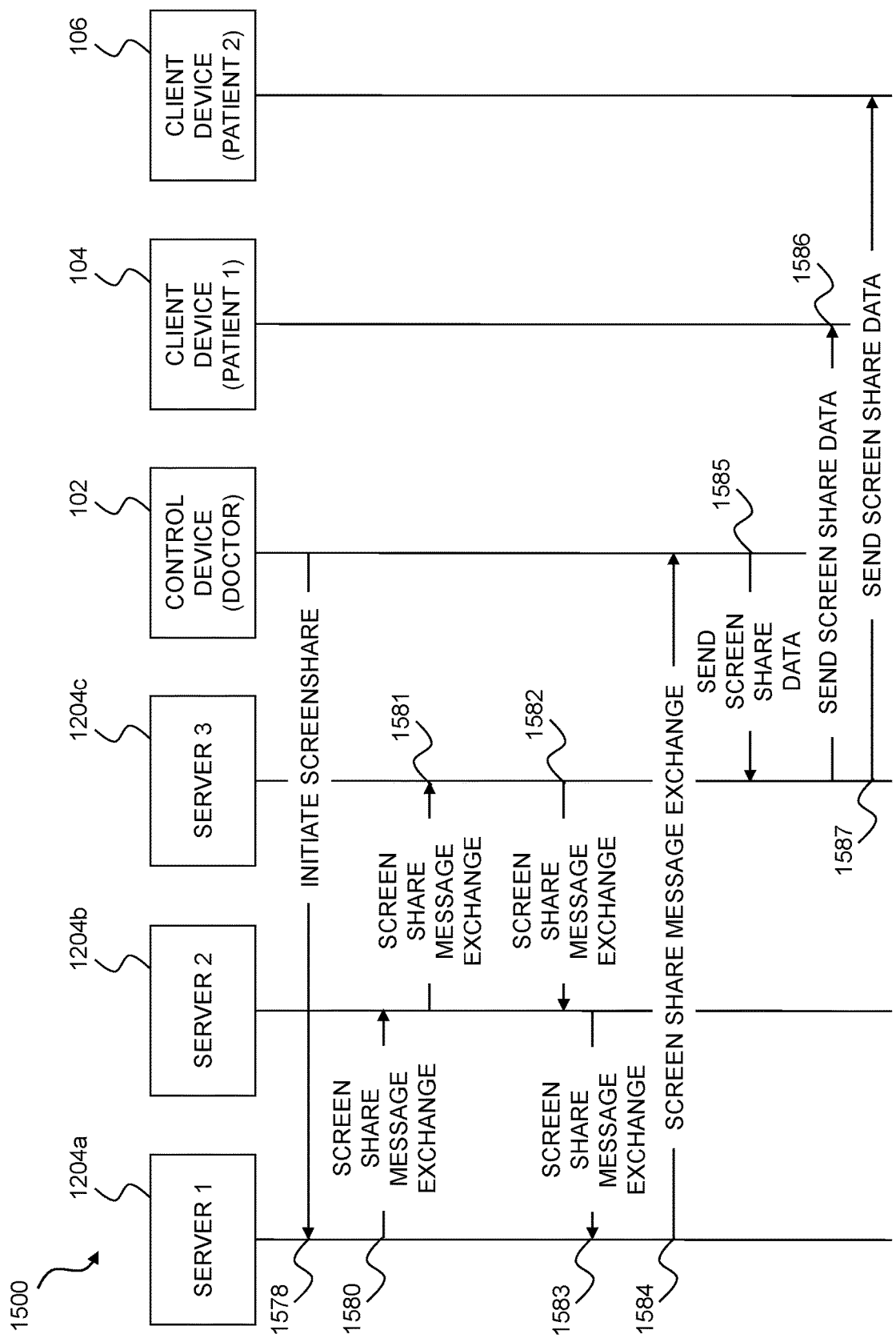

Referring specifically to FIG. 15E, in step 1578, the control device 102 may initiate screen sharing to share its screen with the client devices 104 and 106. In the present example, screensharing uses a third server 1204c, but this server may be combined with the server 1204b in other embodiments as shown, for example, in FIG. 15G. In step 1580, the server 1204a notifies the server 1204b of the screenshare, and the server 1204b (which is handling the conference call) sends a message to the server 1204c to set up the screenshare in step 1581. In step 1582, the server 1204c sends a message to the server 1204b with screenshare session information, and the server 1204b passes this information to the server 1204a in step 1583. In step 1584, the server 1204a sends the screenshare information to the control device 102. In step 1585, the control device 102 sends screen share data to the server 1204c, and the server 1204c sends the data to the client devices 104 and 106 in steps 1586 and 1587, respectively.

Figure 15F:
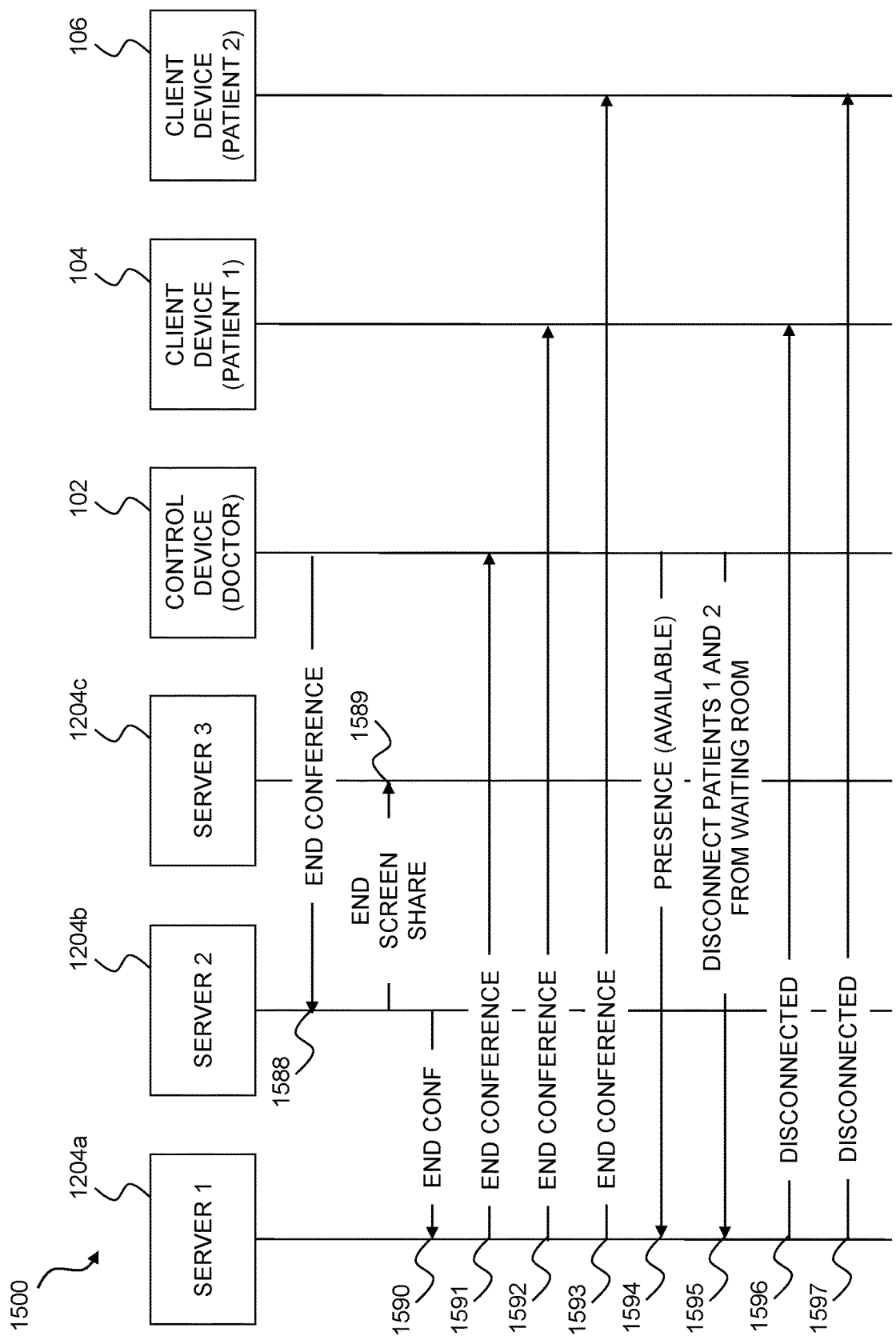

Referring specifically to FIG. 15F, in step 1588, the control device 102 instructs the server 1204b to end the conference call. The server 1204b instructs the server 1204c to end the screenshare session in step 1589 and sends a message to the server 1204a that the conference call is being ended in step 1590. In steps 1591-1593, respectively, the server 1204a notifies the control device 102, the client device 104, and the client device 106 that the conference is over. In step 1594, the control device 102 indicates to the server 1204a that it is available. In step 1595, the control device 102 instructs the server 1204a to disconnect the client devices 104 and 106 from the waiting room. The server 1204a notifies the client devices 104 and 106 of the disconnection in steps 1596 and 1597, respectively.

Figure 15G:
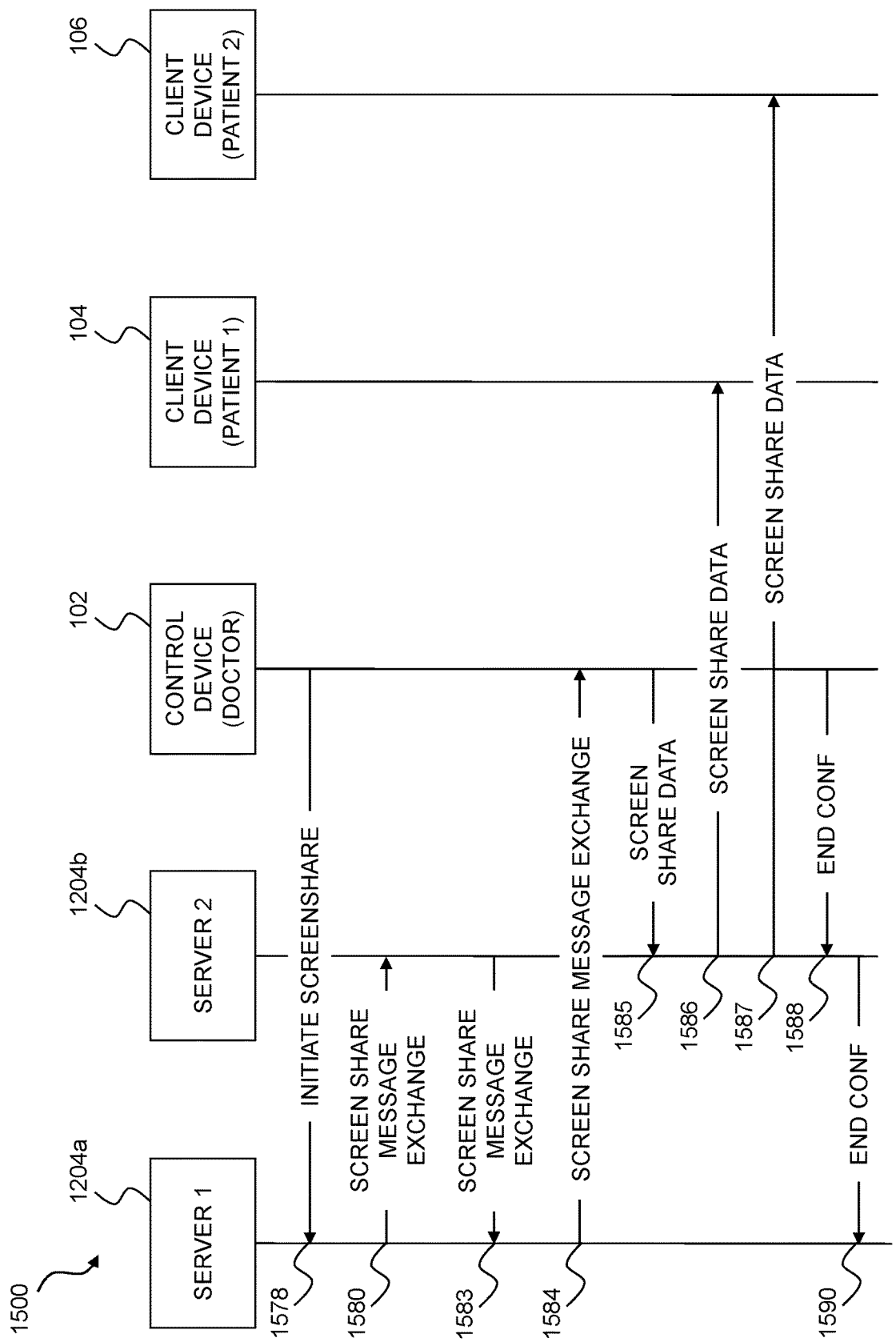

Referring to FIG. 15G, an alternate embodiment of some steps of FIGS. 15E and 15F is illustrated with the servers 1204b and 1204c combined into a single server 1204b. Accordingly, FIG. 15G illustrates the initiation of the screenshare in step 1578 (FIG. 15E) through the ending of the conference call in step 1590 (FIG. 15F) using the single server 1204b. As shown, steps 1581, 1582, and 1589 of FIGS. 15E and 15F are omitted, and other steps (e.g., steps 1585-1587) involve the server 1204b. It is understood that steps similar or identical to steps 1581, 1582, and 1589 may still occur internally within the architecture of the server 1204b.

Figure 16A:
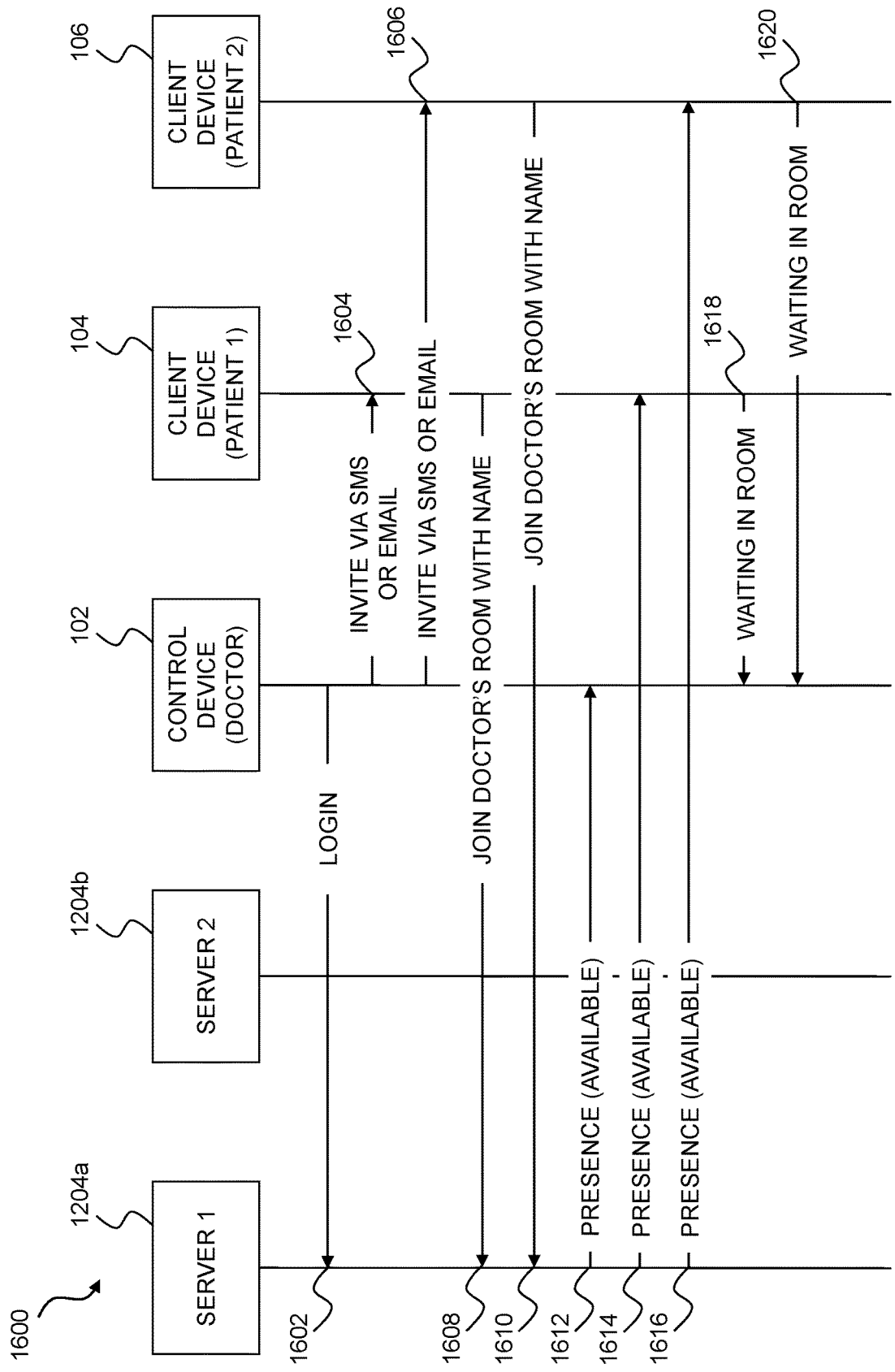
Figure 16B:
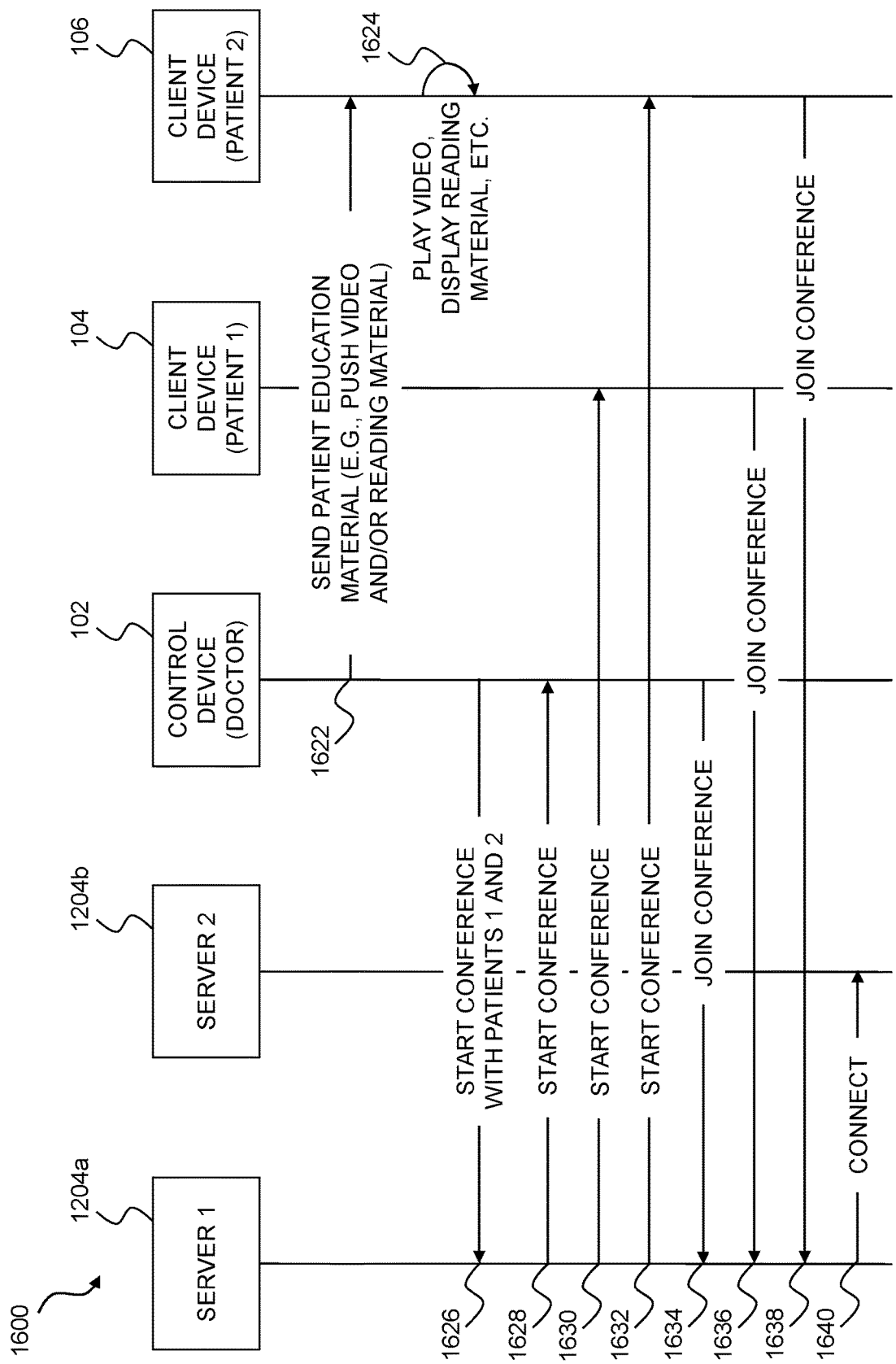

Referring to FIGS. 16A and 16B, one embodiment of a sequence diagram illustrates a portion of an alternate process 1600 by which the control device 102 (representing a doctor) within the medical environment of FIGS. 12A and 12B may communicate with client devices 104 (representing a first patient) and 106 (representing a second patient) in a conference call. In the present example, the conference call is initiated directly with both client devices rather than adding a participant to an active call as shown with respect to FIGS. 15A-15G. Accordingly, only the initial steps are shown in FIGS. 16A and 16B, as later steps are identical to those in FIGS. 15A-15G.

Steps 1602-1624 are identical to steps 1502-1524 of FIGS. 15A and 15B and are not described in detail with respect to the present example. In step 1626, rather than initiate a call only with the client 104 as was done in step 1526 (FIG. 15B), the control device 102 sends a message to the server 1204a to begin the conference call with both client devices 104 and 106. In steps 1628, 1630, and 1632, respectively, the server 1204a sends conference messages to the control device 102, client device 104, and client device 106. The control device 102, client device 104, and client device 106 send messages to the server 1204a to join the conference call in steps 1634, 1636, and 1638, respectively. In step 1640, the server 1204*a* connects to the server 1204*b* (similar to step 1542 of FIG. 15B). The process 1600 then proceeds in the same manner as the process 1500 in steps 1544-1597 of FIGS. 15C-15G.

Referring to FIGS. 17A-17F, one embodiment of a sequence diagram illustrates a process 1700 by which the control device 102 (representing a doctor) within the medical environment of FIGS. 12A and 12B may communicate with client devices 104 (representing a first patient) and 106 (representing a second patient) in a conference call. The present example is similar to the process 1500 of FIGS. 15A-15F with the addition of recording some or all portions of the conference call. It is understood that some steps (such as file sharing or screen sharing) may occur at different times than those illustrated in FIGS. 17A-17F (or not at all), and that such steps are included to show how general message flows for various features may be incorporated. Although not shown, it is understood that the alternate conference call establishment of FIG. 15G may be incorporated into FIGS. 17A-17F as described with respect to FIGS. 15A-15F.

Figure 17A:
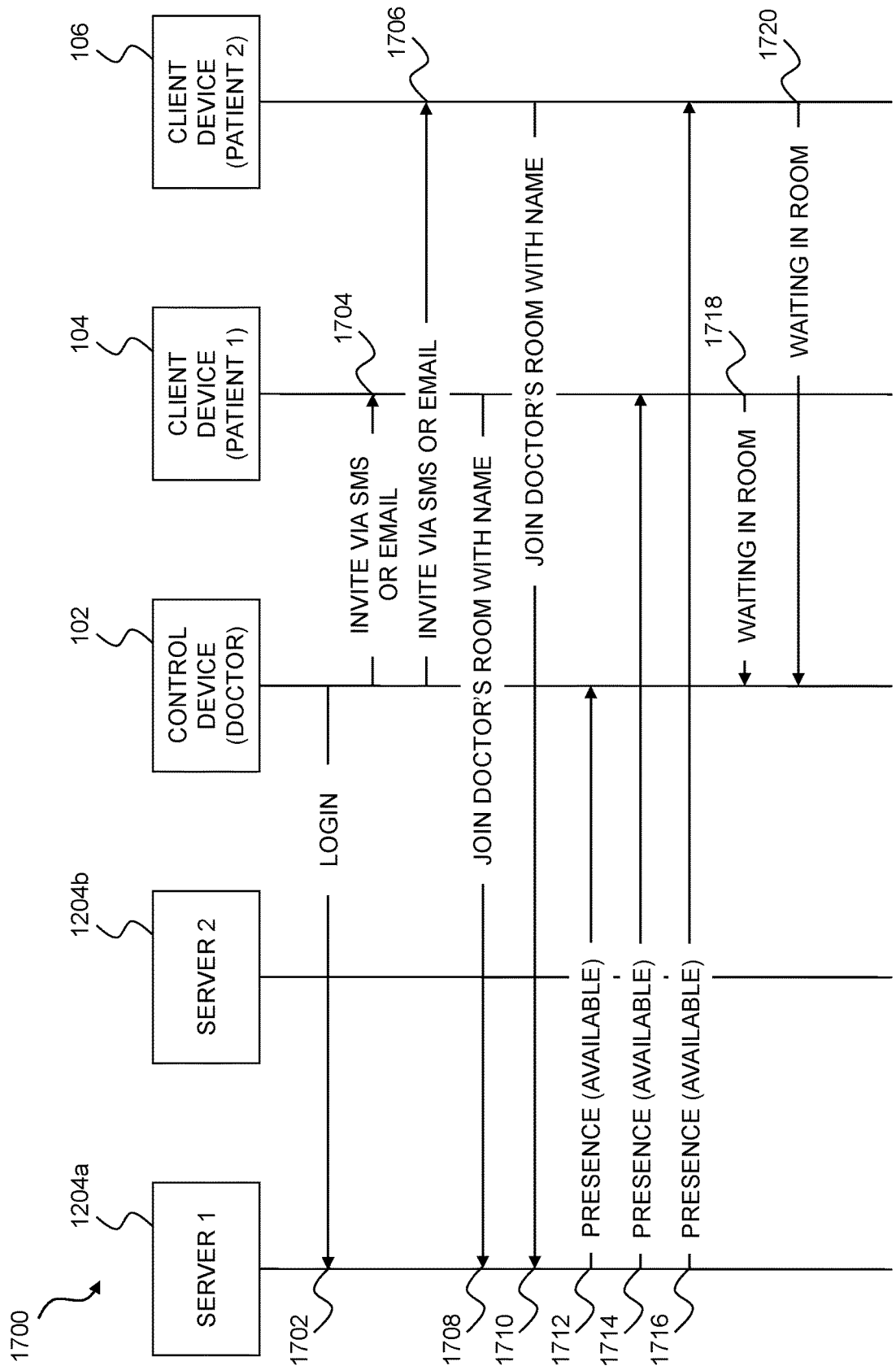

Referring specifically to FIG. 17A, in step 1702, the control device 102 logs into a server 1204*a*, which is the server 1204*a* of FIGS. 12C and 12D in the present example. In steps 1704 and 1706, respectively, the control device 102 sends an invitation to the client devices 104 and 106 via email, SMS, or other communication channels. In steps 1708 and 1710, respectively, the client devices 104 and 106 join the doctor's waiting room (which may be specific to the doctor or may be a general waiting room in the medical facility). In step 1712, the server 1204*a* notifies the control device 102 of the available status of the client devices 104 and 106. In steps 1714 and 1716, respectively, the server 1204*a* notifies the client devices 104 and 106 of the available status of the control device 102. In steps 1718 and 1720, respectively, the client devices 104 and 106 notify the control device 102 that they are in the waiting room.

Figure 17B:
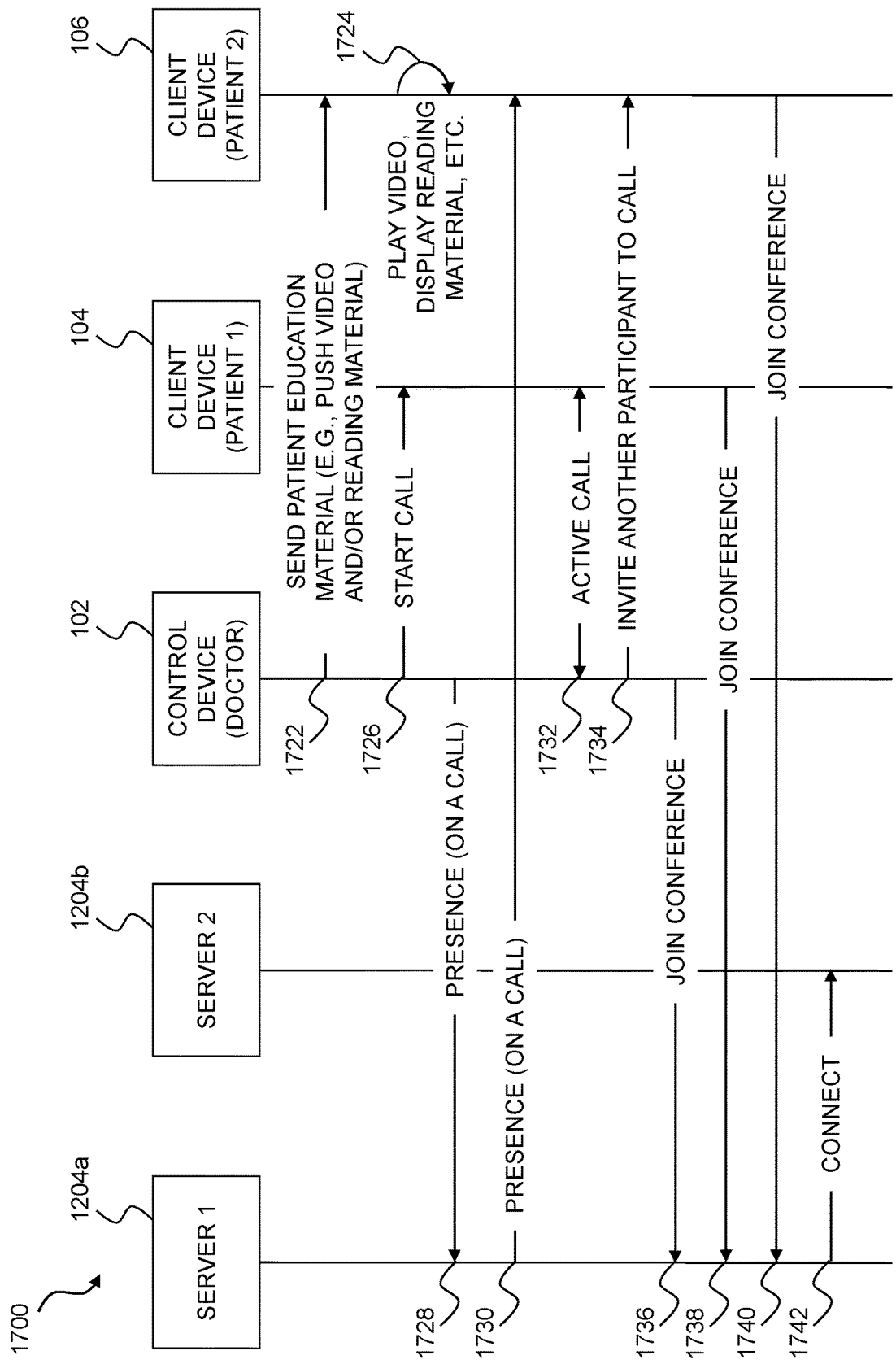

Referring specifically to FIG. 17B, in step 1722, the control device 102 sends patient education material to the client device 106, which the client device 106 displays to its user in step 1724. As this process has been described in previous embodiments, it is not further detailed here. In step 1726, the control device 102 starts a session (e.g., an audio or video call) with the client device 104. In step 1728, the control device 102 notifies the server 1204*a* that it is on a call, and the server 1204*a* updates the control device's status to the client device 106 in step 1730. At this time, there is an active call between the control device 102 and the client device 104 as indicated by step 1732.

In step 1734, the control device 102 invites the client device 106 to join the ongoing call of step 1732. However, the control device 102 does not host the conference call itself and so sends a message to the server 1204*a* that it is joining a conference call. The message may include the identify of the other participants (e.g., the client devices 104 and 106) and may serve as an instruction to the server 1204*a* to set up the call. In steps 1740 and 1742, respectively, the client devices 104 and 106 send messages to the server 1204*a* to join the conference call. In step 1742, the server 1204*a* connects to a server 1204*b*, which is the server 1204*b* of FIGS. 12C and 12D in the present example.

Figure 17C:
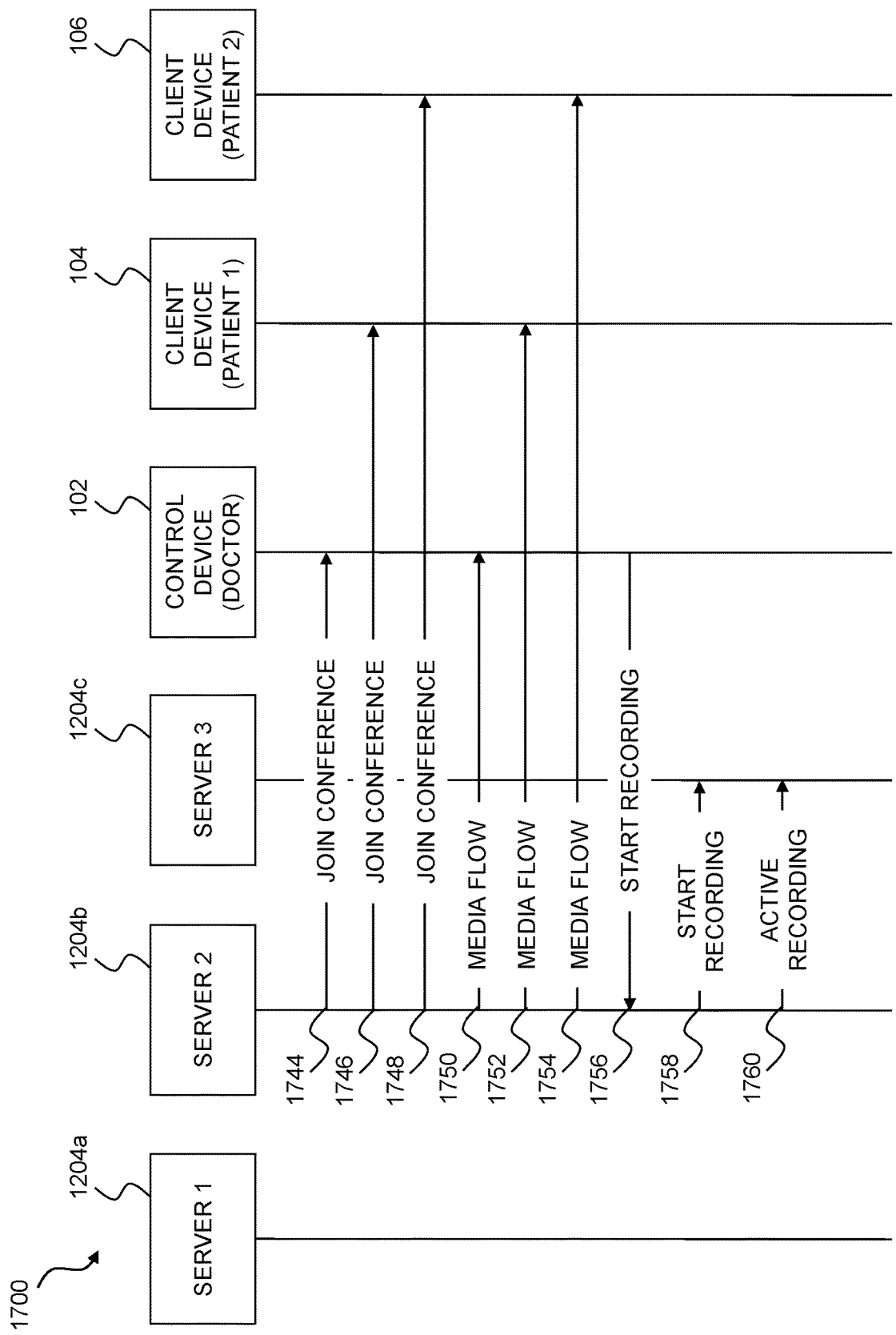

Referring specifically to FIG. 17C, in steps 1744, 1746, and 1748, the server 1204*b* joins the control device 102, client device 104, and client device 106 in a conference call. As the server 1204*b* manages the media for the conference call, media for the call (e.g., audio and/or video) flows between the server 1204*b* and each of the control device 102, client device 104, and client device 106 as shown by arrows 1750, 1752, and 1754, respectively.

In step 1756, the control device 102 notifies the server 1204*a* to begin recording. In step 1758, the server 1204*a* instructs the server 1204*b* (which may be the same server as the server 1204*a* or a different server) to setup a recording session for the control device 102 and the client device 104. At this point, there is an active recording session with the server 1204*b* sending conference call data to the server 1204*c* for recording as shown by step 1760.

Figure 17D:
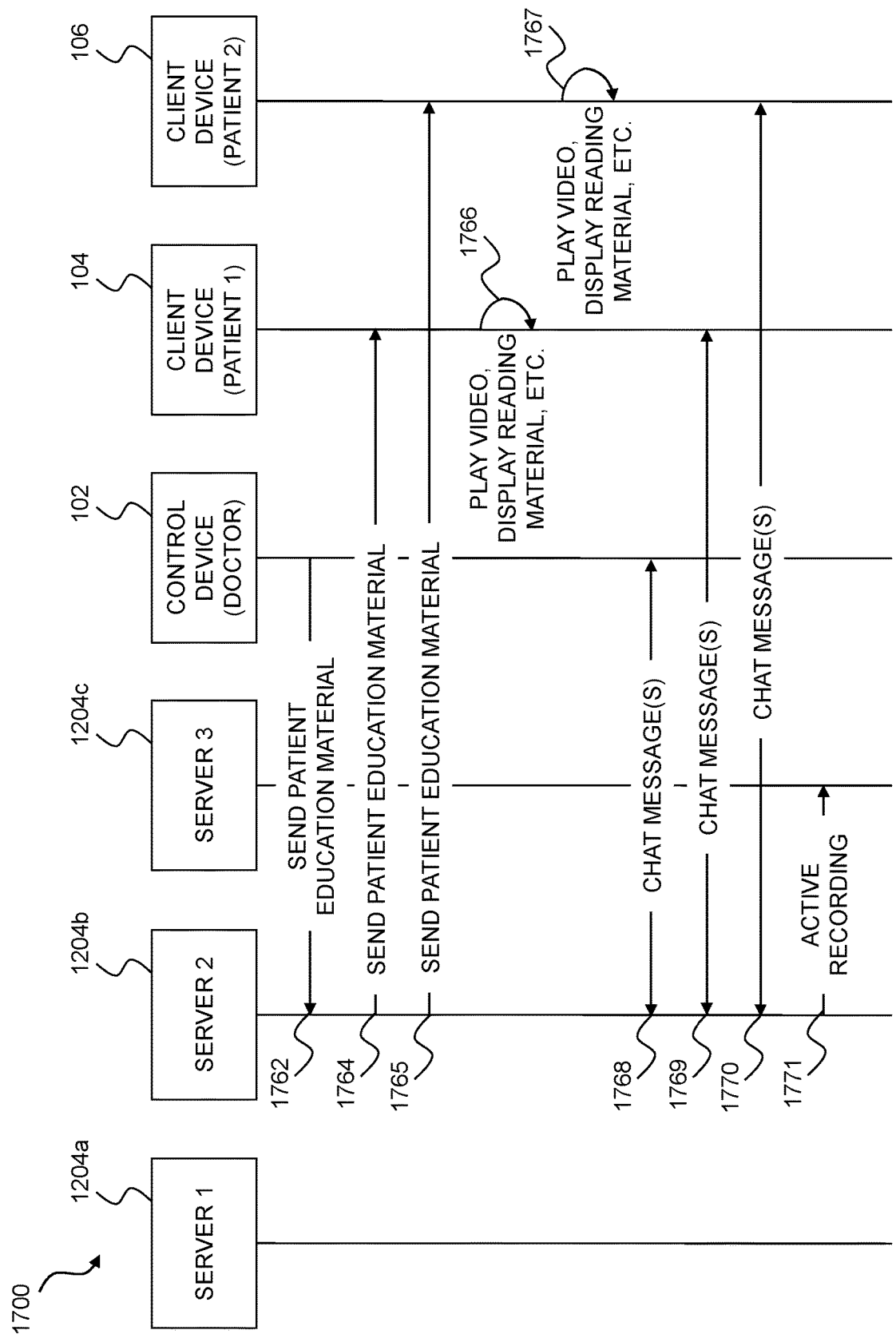

Referring specifically to FIG. 17D, patient education material may be sent and viewed in steps 1762-1767 as described in previous examples. In steps 1768-1770, chat messages may be exchanged as described in previous examples. As indicated by arrow 1771, this information may be sent from the server 1204*b* to the server 1204*c* for recording. It is understood that the recording may occur in various manners, including the sending of batched data or via streaming, and so may occur as media, files, chat messages, and/other data are being received from and sent to the various devices 102, 104, and 106. Accordingly, the active recording may be an ongoing process and is not limited to the illustrated arrows.

Figure 17E:
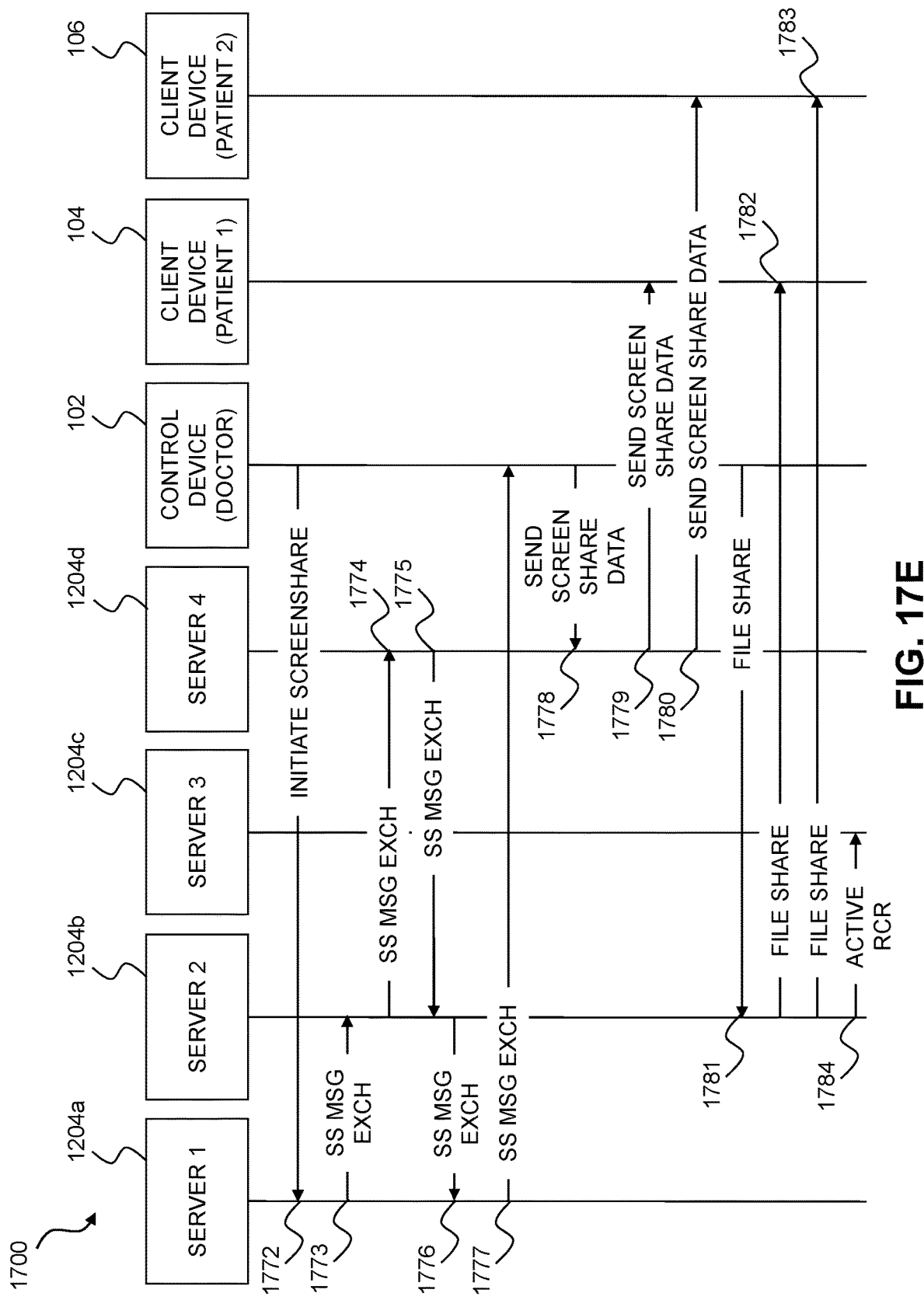

Referring specifically to FIG. 17E, a screenshare session may be established in steps 1772-1780 using a fourth server 1204*d* (which may be combined with the server 1204*b*) as previously described. File sharing may occur in steps 1781-1783 as previously described. As indicated by arrow 1784, this information may be sent from the server 1204*b* to the server 1204*c* for recording.

Figure 17F:
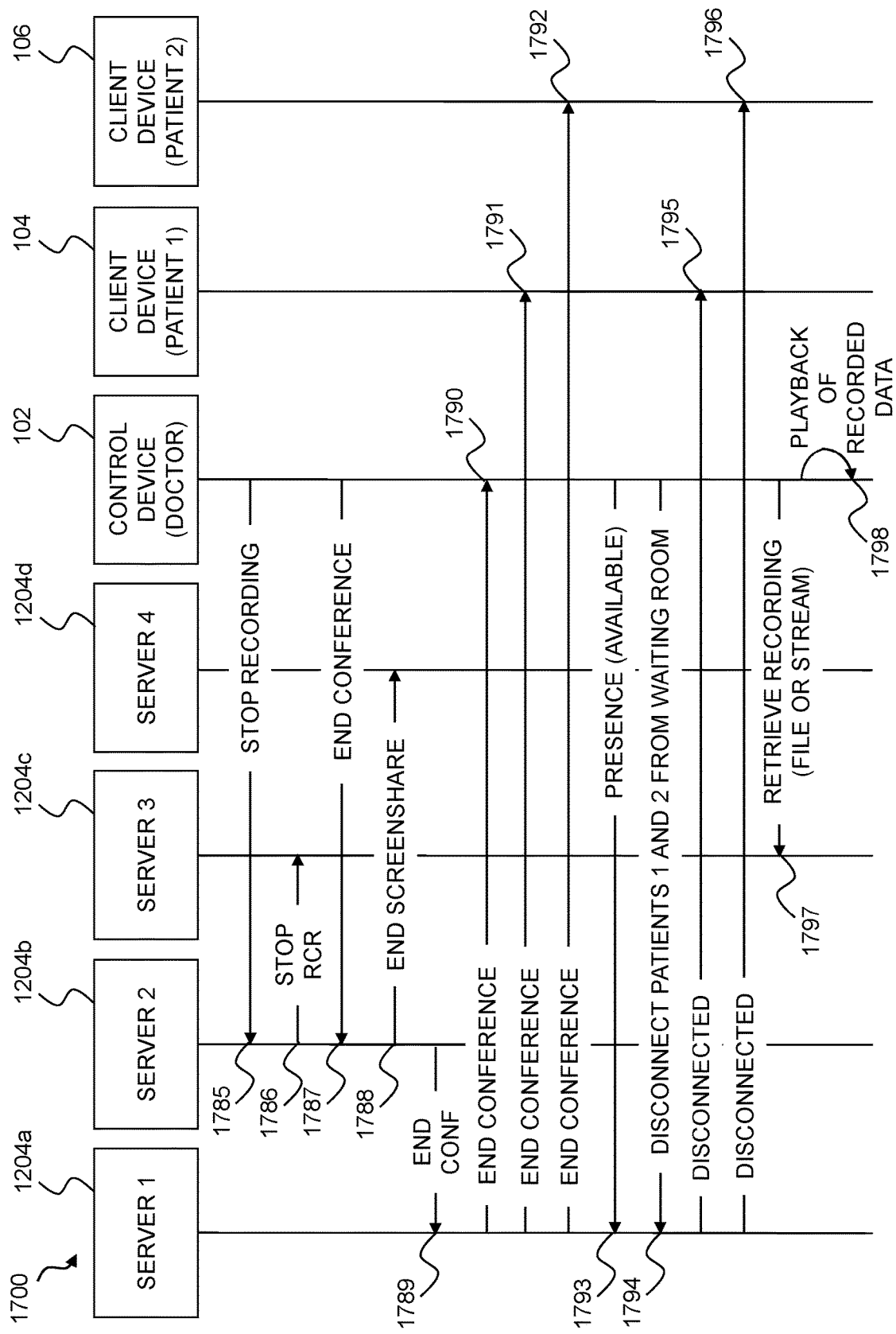

Referring specifically to FIG. 17F, in step 1785, the control device 102 sends a message to the server 1204*b* to stop recording. In step 1786, the server 1204*b* instructs the server 1204*c* to stop recording. In step 1787, the control device instructs the server 1204*b* to end the conference call. In step 1788, the server 1204*b* sends a message to the server 1204*d* to end the screensharing session. In step 1789, the server 1204*b* notifies the server 1204*a* that the conference has ended.

In steps 1790-1792, respectively, the server 1204*a* notifies the control device 102, the client device 104, and the client device 106 that the conference is over. In step 1793, the control device 102 indicates to the server 1204*a* that it is available. In step 1794, the control device 102 instructs the server 1204*a* to disconnect the client devices 104 and 106 from the waiting room. The server 1204*a* notifies the client devices 104 and 106 of the disconnection in steps 1795 and 1796, respectively. In step 1797, the control device 102 may retrieve the recording from the server 1204*b* and play back the session in step 1798.

FIGS. 18-26 illustrate embodiments of a GUI that may be used by the control device of FIGS. 1A, 1B, and 12A-12D. Although the particular examples of FIGS. 18-26 may contain details relevant specifically to the medical environment 1200 of FIGS. 12A and 12B, various illustrated features may be applied to many different environments. It is understood that the functionality needed to provide the GUIs may be present on the control device 102 (e.g., as an application) or may be present on a server that is accessible to the control device, in which case the control device may use an application or a browser (with or without client side downloads such as applets) to access the functionality. It is understood that the illustrated displays and functionality may vary with more or fewer functions than shown, and placement, size, and other details may also change depending on the particular implementation.

As described in previously incorporated U.S. Provisional Application Ser. No. 63/176,419, filed on Apr. 19, 2021, and entitled SYSTEM AND METHOD FOR HIGHLY SCALABLE BROWSER-BASED AUDIO/VIDEO CONFERENCING, in some embodiments, audio/video data for the control device and/or client device(s) for single and/or conference calls may be displayed via a browser (e.g., using Chrome, Safari, Internet Explorer, Brave, Opera, or a similar browser) without the use of a client-side application or plug-in on the device. It is understood that in other embodiments the present disclosure may be applied to environments in which a device uses an application or browser plug-in to communicate with the other device or MCU 1204b, and the description of browser only communications is not intended to be limiting.

By relying strictly on the browser's inherent capabilities without the use of applications or plug-ins, the ability to join and participate in the conference call is available to any device with a browser. This simplifies joining a conference call, and enables joining even if the device does not permit the download or installation of applications or browser plug-ins. Furthermore, this provides a level of security to the device, as there are no downloads to be installed or authorized in order to access the conference call. In addition, as many browsers are widely used and frequently updated for security reasons, the user of the device need not be concerned about potential application or plug-in flaws that might compromise the device's security if not updated. In addition, by relying only on the device's browser, there is less chance of needing an update before joining a conference call, as might happen if an application or a plug-in has not been used for a while. This also enables even mobile devices to fully participate in a conference call using only their built-in browser (or another browser that is selected by the user).

To accomplish this browser focused conferencing, the conference server 1204b may use the WebRTC framework to provide complete conference functionality. The solution also supports the Unified Plan for SDPs as supported by Safari, in addition to Plan-B that is supported by Chrome and other platforms. Further support may be provided using a cross-platform JavaScript SDK that is fully featured.

Figure 18:
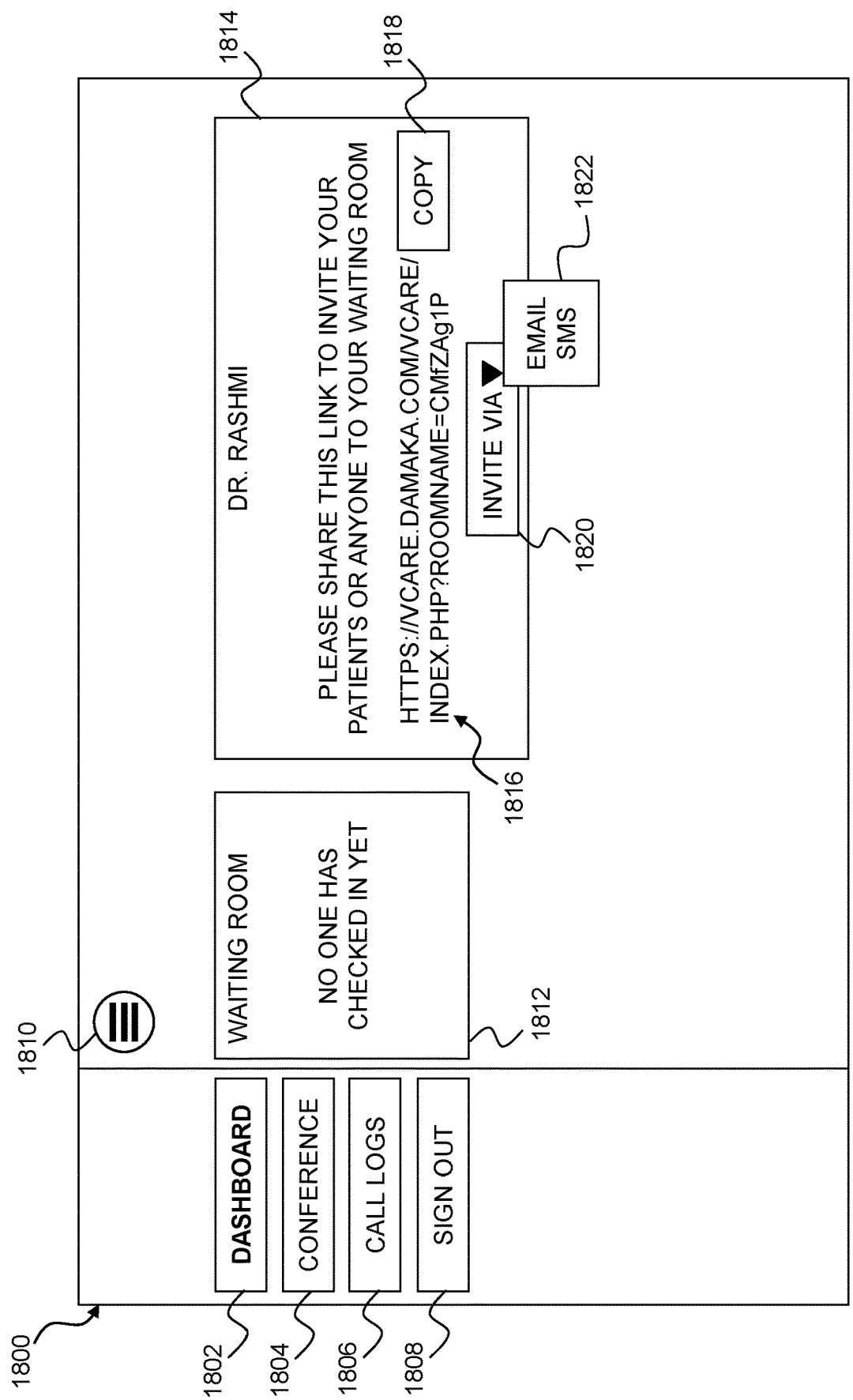

Referring to FIG. 18, one embodiment of a GUI 1800 illustrates a screen display of a control device 102 that enables a user of the device to view a virtual waiting room, select client devices with which to communicate, view call logs, and/or perform other operations. In the present example, the GUI 1800 provides various functions and information. Actuators (e.g., buttons) are present for different views, including a dashboard button 1802, a conference button 1804, a call logs button 1806, and a sigh out button 1808. A selector button 1810 enables the left panel to be hidden/unhidden.

A waiting room 1812 provides a view of anyone waiting in the virtual waiting room. In the present example, the waiting room is currently empty. An invitation panel 1814 provides a link and a way in which to invite users to the waiting room or a call. For purposes of example, the invitation panel 1814 includes a link 1816 that may be sent to invitees, where clicking on the link will place them in the waiting room. For example, sending the link result in step 1304 of FIG. 13A. A copy button 1818 enables the link to be copied for convenience. An invite button 1820 allows the selection of a communication channel for the invitation, which is either email or SMS as shown by a popup window 1822.

Figure 19:
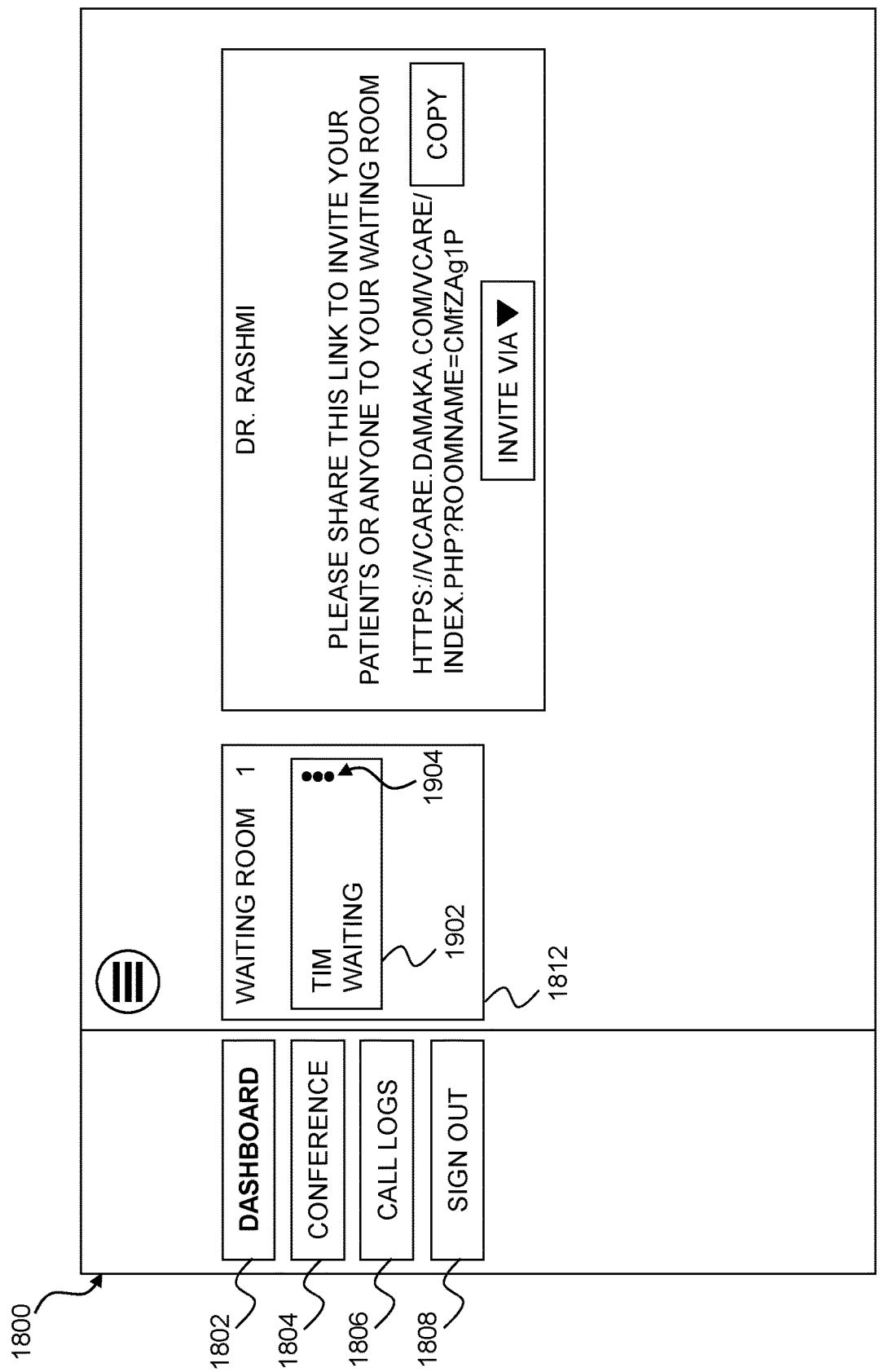

Referring to FIG. 19, another embodiment of the GUI 1800 illustrates a single user identified as "Tim" now present in the waiting room 1812. A pane 1902 indicates the name and status (e.g., waiting) of the client and an options selector 1904 may be present.

Figure 20:
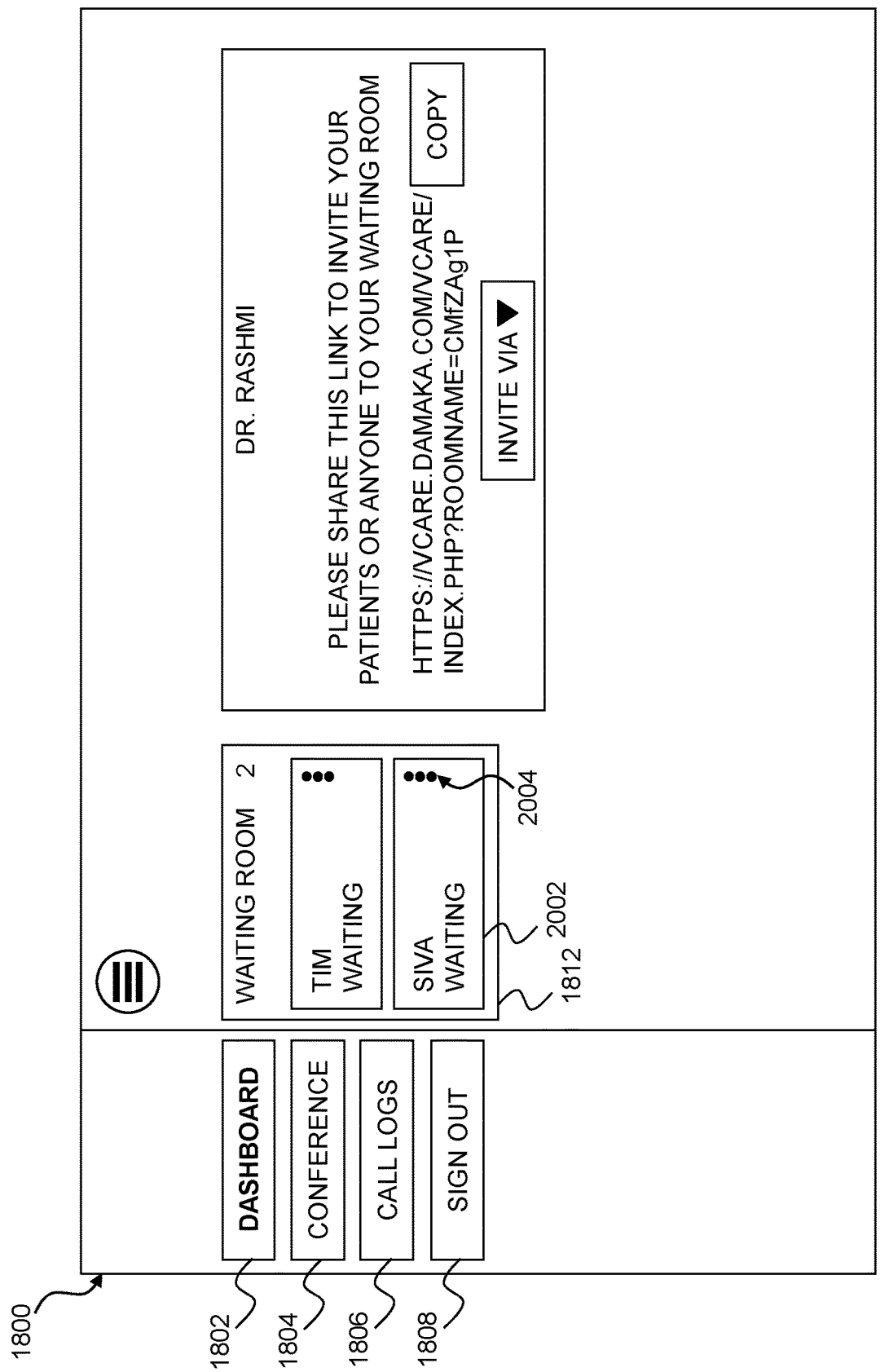

Referring to FIG. 20, another embodiment of the GUI 1800 illustrates a second user identified as "Siva" now present in the waiting room 1812. A pane 2002 indicates the name and status (e.g., waiting) of the client and an options selector 2004 may be present.

Figure 21:
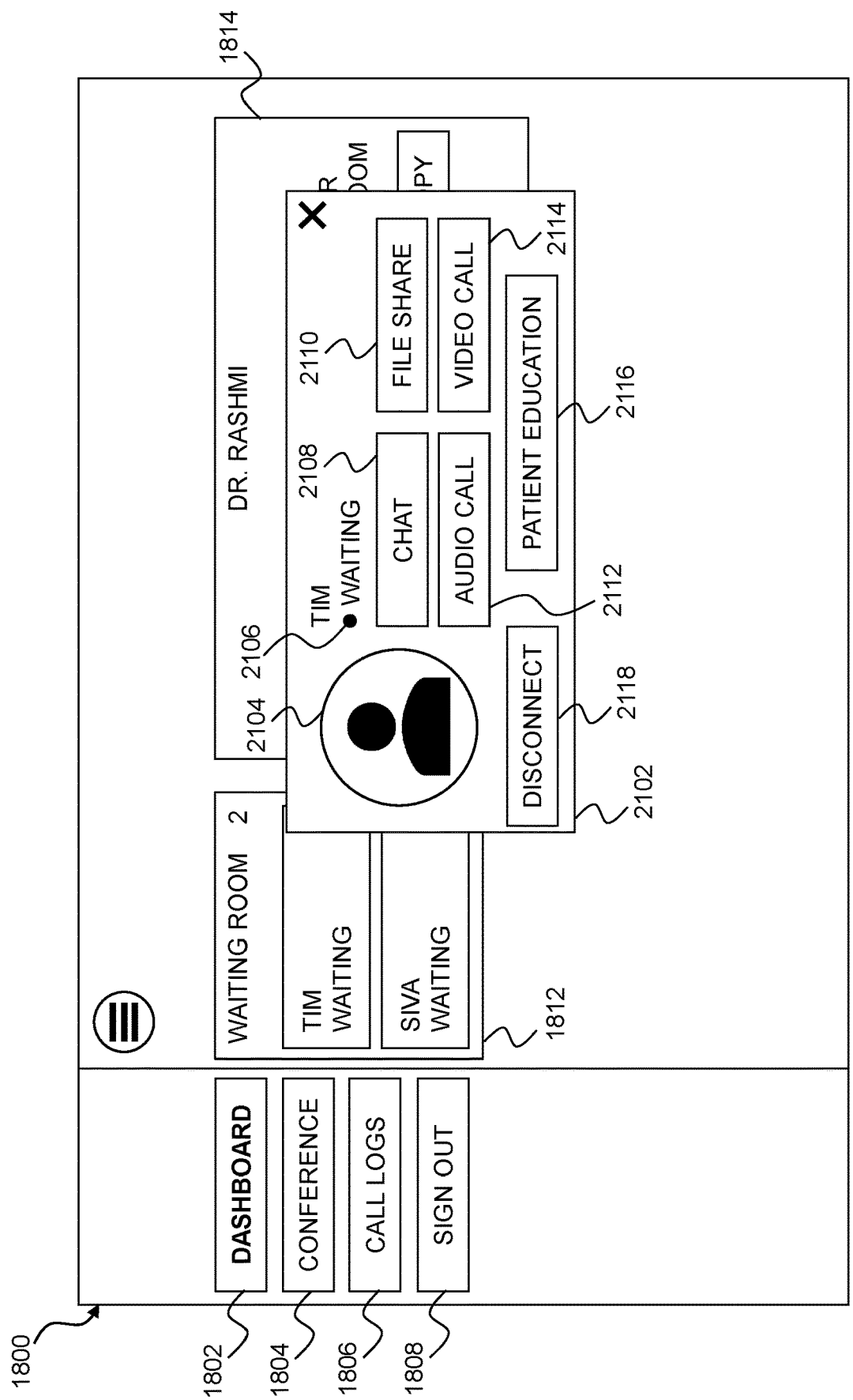

Referring to FIG. 21, another embodiment of the GUI 1800 illustrates a window 2102 that appears when the selector 1904 is actuated. In the present example, the window 2102 is a popup window, but it is understood that other view options may be provided. The window 2102 may include a picture 2104 of the client along with their name and status. A status indicator 2106 may be provided to visually indicate their status using color and/or other representations. For example, a green dot may indicate ready and waiting, a yellow dot may indicate the client has placed the call on hold, has a poor connection, or is not ready (e.g., an appointment time has not been reached), and a red dot may indicate lack of a connection.

Various buttons or other actuators may provide functionality, including a chat button 2108 to initiate a chat message, a file share button 2110 to initiate a file share, an audio call button 2112 to initiate an audio call, and a video call button 2114 to initiate a video call. A patient education button 2116 may be used to allow the selection of patient education material to send to the client. A disconnect button 2118 enables disconnection of the current client, which may disconnect them from the waiting room.

Figure 22A:
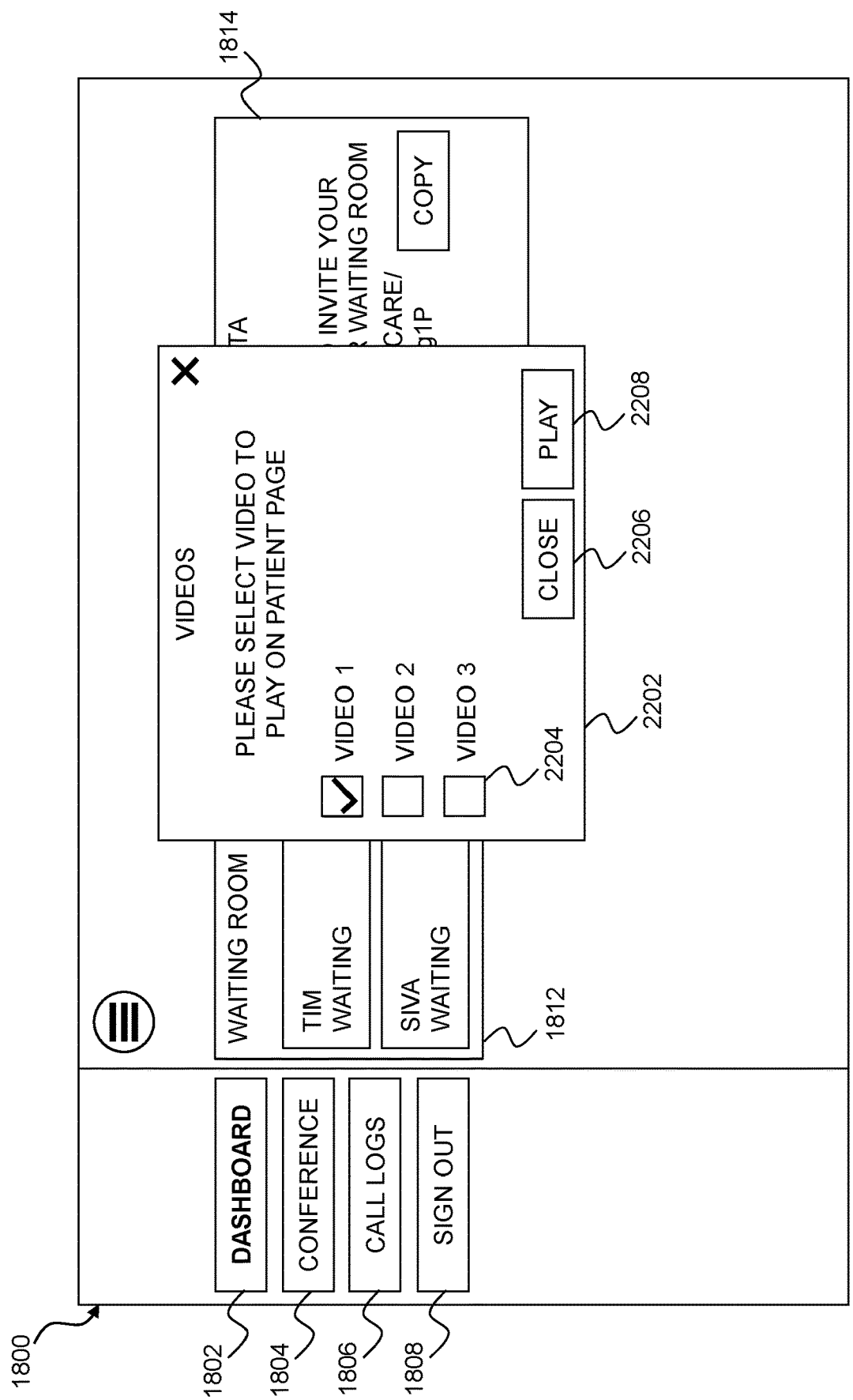
Figure 22B:
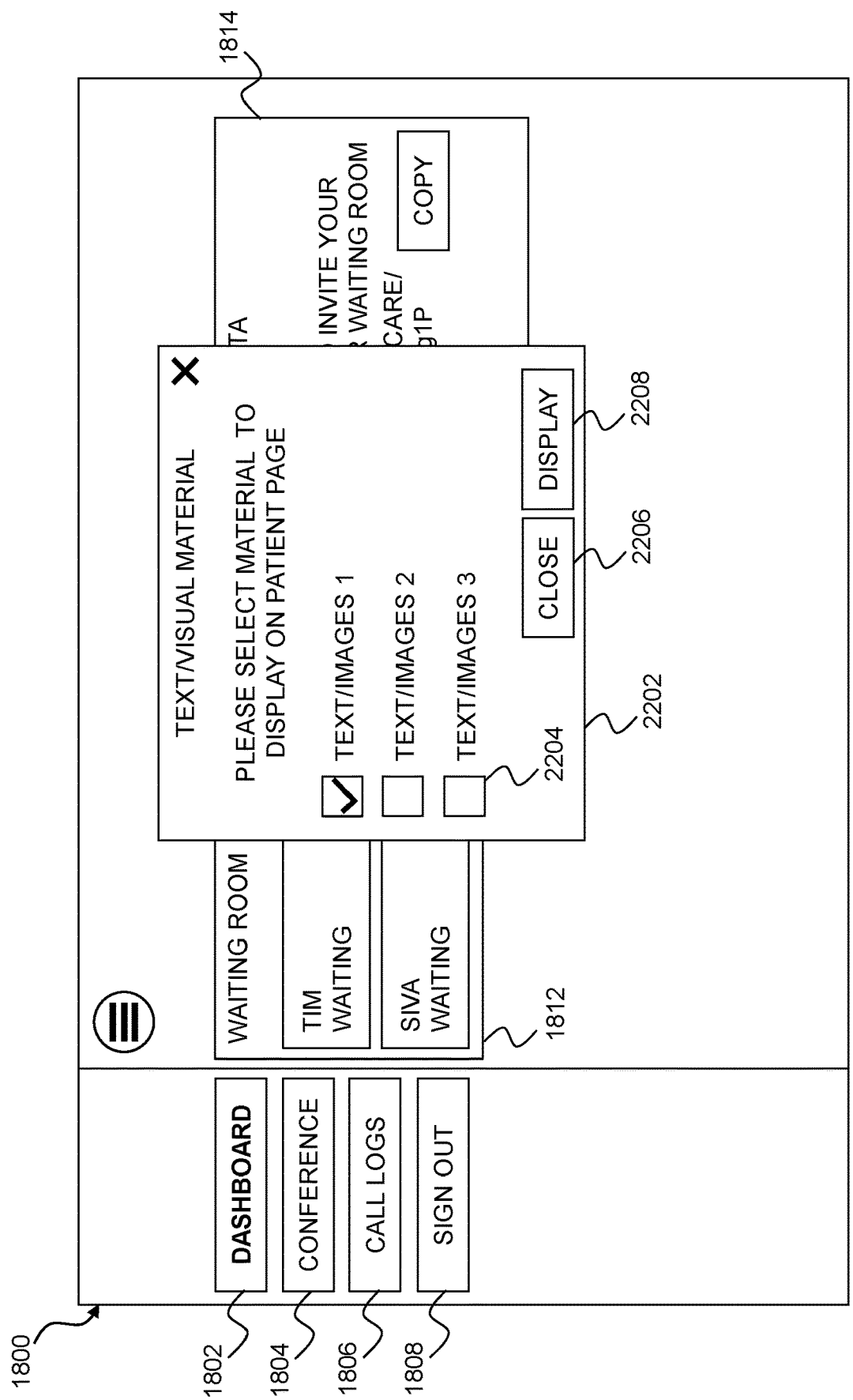
Figure 22C:
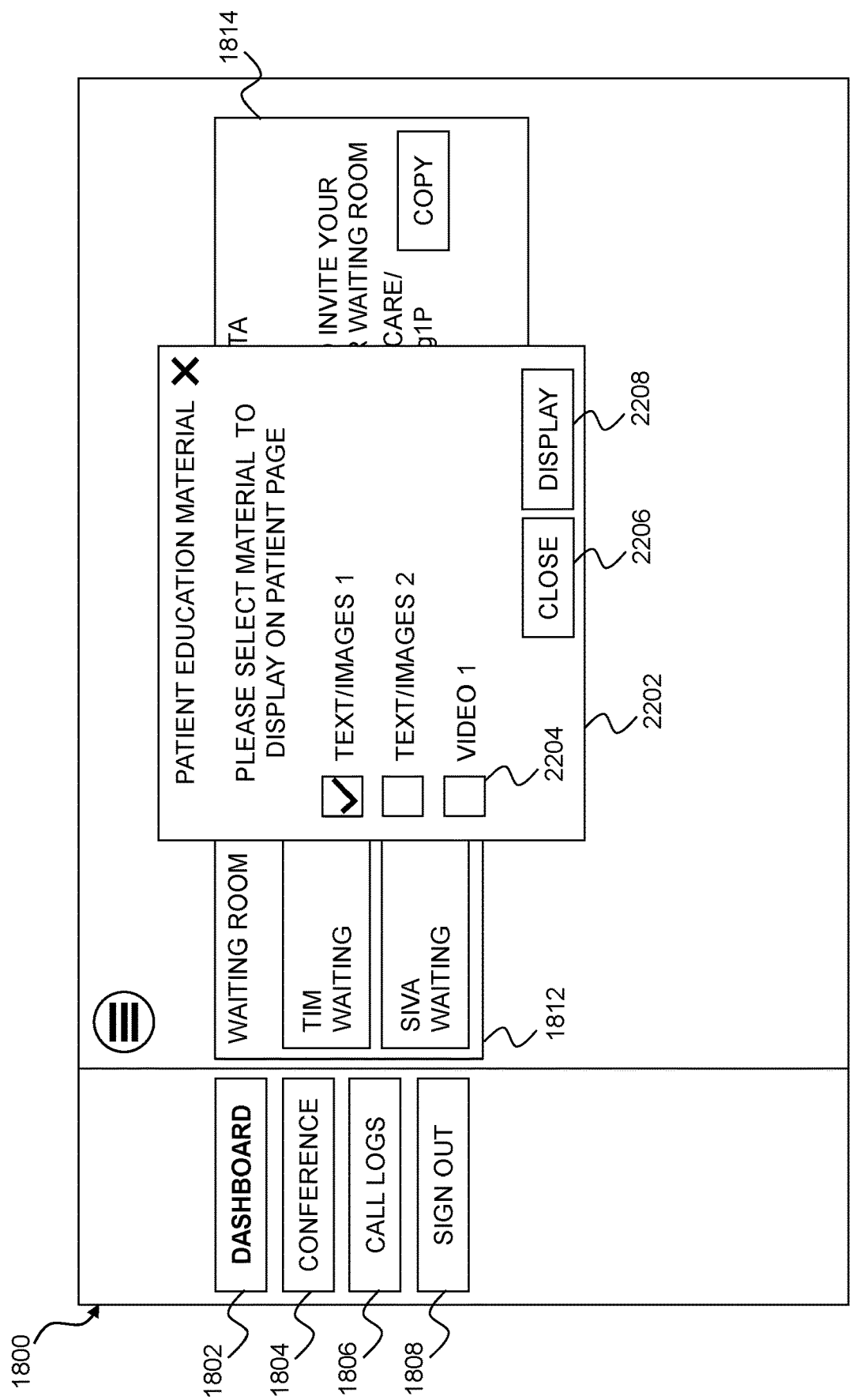

Referring to FIGS. 22A-22C, another embodiment of the GUI 1800 illustrates a window 2202 that appears when the selector 2116 is actuated. Referring specifically to FIG. 22A, in the present example, the window 2202 includes patient education material in the form of videos that may be selected and sent to a user (in this came, the user Tim). It is understood that the materials may be presented and/or selected in different ways, including checkboxes, radio buttons, and/or drop down lists. Furthermore, it may be possible to select multiple videos. A close button 2206 enables the window 2202 to be closed, and a play button 2208 enables the selected content to be played (e.g., sent to the user for display). FIG. 22B illustrates an example where the patient education material is in the form of text/images. FIG. 22C illustrates an example where the patient education material is in the form of both video and text/images.

Figure 23:
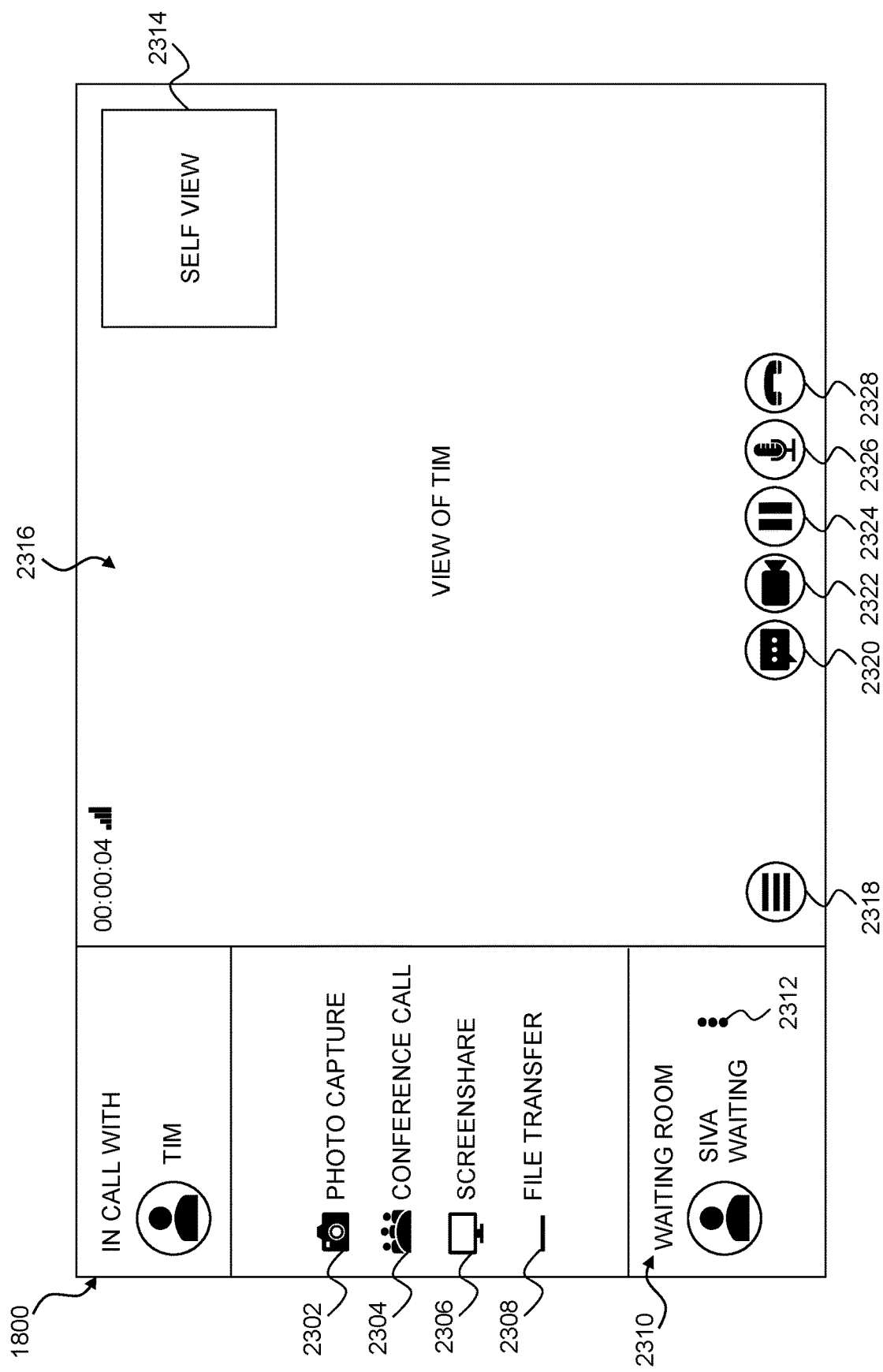

Referring to FIG. 23, one embodiment of the GUI 1800 illustrates a video call display for the control device 102 when a video call is established with user Tim. A photo button 2302 enables a photo to be captured by the control device 102. A conference call button 2304 enables one or more participants to be added to the conference call. A screenshare button 2306 enables the user of the control device 102 to share the screen (e.g., step 1366 of FIG. 13D). A file transfer (or share) button 2308 enables a file to be sent (e.g., step 1344 of FIG. 13C).

A waiting room view 2310 provides a view of users in the virtual waiting room, with Siva currently waiting. An options selector 2312 may provide options (e.g., some or all of the options of the window 2102 of FIG. 21) for interacting with Siva. A view window 2314 provides a self-view (e.g., a view using a camera of the control device 102). A view window 2316 provides a view of Tim (e.g., using the camera of Tim's client device). A selector button 2318 enables the left panel to be hidden/unhidden.

Various buttons may be used to provide additional functions and/or control the call. A chat button 2320 may be provided to enable text messaging. A video button 2322 may be provided to enable and disable video. A pause button 2324 may be used to place the call on hold, and may be replaced by a play button (not shown) to remove the call from hold. A mic button 2326 may be used to mute and unmute audio. A disconnect button 2328 may be used to end the call.

Figure 24:
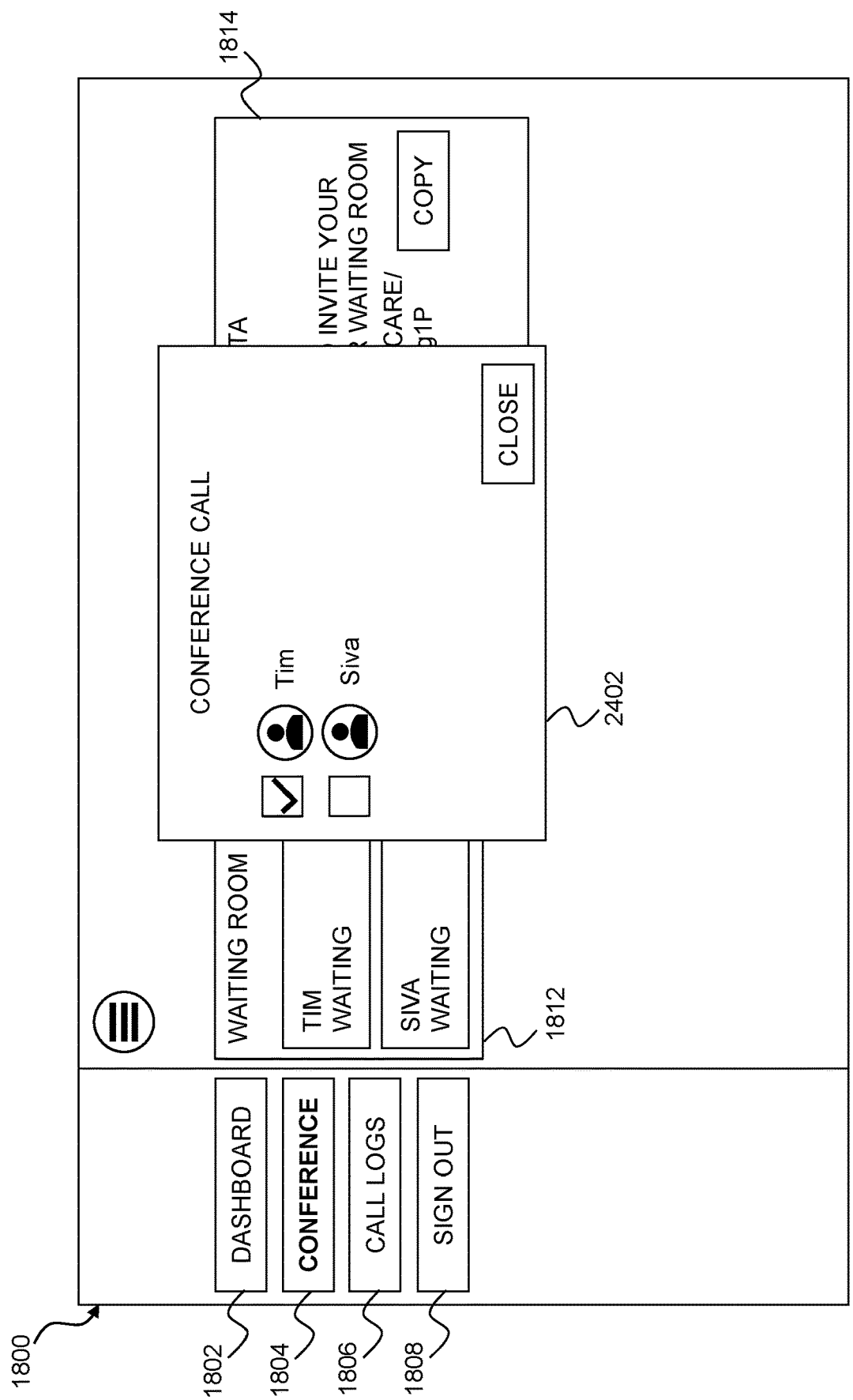

Referring to FIG. 24, one embodiment of the GUI 1800 illustrates a window 2402 that enables a conference call to be established. In the present example, the window 2302 enables one or both of the users in the waiting room to be invited to the call.

Figure 25:
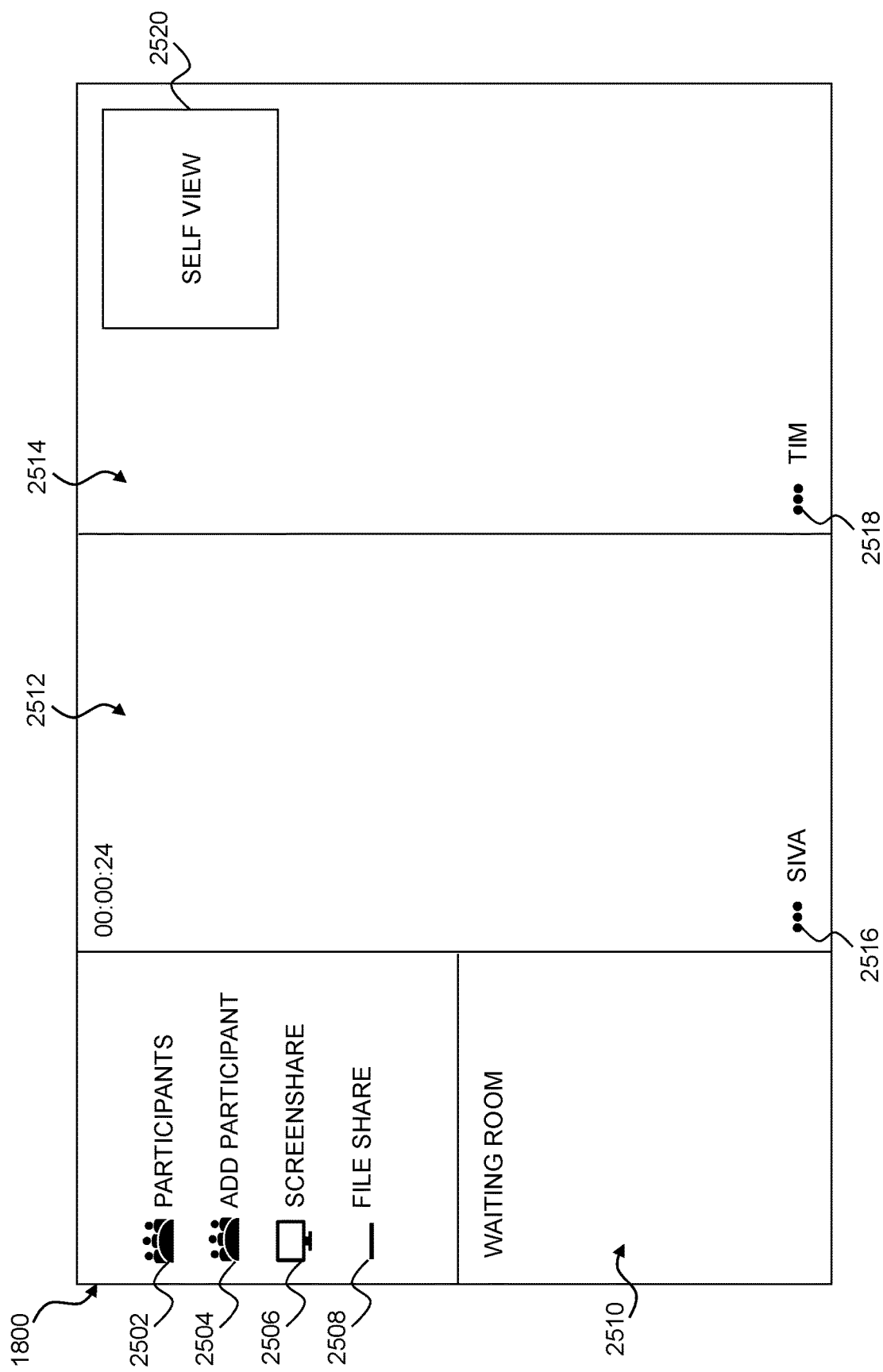

Referring to FIG. 25, one embodiment of the GUI 1800 illustrates a conference call display for the control device 102 when a conference call is established with two users Siva and Tim. A participants button 2502 enables a participant view. An add participants button 2504 enables one or more participants to be added to the conference call. A screenshare button 2506 enables the user of the control device 102 to share the screen. A file share button 2508 enables a file to be sent.

Referring to FIG. 26, one embodiment of the GUI 1800 illustrates call logs that are displayed after the call logs button 1806 is selected. As shown, call logs may be selected, sorted, and viewed based on a number of criteria.

Referring to FIG. 27, one embodiment of a GUI 2700 illustrates a screen display of a client device (e.g., one of the client devices 104, 106, and 108) that enables a user of the device to join a virtual waiting room and participate in a call via the waiting room. For purposes of example, the client device 104 is a smart phone and the display uses a browser with controls 2702, but other devices and/or applications may be used. The GUI 2700 may include a viewing portion 2704 showing a web page that provides the user with the ability to join the waiting room by entering a name in a name field 2706 and selecting a button 2708.

Referring to FIG. 28, one embodiment of the GUI 2700 shows the window 2704 after check in. A status indicator 2802 for the doctor may visually indicate availability. A window 2804 may display patient education material (e.g., such as that sent in step 1336 of FIG. 13B). It is understood that controls for the material's display may be provided and may vary based on the type of material (e.g., text or video).

Figure 29:
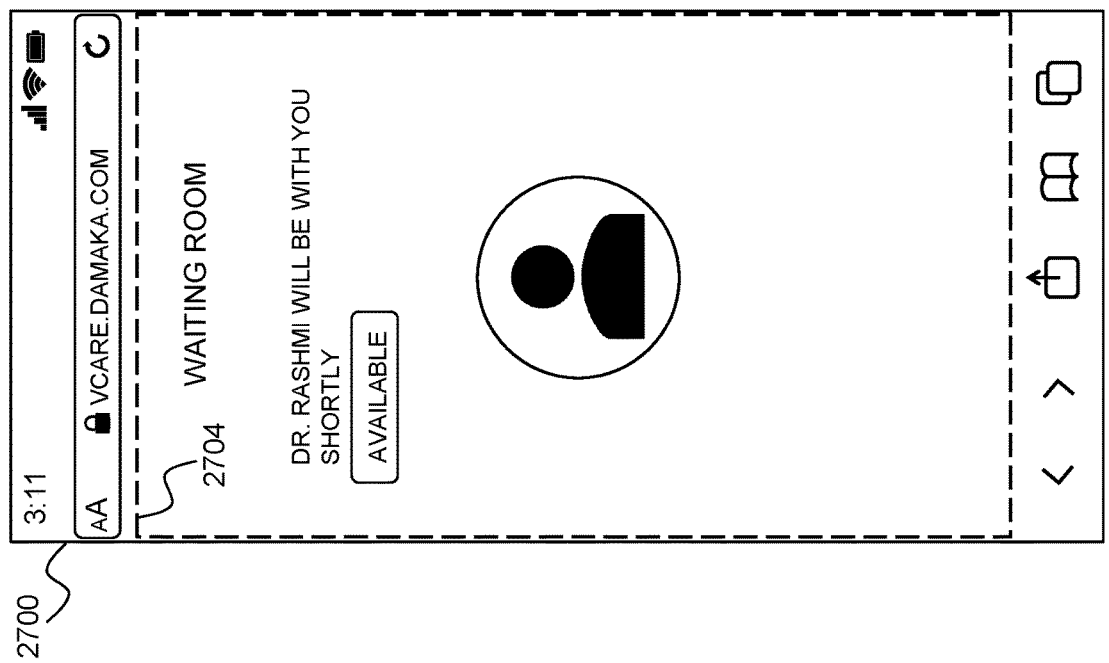

Referring to FIG. 29, one embodiment of the GUI 2700 shows the window 2704 while waiting, but without patient education material.

Figure 30:
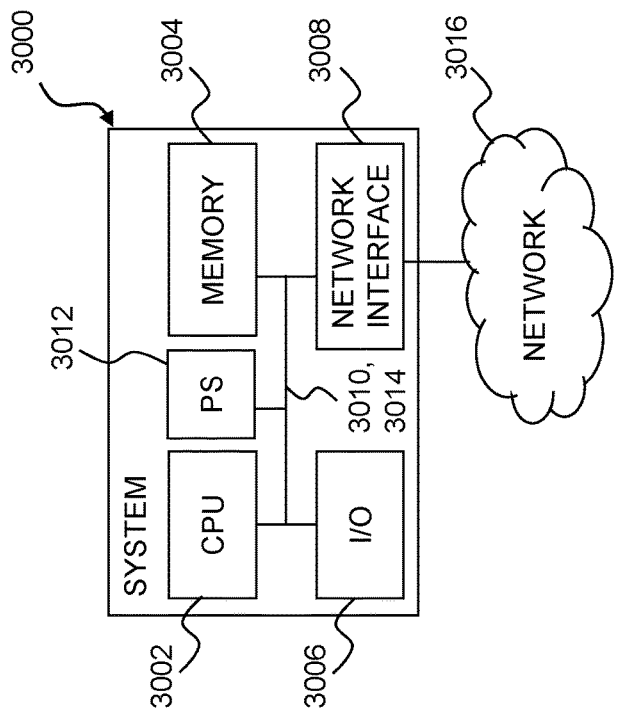
FIG. 30 is a simplified diagram of one embodiment of a computer system that may be used in embodiments of the present disclosure as a control device, a client device, and/or a server.

Referring to FIG. 30, one embodiment of a computer system 3000 is illustrated. The computer system 3000 is one possible example of a system component or computing device such as a communication device, a document server, an endpoint, and/or an access server. The computer system 3000 may include a controller (e.g., a central processing unit ("CPU")) 3002, a memory unit 3004, an input/output ("I/O") device 3006, and a network interface 3008. The components 3002, 3004, 3006, and 3008 are interconnected by a transport system (e.g., a bus) 3010. A power supply (PS) 3012 may provide power to components of the computer system 3000, such as the CPU 3002 and memory unit 3004. It is understood that the computer system 3000 may be differently configured and that each of the listed components may actually represent several different components. For example, the CPU 3002 may actually represent a multi-processor or a distributed processing system; the memory unit 3004 may include different levels of cache memory, main memory, hard disks, and remote storage locations; the I/O device 3006 may include monitors, keyboards, and the like; and the network interface 3008 may include one or more network cards providing one or more wired and/or wireless connections to a network. Therefore, a wide range of flexibility is anticipated in the configuration of the computer system 3000.

The computer system 3000 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 3000. The operating system, as well as other instructions (e.g., for the processes and message sequences described herein), may be stored in the memory unit 3004 and executed by the processor 3002. For example, if the computer system 3000 is the control device 102 or a client device 104, 106, 108, the memory unit 3004 may include instructions for performing some or all of the message sequences and methods described with respect to such devices in the present disclosure.

The network 3016 may be a single network or may represent multiple networks, including networks of different types. For example, the control device 102 or a client device 104, 106, 108 may be coupled to a network that includes a cellular link coupled to a data packet network, or data packet link such as a wide local area network (WLAN) coupled to a data packet network. Accordingly, many different network types and configurations may be used to establish communications between the control device 102, client devices 104, 106, 108, servers, and/or other components described herein.

Exemplary network, system, and connection types include the internet, WiMax, local area networks (LANs) (e.g., IEEE 802.11a and 802.11g wi-fi networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Ultra Mobile Broadband (UMB) systems, Flash-OFDM cellular systems, and Ultra wideband (UWB) systems. Furthermore, the present disclosure may be used with communications systems such as Global System for Mobile communications (GSM) and/or code division multiple access (CDMA) communications systems. Connections to such networks may be wireless or may use a line (e.g., digital subscriber lines (DSL), cable lines, and fiber optic lines).

Communication among the control device 102, client devices 104, 106, 108, servers, and/or other components described herein may be accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)), and/or proprietary protocols. For example, signaling communications (e.g., session setup, management, and teardown) may use a protocol such as the Session Initiation Protocol (SIP), while data traffic may be communicated using a protocol such as the Real-time Transport Protocol (RTP), File Transfer Protocol (FTP), and/or Hyper-Text Transfer Protocol (HTTP). A sharing session and other communications as described herein may be connection-based (e.g., using a protocol such as the transmission control protocol/internet protocol (TCP/IP)) or connection-less (e.g., using a protocol such as the user datagram protocol (UDP)). It is understood that various types of communications may occur simultaneously, including, but not limited to, voice calls, instant messages, audio and video, emails, document sharing, and any other type of resource transfer, where a resource represents any digital data.

While the preceding description shows and describes one or more embodiments, it will be understood by those skilled in the art that various changes in form and detail may be made therein without departing from the spirit and scope of the present disclosure. For example, various steps illustrated within a particular sequence diagram or flow chart may be combined or further divided. In addition, steps described in one diagram or flow chart may be incorporated into another diagram or flow chart. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for managing multiple independent communication sessions between a control device and at least first and second client devices, the method comprising:
    establishing, between a control device and a first client device, a first communication session;
    establishing, between the control device and a second client device, a second communication session;
    participating, by the control device, in the first communication session while the second communication session is on hold;
    receiving, by the control device, an addition request from the first client device for adding a third client device to the first communication session while the control device is participating in the first communication session;
    sending, by the control device, data representing an authorization document to the first client device in response to the addition request, wherein the authorization document is needed to confirm authorization for adding the third client device to the first communication session;
    determining, by the control device, whether a signature from the first client device has been obtained for the authorization document;
    adding, by the control device, the third client device to the first communication session only if the signature has been obtained;
    placing, by the control device, the first communication session on hold;
    receiving, by the control device, a selection of a first visual media file from a plurality of available visual media files, wherein the selection is made by a user of the control device;
    injecting, by the control device, the first visual media file into the first communication session, wherein the first visual media file is to be displayed on the first client device while the first communication session is on hold, and wherein the first visual media file is also to be displayed on the third client device if the third client device has been added to the first communication session; and
    switching, by the control device, to the second communication session while the first communication session is on hold.

2. The method of claim 1 wherein injecting the first visual media file into the first communication session further comprises:
    sending the first visual media file to the first client device, wherein the entire first visual media file is received before being displayed.

3. The method of claim 1 wherein injecting the first visual media file into the first communication session further comprises:
    streaming the first visual media file to the first client device while the first communication session is on hold.

4. The method of claim 1 wherein injecting the first visual media file into the first communication session further comprises:
    receiving, by the control device, a uniform resource locator (URL), wherein the URL represents a location of the first visual media file on a server accessible to the first client device; and
    sending the URL to the first client device.

5. The method of claim 1 wherein the first and second client devices are invited to communicate with the control device via an identical uniform resource locator (URL).

6. The method of claim 1 further comprising:
    receiving, by the control device, a request for a third communication session from a third fourth client device; and
    adding, by the control device, the fourth client device to a virtual waiting room, wherein the third communication session is automatically placed on hold when added to the virtual waiting room.

7. The method of claim 1 wherein the first client device is able to participate in the first communication session using only a standard browser present on the first client device, wherein no plug-in or other application download is required to participate in the first communication session.

8. The method of claim 1 further comprising presenting, by the control device to the user of the control device, a graphical user interface (GUI) displaying interaction options by which the user of the control device may make the selection.

9. The method of claim 8 wherein the GUI is configured to enable the user of the control device to make multiple selections from the plurality of available media files for injection into the communication session.

10. A method for injecting a visual media file into a communication session between a control device and a client device, the method comprising:
    establishing, between a control device and a first client device, a communication session;
    receiving, by the control device, an addition request from the first client device for adding a second client device to the communication session while the control device is participating in the communication session;
    sending, by the control device, data representing an authorization document to the first client device in response to the addition request, wherein the authorization document is needed to confirm authorization for adding the second client device to the communication session;
    determining, by the control device, whether a signature from the first client device has been obtained for the authorization document;
    adding, by the control device, the second client device to the communication session only if the signature has been obtained;

placing, by the control device, the communication session on hold;

receiving, by the control device, a selection of a visual media file from a plurality of available media files, wherein the selection is made by a user of the control device;

injecting, by the control device, the visual media file into the communication session, wherein the visual media file is to be displayed on the first client device while the communication session is on hold, and wherein the visual media file is also to be displayed on the second client device if the second client device has been added to the communication session; and removing, by the control device, the hold to continue the communication session.

11. The method of claim 10 wherein injecting the visual media file into the communication session further comprises:

sending the visual media file to the first client device, wherein the entire visual media file is received before being displayed.

12. The method of claim 10 wherein injecting the visual media file into the communication session further comprises:

streaming the visual media file to the first client device while the communication session is on hold.

13. The method of claim 10 wherein injecting the visual media file into the communication session further comprises:

receiving, by the control device, a uniform resource locator (URL), wherein the URL represents a location of the visual media file on a server accessible to the first client device; and sending the URL to the first client device.

14. The method of claim 10 further comprising injecting, by the control device, a second visual media file into the communication session while the communication session is not on hold, wherein the second visual media file is to be played on the first client device while the communication session is not on hold.

* * * * *